United States Patent
Takahashi et al.

(10) Patent No.: US 6,745,202 B2
(45) Date of Patent: Jun. 1, 2004

(54) STRUCTURED-TEXT CATALOGING METHOD, STRUCTURED-TEXT SEARCHING METHOD, AND PORTABLE MEDIUM USED IN THE METHODS

(75) Inventors: Toru Takahashi, Sagamihara (JP); Hisamitsu Kawaguchi, Sagamihara (JP); Noriyuki Yamasaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/303,782

(22) Filed: Nov. 26, 2002

(65) Prior Publication Data

US 2003/0078920 A1 Apr. 24, 2003

Related U.S. Application Data

(63) Continuation of application No. 10/095,569, filed on Mar. 13, 2002, now Pat. No. 6,535,875, which is a continuation of application No. 09/814,692, filed on Mar. 15, 2001, now Pat. No. 6,389,413, which is a continuation of application No. 09/589,226, filed on Jun. 8, 2000, now Pat. No. 6,226,632, which is a continuation of application No. 09/028,513, filed on Feb. 23, 1998, now Pat. No. 6,105,022.

(30) Foreign Application Priority Data

Feb. 26, 1997 (JP) .............................. 9-041855

(51) Int. Cl.[7] .............................. G06F 17/30
(52) U.S. Cl. .......................... 707/102; 707/3
(58) Field of Search .............. 707/102, 2, 3, 707/4, 10, 205; 706/45

(56) References Cited

U.S. PATENT DOCUMENTS

| | | | |
|---|---|---|---|
| 5,519,694 A | 5/1996 | Brewer et al. | 370/351 |
| 5,557,789 A | 9/1996 | Mase et al. | 707/1 |

(List continued on next page.)

FOREIGN PATENT DOCUMENTS

| | | |
|---|---|---|
| JP | 8-147311 | 6/1996 |
| JP | 8-194718 | 7/1996 |

OTHER PUBLICATIONS

Published material concerning Livelink Search, a product of Open Text Corporation, printed from the Internet (no data available).

(List continued on next page.)

*Primary Examiner*—Diane D. Mizrahi
(74) *Attorney, Agent, or Firm*—Mattingly, Stanger & Malur, P.C.

(57) ABSTRACT

A text cataloging method includes a step of cataloging already-analyzed-text data obtained from an analysis of a logical structure of a text to be cataloged in a text database, a step of creating a structure index by sequentially superposing logical structures of texts to be cataloged, wherein a single metaelement is used for representing a group of elements in the texts having the same position of appearance in one of the texts and the same element type, a single piece of meta-character-string data is used for representing a group of pieces of character-string data in the texts having the same position of appearance in one of the texts, and a context identifier is assigned to each metanode composing a tree-like structure of the structure index for uniquely identifying the metanode; a step of generating structured-full-text data composed of definitions of associative relations between all pieces of character-string data included in already-analyzed-text data of each text to be cataloged, and context identifiers of pieces of meta-character-string data in the structure index used for representing the pieces of character-string data; and a character-string-index updating step, including the sub-steps of extracting partial character strings, generating structured-character-position information, and updating a character-string index.

20 Claims, 46 Drawing Sheets

U.S. PATENT DOCUMENTS

| | | | |
|---|---|---|---|
| 5,666,645 A | | 9/1997 | Thomas et al. ............... 455/6.1 |
| 5,717,925 A | | 2/1998 | Harper et al. ................ 707/102 |
| 5,768,580 A | * | 6/1998 | Wical .......................... 707/102 |
| 5,813,009 A | | 9/1998 | Johnson et al. ............. 707/100 |
| 5,895,446 A | | 4/1999 | Takeda et al. .................. 704/2 |
| 5,950,214 A | | 9/1999 | Rivette et al. .................. 707/3 |
| 5,956,705 A | | 9/1999 | Stevens et al. ................. 707/3 |
| 5,956,734 A | | 9/1999 | Schmuck et al. ........... 707/205 |
| 5,970,490 A | | 10/1999 | Morgenstern ................ 707/10 |
| 6,061,675 A | * | 5/2000 | Wical ........................... 706/45 |
| 6,070,160 A | * | 5/2000 | Geary ............................ 707/4 |
| 6,105,022 A | * | 8/2000 | Takahashi et al. .............. 707/3 |
| 6,226,632 B1 | * | 5/2001 | Takahashi et al. .............. 707/3 |
| 6,389,413 B2 | * | 5/2002 | Takahashi et al. .............. 707/3 |

OTHER PUBLICATIONS

International Standard ISO 8879, Information Processing—Text and Office Systems—Standard Generalized Markup Language (SGML), First Edition, 1986, pp. 1–155.

Overlapping B+trees for temporal data by Manolopoulos et al, Information Technology 1990, proceedings of the 5th Jerusalem Conference, pp. 248–253.

Multi–mode indices for effective image retrieval in multi systems by Cha et al, IEEE Intern'l Conference Multimedia computing systems, pp. 152–159.

New access index for fast execution of conjuctive queries over text data by Yang et al, Ohio University, Database Engineering and Applications, pp. 248–253.

* cited by examiner

```
<!ELEMENT THESIS          (TITLE, AUTHOR, DATE,
                           BODY, BIBLIOGRAPHY)>

<!ELEMENT TITLE           (#PCDATA)>
<!ELEMENT AUTHOR          (NAME +)>
<!ELEMENT NAME            (#PCDATA)>
<!ELEMENT DATE            (#PCDATA)>

<!ELEMENT BODY            (CHAPTER*)>
<!ELEMENT CHAPTER         (CTITLE, (PARA|NOTE)*,
                           SECTION*)>
<!ELEMENT C-TITLE         (#PCDATA)>
<!ELEMENT SECTION         (S-TITLE, (PARA|NOTE)*,
                           SUBSECTION*)>
<!ELEMENT S-TITLE         (#PCDATA)>
<!ELEMENT SUBSECTION      (SS-TITLE, (PARA|NOTE)*)>
<!ELEMENT SS-TITLE        (#PCDATA)>
<!ELEMENT PARA            (#PCDATA|EMPHASIS)*>
<!ELEMENT NOTE            (#PCDATA|EMPHASIS)*>
<!ATTLIST NOTE
          TYPE       (INFO|COMMENT)    INFO>
<!ELEMENT EMPHASIS        (#PCDATA)>
<!ELEMENT BIBLIOGRAPHY
                          (LITERATURE+)>
<!ELEMENT LITERATURE      (TITLE, AUTHOR, SOURCE)>
<!ELEMENT SOURCE          (#PCDATA)>
```

*FIG. 4*

```
<!DOCTYPE THESIS SYSTEM "THESIS.DTD">
<THESIS>
<TITLE>DEVELOPMENT OF AN SGML DOCUMENT TRANSFOMATION
LANGUAGE AND ITS APPLICATION </TITLE>
<AUTHOR>
<NAME>TORU TAKAHASHI</NAME>
<NAME>JUN'ICHI HIGASHINO</NAME>
<NAME>YUKIO HOSHI</NAME>
</AUTHOR>
<DATE>OCTOBER 23,1996</DATE>
<BODY>
<CHAPTER>
<C-TITLE>OVERVIEW</C-TITLE>
<PARA>BY USING SGML IN WRITING A DOCUMENT,...</PARA>
<PARA>A CREATED SGML DOCUMENT UNDERGOES,...</PARA>...
</CHAPTER>...
<CHAPTER>
<C-TITLE>APPLICATION EXAMPLES</C-TITLE>
<SECTION>
<S-TITLE>BACKGROUND</S-TITLE>
<PARA>AT THE PRESENT TIME, THE ISO...</PARA>...
</SECTION>...
<SECTION>
<S-TITLE>EXAMPLES OF TRANSFORMATION PROCESSING</S-TITLE>
<SUBSECTION>
<SS-TITLE>FORMULA TRANSFORMATION</SS-TITLE>
<PARA>IN THE DTD FOR JIS STANDARDS, A FORMULA IS...</PARA>.
<NOTE TYPE=COMMENT>IN THE CASES OF MATRIXES...</NOTE>...
</SUBSECTION>...
</SECTION>
</CHAPTER>
</BODY>
<BIBLIOGRAPHY>
<LITERATURE>
<TITLE>A STUDY OF A SYSTEM FOR TRANSFORMING SGML INSTANCES</TITLE>
<AUTHOR><NAME>SATOSHI IMAGO</NAME>...</AUTHOR>
<SOURCE>49th NATIONAL CONFERENCE OF
INFORMATION PROCESSING SOCIETY OF JAPAN</SOURCE>
</LITERATURE>...
</BILIOGRAPHY>
</THESIS>
```

*FIG. 5*

| DOCUMENT IDENTIFIER | CONTEXT IDENTIFIER | CONTENT CHARACTER-STRING |
|---|---|---|
| D1 | C1 | "DEVELOPMENT OF AN SGML DOCUMENT..APPLICATION |
| | C2 | "TORU TAKAHASHI" |
| | C3 | "JUN'ICHI HIGASHINO" |
| | C4 | "YUKIO HOSHI" |
| | C5 | "OCTOBER 23, 1996" |
| | C6 | "OVERVIEW" |
| | C7 | "BY USING SGML IN WRITING DOCUMENT,..." |
| | C8 | "A CREATED SGML DOCUMENT UNDERGOES,..." |
| | C15 | "APPLICATION EXAMPLES" |
| | C16 | "BACKGROUND" |
| | C17 | "AT THE PRESENT TIME, THE ISO..." |
| | C129 | "EXAMPLES OF TRANSFORMATION PROCESSING" |
| | C130 | "FORMULA TRANSFORMATION" |
| | C131 | "IN THE DTD FOR JIS STANDARDS, A FORMULA IS..." |
| | C132 | "IN THE CASES OF MATRIXES..." |

*FIG. 14*

| TEXT IDENTIFIER | CONTEXT IDENTIFIER | REVERSED-ORDER CONTEXT IDENTIFIER | DESCRIPTIVE COMPLETE STRING OF CHARACTERS |
|---|---|---|---|
| D1 | C1 | -C351 | "DEVELOPMENT OF AN SGML-TEXT CONVERTING LANGUAGE AND ITS APPLICATIONS" |
| | C2 | -C350 | "TORU TAKAHASHI" |
| | C3 | -C349 | "JUNICHI HIGASHINO" |
| | C4 | -C348 | "YUKIO HOSHI" |
| | C5 | -C347 | "OCTOBER 23,1996" |
| | C6 | -C346 | "OVERVIEW" |
| | C7 | -C345 | "A CREATED SGML TEXT UNDERGOES A VARIETY OF--" |
| | C8 | -C344 | "BY USING THE SGML IN WRITING A TEXT,--" |
| | C15 | -C337 | "APPLICATION EXAMPLES" |
| | C16 | -C336 | "BACKGROUND" |
| | C17 | -C335 | "AT THE PRESENT TIME,IN THE ISO,---" |
| | C129 | -C223 | "EXAMPLES OF CONVERSION PROCESSING" |
| | C130 | -C222 | "FORMULA CONVERSION" |
| | C131 | -C221 | "IN THE DTD CONFORMING TO THE JIS STANDARDS, A FORMULA IS BASICALLY----" |
| | C132 | -C220 | "IN THE CASE OF A DETERMINANT, HOWEVER,---" |

FIG. 36

STRUCTURED-TEXT CATALOGING METHOD, STRUCTURED-TEXT SEARCHING METHOD, AND PORTABLE MEDIUM USED IN THE METHODS

This is a continuation application of U.S. Ser. No. 10/095,569, filed Mar. 13, 2002, now U.S. Pat. No. 6,535,875; which is a continuation application of U.S. Ser. No. 09/814,692, filed Mar. 15, 2001, now U.S. Pat. No. 6,389,413; which is a continuation application of U.S. Ser. No. 09/589,226, filed Jun. 8, 2000, now U.S. Pat. No. 6,226,632; which is a continuation application of U.S. Ser. No. 09/028,513, filed Feb. 23, 1998, now U.S. Pat. No. 6,105,022. This application is also related to U.S. Ser. No. 10/095,566, filed Mar. 13, 2002, now U.S. Pat. No. 6,434,551.

BACKGROUND OF THE INVENTION

1. Field of the Invention

The present invention relates generally to text cataloging and text searching in a text control system utilizing a computer. More particularly, the present invention relates to a method for cataloging a structured text in a set of structured texts, each of which has a logical structure, and a method for searching such a set of structured texts for specific text content at a high speed. The invention also relates to a portable medium used in the text cataloging and text searching methods.

2. Description of the Related Art

With the development of the information society making full-scale progress, the amount of electronically-prepared text-based information created by using an apparatus such as a word processor and a personal computer is increasing at an extraordinarily high pace. Under this circumstance, the demand to search a massive collection of cumulated electronically-prepared texts for desired information with a high degree of reliability is rising.

In response to the demand, technology for full-text searching has been developed in which full texts are cataloged in a computer system and treated as a database. Since the database is then searched for a specified string of characters (which is referred to hereafter as a "search term"), a keyword is not required, basically allowing a search operation to be carried out with no detection miss.

A text comprising logical structure elements that can be individually recognized can be treated as an object to be searched in a search operation. Such a text is referred to hereafter as a "structured text". An example of a structured text is a text described in SGML (Standard Generalized Markup Language (ISO 8879:1986)). In such a search operation, a condition regarding a logical structure is added to a list of search conditions, allowing a search operation with highly detailed search conditions to be carried out.

An example of a search system implementing a search operation specifying a structure condition is disclosed in Japanese Patent Laid-Open No. Hei 8-147311 (JP '311). In this structured-text searching method, when a text is cataloged, the original of the text is cataloged in a search database. Then, specific character strings representing the head and the end of each logical structure of the cataloged text original are detected to identify logical structures. At the same time, the text is divided into logical structures. The specific character strings representing the head and the end of each logical structure are referred to hereafter as a "front marker" and a "back marker", respectively.

In the case of an electronically prepared specification for a patent application, for example, the front and back markers detected as delimiters of the range of a logical structure called "Abstract of the Disclosure" are "<SDO ABJ>" and "</SDO>" respectively. The front and back markers are detected to cut out a text delimited thereby as a text of the logical structure. Other logical structures are cut out in the same way in order to divide the original text into logical structures.

Next, a condensed-text creating process is carried out on the original text of each of the resulting logical structures. In the case of the logical structure "Abstract of the Disclosure", for example, the original text is divided into phrase character strings, each of which comprises word units, and a mutual-inclusion relation among the phrase character strings is examined. Then, by eliminating a string of characters included in another phrase character string, a condensed text of the logical structure can be produced. By carrying out the same condensed-text creating process on other logical structures, a condensed text can be formed for each of the other logical structures. The condensed texts are then cataloged in a search database as a condensed-text file.

Then, the binary value "1" is set in a bit associated with the code of each character appearing in the text in order to create a character component table, which is also cataloged in the search database as a character component table file.

After the search database has been constructed in this way, text search processing is carried out as follows.

First, a specified search term is disassembled into character units. A text including all characters composing the search term is then extracted by referencing the character component table.

Then, a condensed-text file to be searched, which contains a logical structure specified as a search object, is selected among condensed-text files containing logical structures. By searching the character component table therein, only a condensed text of a text extracted by the operation to search the character component table can be selected as a search object. As a result, a text including the specified search term included in a specified logical structure can be extracted. If no positional relation in the text among a plurality of search terms is prescribed in a specified search condition equation, the search processing is ended. If such a positional relation is specified, on the other hand, the contents of sentences included in a text extracted as a result of the search of the condensed text are read. Only if all the specified search terms are found in the extracted text and, at the same time, the positional relation among the search terms satisfies the specified search condition equation, is the extracted text confirmed as the desired text.

As described above, the search method according to JP '311 allows a practical speed for a search operation to be maintained for a large-scale database and, at the same time, allows a search operation specifying a structure condition to be carried out.

According to the technology described in JP '311, a search operation specifying a certain structure condition can be carried out. With this structure specifying technique, however, a search operation satisfying a subtly specified structure condition cannot be carried out in some cases.

In the text cataloging/searching system provided by JP '311, the structure of a text to be cataloged is divided into sub-structures determined in advance, and a condensed-text file is created for each sub-structure. In a search operation, a file defining a relation associating the names of sub-structures and the names of condensed-text files is referenced to determine a set of condensed-text files to be searched. A search operation specifying a structure condition is then implemented by carrying out the search operation with only condensed-text files in the set treated as a search object.

In text cataloging/searching this system, at a stage of constructing a text database, the designer of the database predicts the structure conditions that are thought to be specified in search operations to be carried out in the future. Then, a text is divided into condensed-text files that allow search operations to be carried out in conformity with the predicted structure conditions. In consequence, however, a search operation that satisfies a structure condition which was not predicted when the database was constructed cannot be carried out.

For example, assume that a text is divided into two logical elements which are each referred to hereafter simply as "elements". Let the two elements be called "abstract" and "main body", respectively. Considering that the "main body" element is further divided into any arbitrary number of paragraphs which are each composed of the title of the paragraph and any arbitrary number of sections, if two condensed-text files for the "abstract" and "main body" elements are created and cataloged in a text database containing a set of texts organized into such a structure in a process of constructing the database, a search operation satisfying a structure condition stating: "Find a group of sentences in the title of a paragraph that includes a string of characters OO" cannot be carried out.

Instead of treating the "main body" element as a single condensed-text file, the title of each paragraph and the sections composing the element can each be treated as a condensed-text file, allowing a search operation satisfying the structure condition described above to be carried out. Even if such condensed files are provided, however, a search operation will not be able to keep up with structure conditions such as ones stating: "Find a group of sentences including a string of characters OO inside the first paragraph (which can be either the title of the first paragraph or a section in the first paragraph)," or "Find a group of sentences including a string of characters XX in the last section of a paragraph." In order to keep up with a structure condition including such a specification of a specific position of a search term, a condensed-text file needs to be provided separately in advance for the appearance of each paragraph and each section. In this case, not only does the number of condensed-text files provided for paragraphs and sections become extremely large because such paragraphs and sections can appear in an element in any arbitrary manner, but a search operation satisfying such a condition cannot be actually carried out because the method described in JP '311 is not provided with a means for associating a structure condition that includes any arbitrary specification of a position of appearance of a search term with a set of small condensed-text files resulting from finely disassembling each element.

It is thus impossible to include an order of appearance condition in the specification of a structure condition as described above, so that a search operation with a very detailed structure specification cannot be carried out.

SUMMARY OF THE INVENTION

It is thus an object of the present invention to solve the problems described above by providing a function for carrying out a search operation specifying a detailed and efficient structure.

In order to solve the problems described above, the present invention provides a text cataloging method that comprises:

(1) an already-analyzed-text data generating/cataloging step of cataloging already-analyzed-text data, which is obtained from an analysis of a logical structure of a text to be cataloged, in a text database;

(2) a structure-index creating step of creating a structure index by sequentially superposing logical structures of texts to be cataloged, one upon another, in the structure index in the same order as the chronological order in which the texts are cataloged, wherein a single metaelement is used for representing a group of elements in the texts having the same position of appearance in one of the texts and the same element type, a single piece of meta-character-string data is used for representing a group of pieces of character-string data in the texts having the same position of appearance in one of the texts, and a context identifier is assigned to each metanode composing a tree-like structure of the structure index for uniquely identifying the metanode, where "metanode" is a generic name for a metaelement and meta-character-string data;

(3) a structured-full-text-data generating step of generating structured-full-text data composed of definitions of associative relations between all pieces of character-string data included in already-analyzed-text data of each text to be cataloged, and context identifiers of pieces of meta-character-string data in the structure index used for representing the pieces of character-string data;

(4) a character-string-index updating step comprising the sub-steps of:

extracting partial character strings each having a predetermined character count, character-position information of the partial character strings in a text to be cataloged, a text identifier for uniquely identifying the text in a text database, and a context identifier of meta-character-string data representing character-string data including the partial character strings in a structure index from the character-string data included in each text to be cataloged;

generating structured-character-position information comprising the character-position information, the text identifier and the context identifier; and updating a character-string index by cataloging an associative relation between each of the partial character strings and the structured-character-position information in the character-string index.

In addition, the structured-text searching method provided by the present invention comprises:

(1) a structure-condition judging step of searching a structure index for a set of context identifiers satisfying a specified structure condition;

(2) a structured-character-position-information extracting step of extracting partial character strings, each of which has a predetermined character count, from a search term, and searching a character-string index for a set of pieces of structured-character-position information matching the partial character strings; and (3) an index searching step of searching the set of pieces of structured-character-position information for specific pieces of structured-character-position information that have context identifiers included in the set of context identifiers found at the structure-condition judging step, and that have a positional relation among the specific pieces of structured-character-position information matching the arrangement order of the partial character strings in the search term.

BRIEF DESCRIPTION OF THE DRAWINGS

FIG. 4 is a diagram showing an example of the DTD defining a logical structure of a text;

FIG. 5 is a diagram showing an example of a text written in SGML in accordance with the DTD shown in FIG. 4;

FIG. 14 is a diagram showing a format in which structured-full-text data is output by the structured-full-text-data generating program to a file in the first embodiment of the present invention;

FIG. 36 is a diagram showing the format in which structured-full-text data is output by the structured-full-text-data generating program to a file in the second embodiment of the present invention;

DESCRIPTION OF THE PREFERRED EMBODIMENTS

The present invention will become more apparent from a careful study of the following detailed description of some preferred embodiments with reference to accompanying diagrams.

First Embodiment

Figure 1:
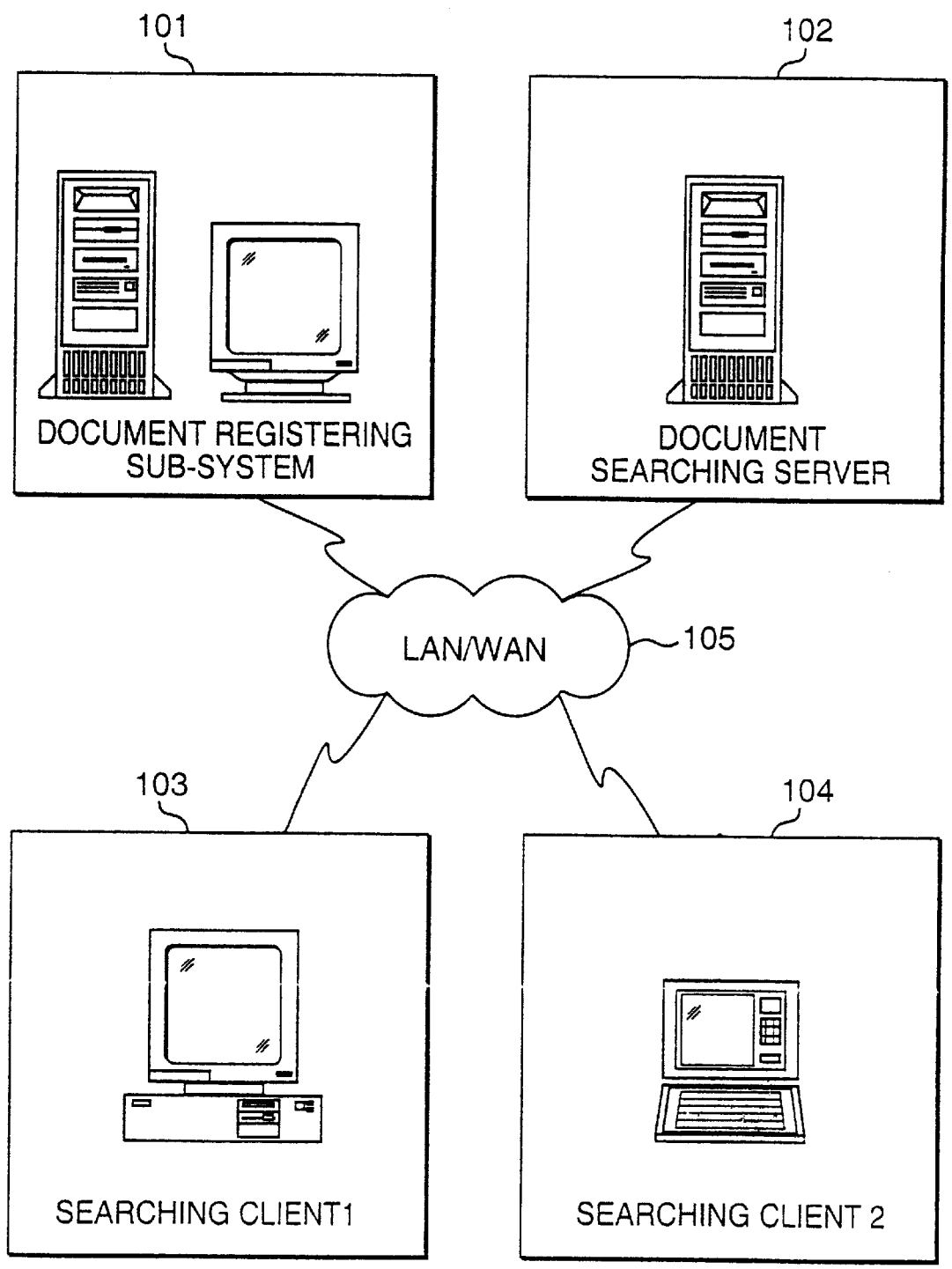
FIG. 1 is a diagram showing an overall configuration of a first embodiment implementing a text searching system provided by the present invention.

FIG. 1 is a diagram showing an overall configuration of a first embodiment implementing a text searching system provided by the present invention. As shown in this figure, the first embodiment comprises a text cataloging sub-system 101, a text searching server 102, text searching clients 103 and 104, and a network 105.

The text cataloging sub-system 101 analyzes the structure of each text supplied thereto as a search object and creates index data required in a search operation. The index data is transmitted to the text searching server 102 by way of the network 105 to be used by the text searching server 102 in structured-text search processing.

The text searching server 102 receives a search command from the text searching client 103 or 104, and searches a database for text contents matching a search condition specified in the command by using the index data created by the text cataloging sub-system 101. The data resulting from the search operation is transmitted to the text searching client 103 or 104 issuing the search command as a response to the command.

The text searching client 103 or 104 has a display screen on a display unit. The screen is used by the user for specifying a search condition in an interactive manner. The search condition specified by the user on the screen is converted into a search command that can be interpreted by the text searching server 102.

The search command is transmitted to the text searching server 102 by way of the network 105. Receiving the search command, the text searching server 102 carries out search processing in accordance with the search command as described earlier, and transmits the data resulting from the search operation to the text searching client 103 or 104 that issued the search command, as a response to the command. The text searching client 103 or 104 displays the data resulting from the search operation on a screen to the user.

As shown in FIG. 1, the present embodiment includes two computers serving as the text searching clients 103 and 104 respectively. It should be noted, however, that the configuration can also employ only one or more than two computers, each serving as a text searching client.

The network 105, which can be implemented by a local area network or a wide area network, is used for exchanging various kinds of data and commands among the text cataloging sub-system 101, the text searching server 102, and the text searching clients 103 and 104.

In the text cataloging and searching system shown in FIG. 1, index data is transmitted from the text cataloging sub-system 101 to the text searching server 102 by way of the network 105 as described above. It is also possible to have a configuration wherein a portable medium such as a floppy disk, an optical magnetic disk, or a writable optical disk is used for transferring index data from the text cataloging sub-system 101 to the text searching server 102 in place of the network 105. As an alternative, it is also possible to build a configuration wherein the text cataloging sub-system 101 and the text searching server 102 are implemented by a single computer so that no data transfers are needed between the text cataloging sub-system 101 and the text searching server 102.

In addition, in the configuration shown in this figure, the text searching clients 103 and 104 and the text searching server 102 are implemented by three separate computers. However, one or more text searching clients and the text searching server may be implemented by a single computer.

Figure 2:
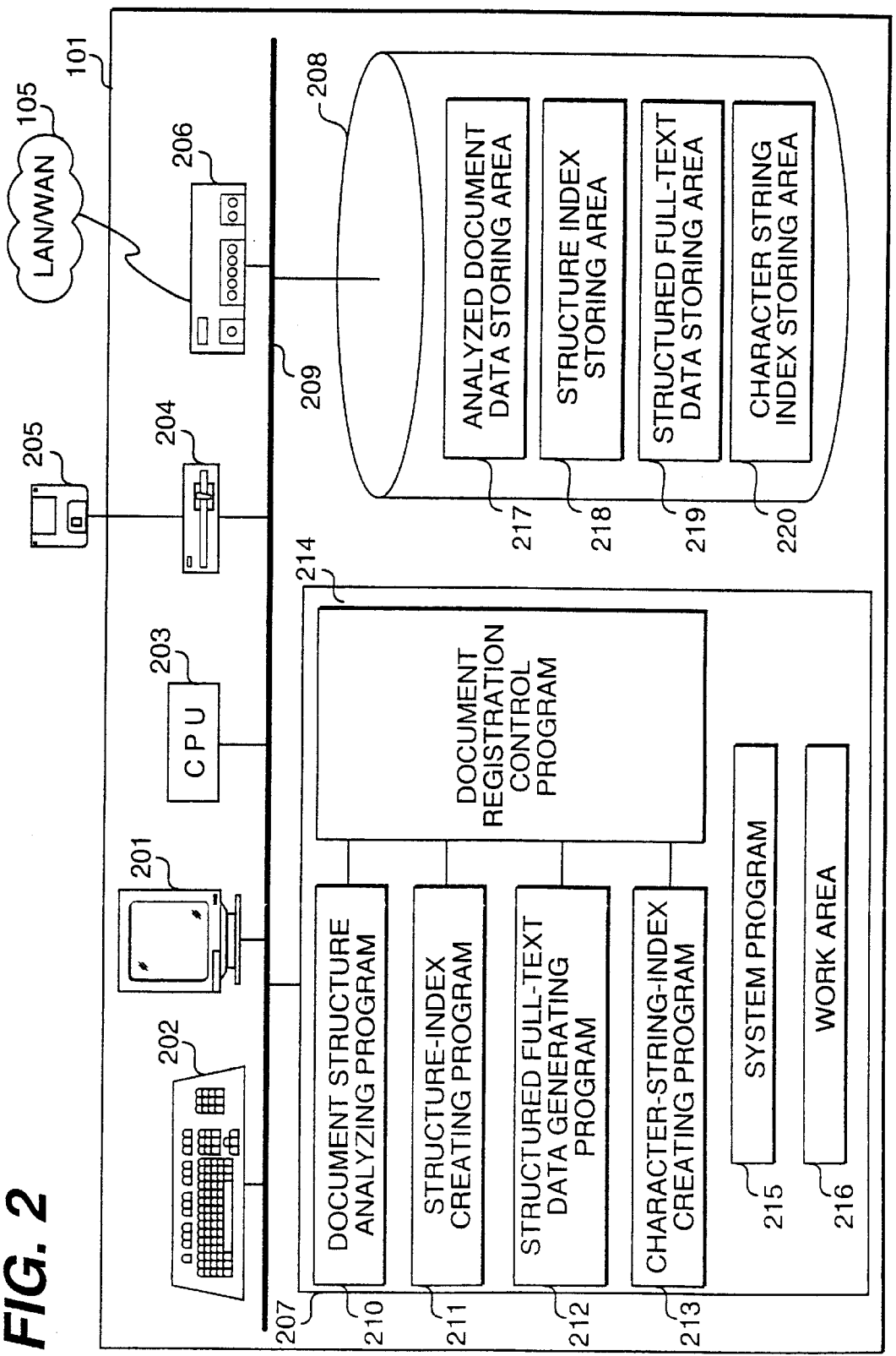
FIG. 2 is a diagram showing the configuration of a text cataloging sub-system implemented by the first embodiment of the present invention.

FIG. 2 shows the configuration of the text cataloging sub-system 101 implemented by the present embodiment.

As shown in this figure, the text cataloging sub-system 101 comprises a display unit 201, a keyboard 202, a central processing unit (CPU) 203, a floppy-disk drive 204, a floppy disk 205, a communication control apparatus 206, a main memory unit 207, a magnetic-disk drive 208, and a system bus 209.

The display unit 201 is used for displaying information such as an operating state of the text searching server 102, and the keyboard 202 is used for entering a command for requesting an operation, such as execution of processing to catalog a text. The central processing unit 203 executes a variety of programs constituting the functions of the text cataloging sub-system 101. The floppy-disk drive 204 is used for reading out and writing data from and into the floppy disk 205. The floppy disk 205 is used for storing a text to be cataloged in advance and for providing the text to the text cataloging sub-system 101.

The communication control unit 206 is used for communicating with the text searching server 102 through the network 105 in order to send a request to and receive data from the text searching server 102. The main memory unit 207 is used for storing a variety of programs to be executed for carrying out various processes of the text cataloging sub-system 101, and for holding data temporarily. The magnetic-disk drive 208 is used for storing cataloged text data and index data generated by the text cataloging sub-system. The system bus 209 is used for connecting the display unit 201, the keyboard 102, the central processing unit 203, the floppy-disk drive 204, the floppy disk 205, the communication control apparatus 206, the main memory unit 207, and the magnetic-disk drive 208 to each other.

Including also a work area 216, the main memory unit 207 is used for storing a text-structure analyzing program 210, a structure-index creating program 211, a structured-full-text-data generating program 212, a character-string-index creating program 213, a text-cataloging control program 214, and a system program 215. In the magnetic-disk drive 208, an already-analyzed-text-data storing area 217, a structure-index storing area 218, a structured-full-text-data storing area 219, and a character-string-index storing area 220 are preserved.

The text-structure analyzing program 210 retrieves a text to be cataloged, which is written in SGML, from the floppy disk 205, analyzes the logical structure of the text, generates already-analyzed-text data, and stores the already-analyzed-text data in the already-analyzed-text-data storing area 217. The structure-index creating program 211 catalogs information on a logical structure included in the already-analyzed-text data into a structure index stored in the structure-index storing area 218, updating the structure index.

The structured-full-text-data generating program 212 generates structured-full-text data for the text to be cataloged from the already-analyzed-text data, storing the structured-full-text data into the structured-full-text-data storing area 219. The character-string-index creating program 213 generates data representing an associative relation between each partial string of characters having a predetermined length and structured-character-position information for the partial string of characters from the structured-full-text data, and catalogs the data in a character-string index stored in the character-string-index storing area 220, updating the character-string index.

The text-cataloging control program 214 controls the activation and the execution of the text-structure analyzing program 210, the structure-index creating program 211, the structured-full-text-data generating program 212, and the character-string-index creating program 213. The text-cataloging control program 214 also transmits the already-analyzed-text data generated by the text-structure analyzing program 210, the structure index generated by the structure-index creating program 211, and the character-string index generated by the character-string-index creating program 213 to the text searching server 102 by way of the network 105. The system program 215 provides basic functions for executing the programs implementing the functions of the text cataloging sub-system 101 on the computer. These basic functions include functions for inputting and outputting data from and to peripheral devices. The work area 216 is used for storing data required temporarily in the execution of the programs.

As described above, the present embodiment has a configuration wherein a text to be cataloged is input from the floppy disk 205. However, it is also possible to build a configuration wherein another kind of portable medium, such as an optical magnetic disk or a writable optical disk, is used in place of the floppy disk 205. As an alternative configuration, a text to be cataloged can also be input through the network 105.

In addition, in the configuration of the present embodiment, the already-analyzed-text data generated by the text-structure analyzing program 210, the structure index generated by the structure-index creating program 211, and the character-string index generated by the character-string-index creating program 213 are transmitted to the text searching server 102 by way of the network 105. Instead of using the network 105, however, the present invention is also applicable to a configuration wherein a portable medium such as a floppy disk, an optical magnetic disk, or a writable optical disk can be used for transferring the information. As an alternative, it is also possible to build a configuration wherein the text cataloging sub-system 101 and the text searching server 102 are implemented by a single computer so that no data transfers are needed between the text cataloging sub-system 101 and the text searching server 102.

Next, a procedure for cataloging a text adopted in the present embodiment is explained.

Figure 3:
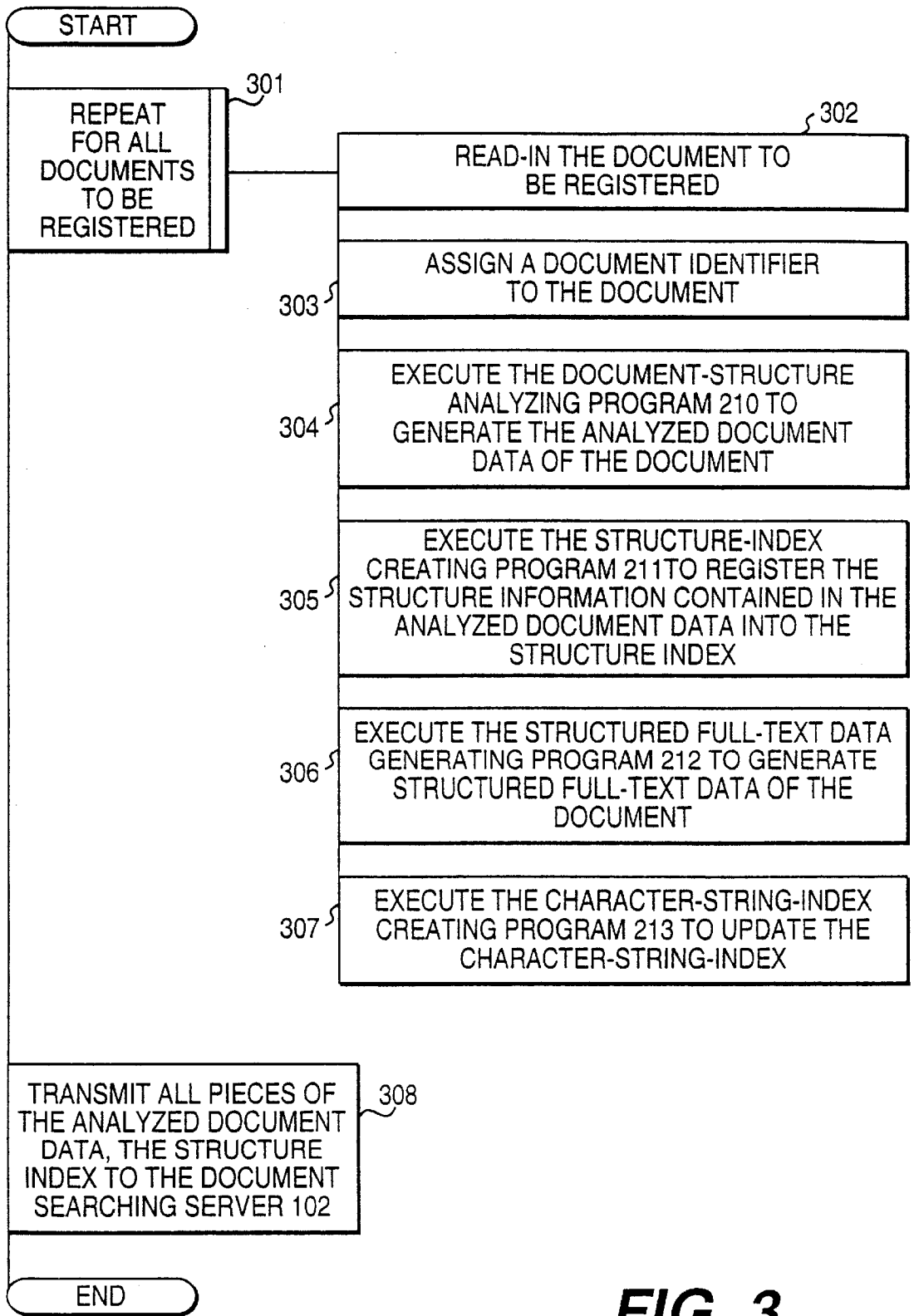
FIG. 3 is a PAD showing a procedure for cataloging a text adopted by the first embodiment of the present invention.

FIG. 3 is a PAD (Problem Analysis Diagram) showing a procedure for cataloging a text according to the first embodiment of the present invention. When the text-cataloging control program 214 is invoked by a cataloging requesting command entered via the keyboard 202, for example, the program examines whether texts to be cataloged exist in the floppy disk 205. If such texts exist, the program determines the number of such texts. At Step 301, a series of pieces of processing are carried out for all texts to be cataloged at Steps 302 to 307.

At Step 302, an unprocessed text to be cataloged is selected and retrieved from the floppy disk 205. At Step 303, a text identifier is assigned to the text to be cataloged, which has been retrieved at Step 302. A text identifier is a number used for uniquely identifying a specific text in a text database.

At Step 304, the text-structure analyzing program 210 is executed with the selected text to be cataloged serving as an input thereto. The text-structure analyzing program 210 generates already-analyzed-text data for the text to be cataloged, and stores the already-analyzed-text data in the already-analyzed-text-data storing area 217.

At Step 305, the structure-index creating program 211 is executed, using the already-analyzed-text data generated at Step 304 as an input thereto. First of all, the structure-index creating program 211 retrieves a current structure index from the structure-index storing area 218, cataloging structure information included in the already-analyzed-text data in the structure index in order to update the structure index. The updated structure index is then stored back in the structure-index storing area 218.

At Step 306, the structured-full-text-data generating program 212 is executed, using the already-analyzed-text data generated at Step 304 as an input thereto. The structured-full-text-data generating program 212 generates structured-full-text data for a text to be cataloged which has been retrieved at Step 303, by referencing the already-analyzed-text data, and stores the structured-full-text data in the structured-full-text-data storing area 219.

At Step 307, the character-string-index creating program 213 is executed by using the structured-full-text data generated at Step 306 as an input thereto. First of all, the character-string-index creating program 213 retrieves a current character-string index from the character-string-index storing area 220. The character-string-index creating program 213 then generates data representing an associative relation between each partial string of characters having a predetermined length and structured-character-position information for the partial string of characters from the structured-full-text data, and catalogs the data in the character-string index retrieved from the character-string-index storing area 220, updating the character-string index. The updated character-string index is then stored back in the character-string-index storing area 220.

After the series of pieces of processing of Steps 302 to 307 have been completed for all the texts to be cataloged, the text-cataloging control program 214 executes Step 308, ending the processing. At Step 308, the text-cataloging control program 214 transmits all pieces of already-analyzed-text data stored in the already-analyzed-text-data storing area 217, the structure index stored in the structure-index storing area 218, as well as the character-string index stored in the character-string-index storing area 220 to the text searching server 102 by way of the network 105.

The following is a description of details of the processing carried out at Step 304 of the procedure shown in FIG. 3, that is, a procedure carried out by the text-structure analyzing program 210.

The text-structure analyzing program 210 carries out structure-analysis processing on a text to be cataloged. The text is an object of processing which is written in SGML. In SGML, a logical structure common to a group of texts pertaining to a specific type is defined in a DTD (Document Type Definition) format. FIG. 4 is a diagram showing an example of the DTD. The DTD defines a logical structure of a text by defining a set of logical elements composing the text. The logical elements are each referred to hereafter simply as "elements". A portion delimited by a string of characters "<!ELEMENT" and the special character ">" is called an "element-type declaration". An element-type declaration prescribes a name and a structure of a group of elements of an element type. The name of such a group is referred to as an "element-type name". The string of characters on the left-hand side of an element-type declaration is an element-type name, whereas the portion on the right-hand side is a definition of the contents of the group of elements.

In the DTD shown in FIG. 4, the element-type declaration on the top line declares the element type ("thesis") and that a list of elements pertaining to this element type includes "title", "author", "date", "main text", and "list of references", prescribing that the element type has a structure wherein the elements pertaining to the element type are arranged with one element following another in the order enumerated on the list, with no repetition of the same element. In the element-type declaration on the top line, the list of elements includes a plurality of elements arranged in an order by delimiting one element from another by the special character comma (,) to indicate that the elements pertaining to the element type must appear in the same order in which the elements are enumerated on the list, with no repetition of the same element. These elements on the list are each declared as an element-type name in an element-type declaration that follows.

The contents of the element portion on the right-hand side of an element-type declaration of the element type "author" prescribe a structure comprising one or more repeated elements pertaining to the element type "name". Literally, the right-side portion comprises the element-type name "name" followed by the special character "+" to indicate that one or more elements pertaining to the element-type name "name" will appear.

The contents of the element portion on the right-hand side of an element-type declaration of the element type "main text" prescribe a structure comprising none or one or more repeated elements pertaining to the element type "chapter". Literally, the right-side portion comprises the element-type name "chapter" followed by the special character "*" to indicate that either none or one or more elements pertaining to the element-type name "chapter" will appear.

The contents of the element portion on the right-hand side of an element-type declaration of the element type "chapter" prescribe a structure comprising one element pertaining to the element type "title of the chapter" followed by either none or one or more repeated elements pertaining to the element type "comment" or "remark", and then followed by either none or one or more repeated elements pertaining to the element type "paragraph". The special character pipe ("|"), used as a delimiter between two element-type names in a description of an element, indicates that the element represented by the two element-type names sandwiching the special character "|" pertains to either of the two element types indicated by the two element-type names. In a word, the special character "|" has the same meaning as the word "or".

The contents of the element portion on the right-hand side of an element-type declaration of the element type "paragraph" prescribe a structure comprising one element pertaining to the element type "title of the paragraph" followed by either none or one or more repeated elements pertaining to the element type "comment" or "remark", and then followed by either none or one or more repeated elements pertaining to the element type "section".

The contents of the element portion on the right-hand side of an element-type declaration of the element type "section" prescribe a structure comprising one element pertaining to the element type "title of the section" followed by either none or one or more repeated elements pertaining to the element type "comment" or "remark".

The contents of the element portion on the right-hand side of an element-type declaration of the element type "list of references" prescribe a structure comprising one or more repeated elements pertaining to the element type "reference".

The contents of the element portion on the right-hand side of an element-type declaration of the element type "reference" declare a list of elements pertaining to this element type, including "title", "author", "date", and "description", with no repetition of the same element on the list, and by delimiting one element from another by the special character comma, prescribing that the element type "reference" has a structure wherein the elements pertaining to the element type are arranged with one element following another in the order in which they are enumerated on the list.

In addition, the contents of an element pertaining to the element type "title", "name", "date", "title of the chapter", "title of the paragraph", or "title of the section" is prescribed merely as "#PCDATA", indicating that the element is a lowest-level element which does not have a sub-structure. That is to say, the contents of the element are simply a string of characters. As for the element-type declaration of the element types "comment" and "remark", an element pertaining to either of these element types is either an element pertaining to an element type "emphasis" or has a structure simply comprising a string of characters. Since the declaration includes the special character "*", the element can be none or one or more repeated element types "emphasis" or character strings.

A portion delimited by a string of characters "<!ATTLIST" and the special character ">" in the DTD shown in FIG. 4 is called an attribute-list declaration. An attribute-list declaration defines an attribute common to a group of elements pertaining to the same element type. In the DVD shown in FIG. 4, elements pertaining to the element type "remark" have a common attribute "type". The value of the attribute "type" can be either "comparison" or "note". When not specified, a default value "references" is assumed.

An example of an SGML text written in accordance with the DTD shown in FIG. 4 is shown in FIG. 5. A portion delimited by a string of characters "<!DOCTYPE" and the special character ">" on the top line is called a text-type declaration for declaring the DTD followed in writing the SGML text and the element-type name of the element at the highest level. According to the prescription of the text-type declaration, the SGML text is written in accordance with a DTD stored in a file named "ronbun.dtd" and the element-type name of the element at the highest level is "thesis". Here, the DTD stored in the file named "ronbun.dtd" is shown in FIG. 4.

As shown in FIG. 5, by adding marks for indicating the start and end positions of each individual element of a text written in SGML, the structure of the text can be revealed clearly. The marks for indicating the start and end positions of an individual element are referred to as "start tags" and "end tags", respectively. A start tag preceding an element is the element-type name of the element put between the special characters "<" and ">". On the other hand, an end tag succeeding an element is the element-type name of the element sandwiched by a string of special characters "</" and the special character ">". If the element has an attribute, the name of the attribute can be prescribed in the start tag thereof after the name of the element type. The value of the attribute is prescribed after the name of the attribute by putting the equal sign "=" between the name and the value of the attribute. In the case of a start tag "<remark type=note>" shown in the SGML text of FIG. 5, for example, the name of the element type is "remark", the name of the attribute is "type", and the value of the attribute is "note". A portion prescribing a text structure by using these tags in an SGML text is called a text instance.

Figure 7:
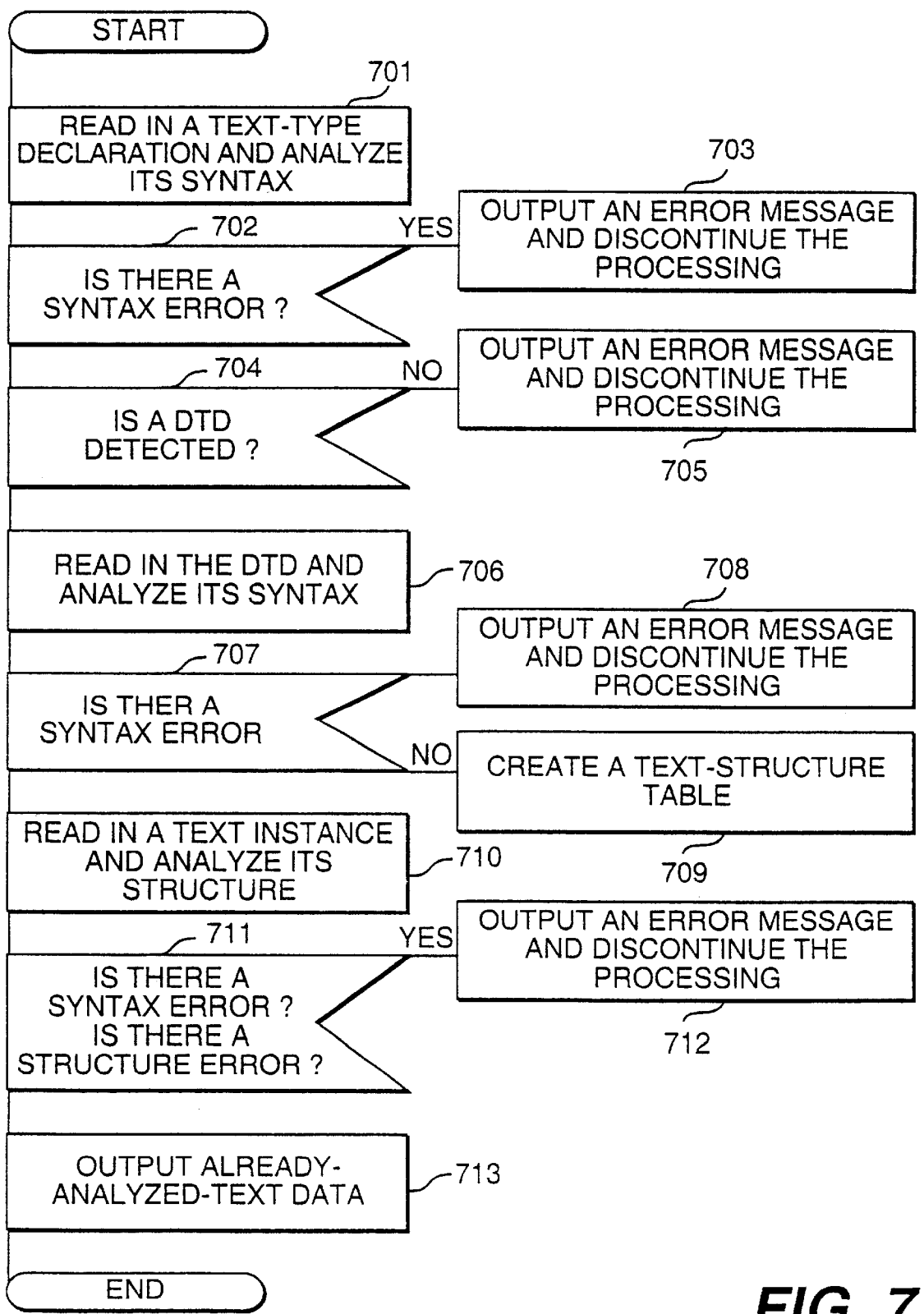
FIG. 7 is a PAD (Problem Analysis Diagram) showing details of the procedure carried out by a text-structure analyzing program provided by the first embodiment of the present invention.

FIG. 7 is a PAD showing details of the processing carried out at Step 304 of the procedure shown in FIG. 3, which is carried out by the text-structure analyzing program 210 of the present embodiment.

As shown in FIG. 7, the processing procedure begins with Step 701, at which, as the text-structure analyzing program 210 is activated to input a text to be cataloged written in SGML, the text-structure analyzing program 210 reads in a text-type declaration described at the head of the text and analyzes the syntax thereof. The flow then goes on to Step 702 to form a judgment as to whether a syntax error exists in the text-type declaration. If a syntax error is found, the flow proceeds to Step 703 to output an error message, terminating the processing.

If a syntax error is not detected in the text-type declaration, on the other hand, the flow continues to Step 704 to form a judgment as to whether a DTD file is specified in the text-type declaration. If a DTD file is not specified in the text-type declaration, the flow proceeds to Step 705 to output an error message, terminating the processing.

If a DTD file is specified in the text-type declaration, on the other hand, the flow continues to Step 706, at which the contents of the DTD file are retrieved and its syntax is analyzed. The flow then continues to Step 707 to form a judgment as to whether a syntax error exists in the DTD. If a syntax error is found, the flow proceeds to Step 708 to output an error message, terminating the processing. If a syntax error is not detected in the DTD, on the other hand, the flow continues to Step 709, at which a text-structure table, containing data describing a text structure model defined by the DTD, is generated in a memory.

The flow then goes on to Step 710 to read in a text instance while referencing the text-structure table in order to analyze the structure. As a result, already-analyzed-text data is generated. Then, the flow proceeds to Step 711 to form a judgment as to whether a text instance includes a syntax error or a structure error (that is, a deviation from the structure model defined by the DTD). If a syntax error or a structure error exists in the text instance, the flow continues to Step 712 to output an error message, terminating the processing. If a syntax error or a structure error is not found in the text instance, on the other hand, the flow continues to Step 713, at which the already-analyzed-text data (comprising a text identifier for identifying the text to be cataloged) and analysis results obtained from the structure analysis carried out at Step 710 were stored in the already-analyzed-text-data storing area 217, and the processing is ended.

As an example, the following describes a case in which the text-structure analyzing program 210 is executed with the SGML text of FIG. 5 used as a text to be cataloged and a DTD file named "ronbun.dtd" contains the DTD shown in FIG. 4. In this case, the text-structure table generated at Step 709 has a data structure like that shown in FIG. 8.

Figure 8:
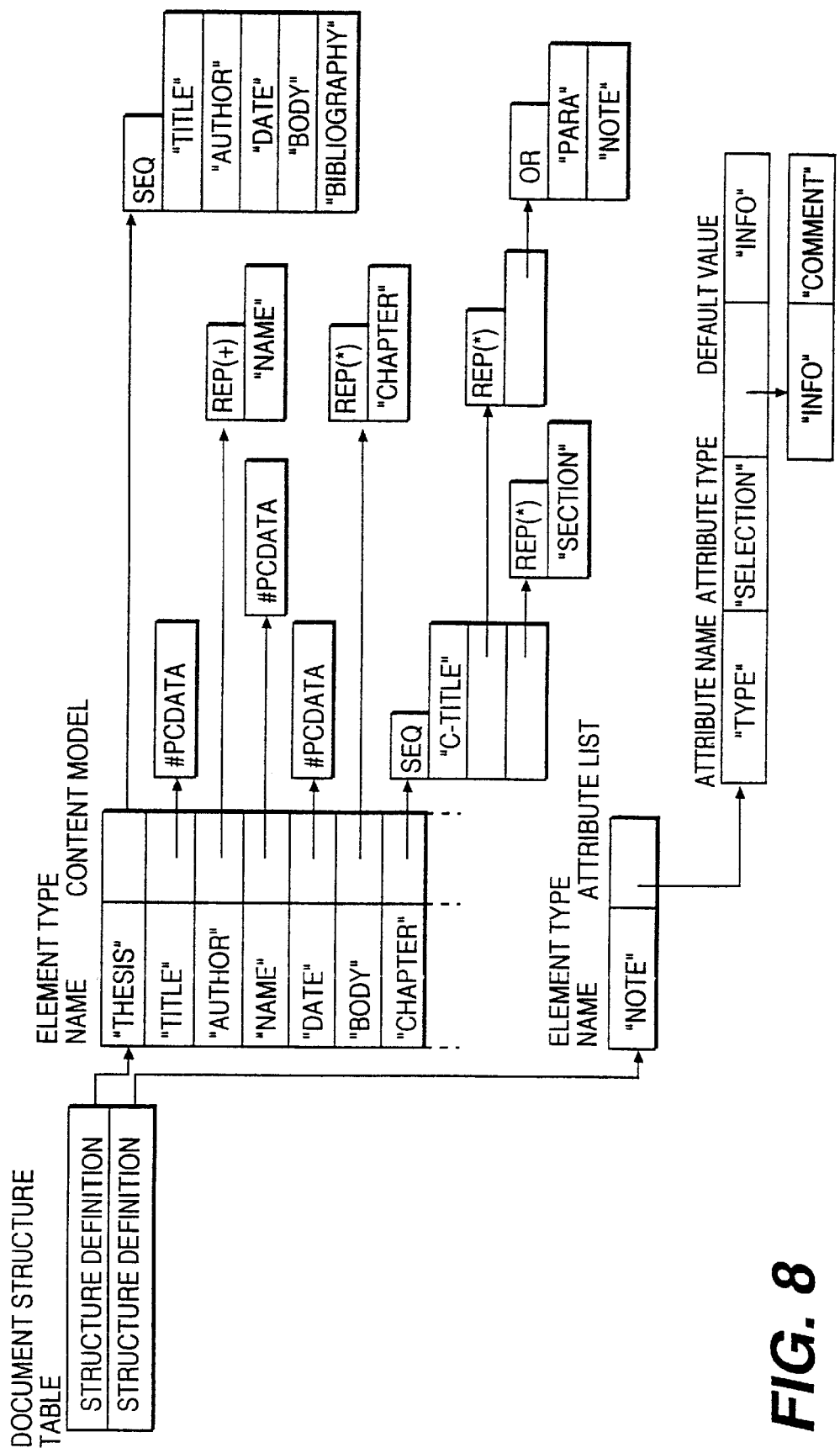
FIG. 8 is a diagram showing the data structure of a text-structure table.

As shown in FIG. 8, the text-structure table comprises two portions: a structure definition and an attribute definition. Associated with the element-type names of the element types composing the DTD, the structure definition defines a data model of possible contents of an element pertaining to each element type. Also associated with the element-type names of the element types composing the DTD, the attribute definition defines the name, the type of the value, and the default value of an attribute owned by an element pertaining to each element type. By referring to the structure definition, it is possible to form a judgment as to whether the order of arrangement and the hierarchical relation of a group of elements appearing in a text instance are correct (that is, to form a judgment as to whether a structure error exists), and to add information on tags and an attribute-value specification in case they have been omitted.

Figure 6:
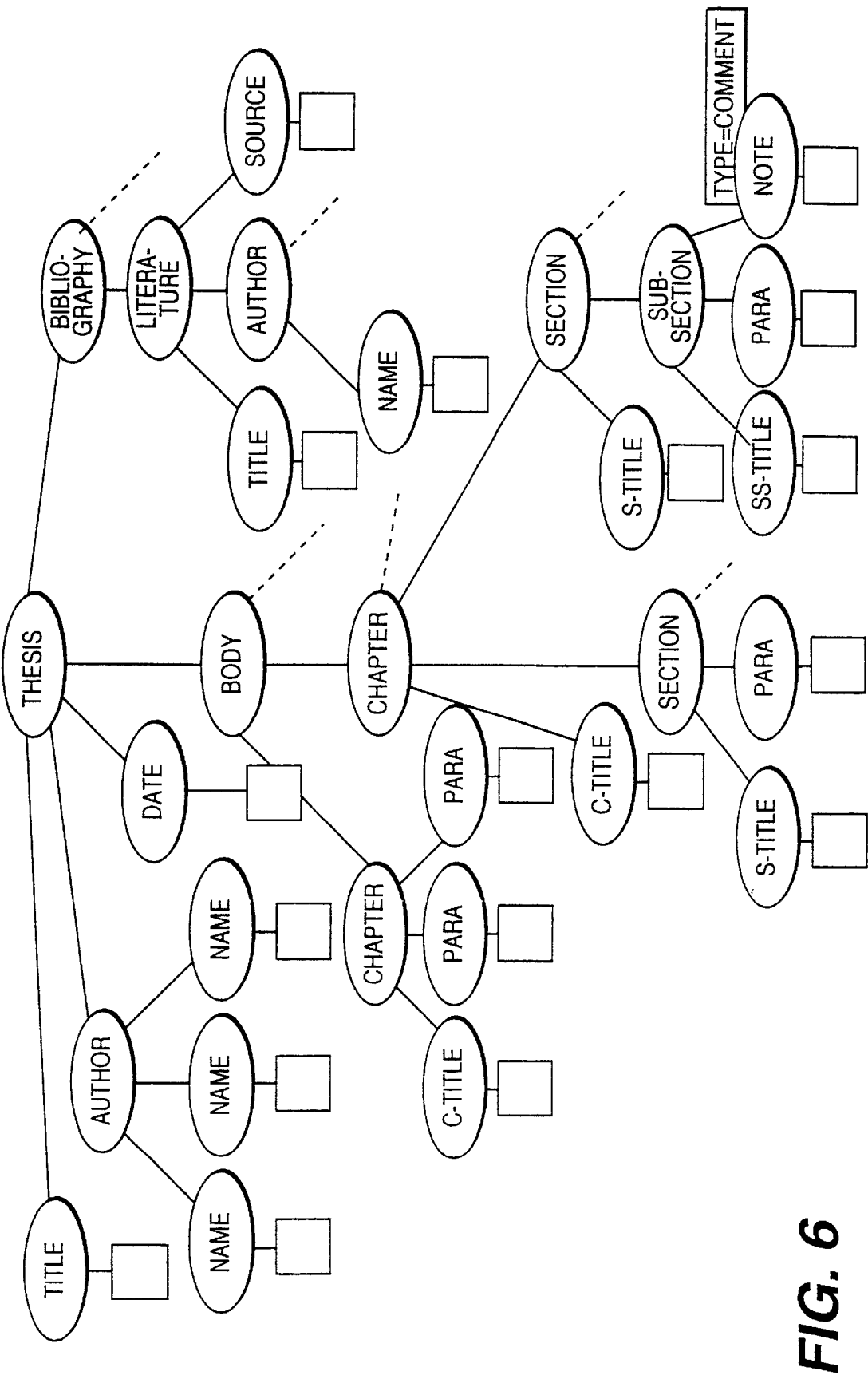
FIG. 6 is a model diagram showing diagrammatically the logical structure of the text written in SGML shown in FIG. 5.

With the text-structure analyzing program 210 executed with the SGML text of FIG. 5 used as the input text, to be cataloged and a DTD file named "ronbun.dtd" containing the DTD shown in FIG. 4, tree-like-structure data shown in FIG. 6 is obtained as already-analyzed-text data. FIG. 6 is a model diagram showing diagrammatically the logical structure of the text written in SGML as shown in FIG. 5. As shown in FIG. 6, the logical structure of a structured text can be regarded to have a tree-like structure with individual elements of the logical structure serving as intermediate nodes and pieces of character-string data serving as end nodes. In the tree-like structure shown in FIG. 6, an element is represented by an ellipse while a string of characters is shown as a rectangle.

In the embodiment described above, a structured text described in SGML is processed as a text to be cataloged. However, the present invention can also be applied to a configuration wherein a structured text described in another format such as an ODA (Open Document Architecture) is processed as a text to be cataloged.

Figure 9:
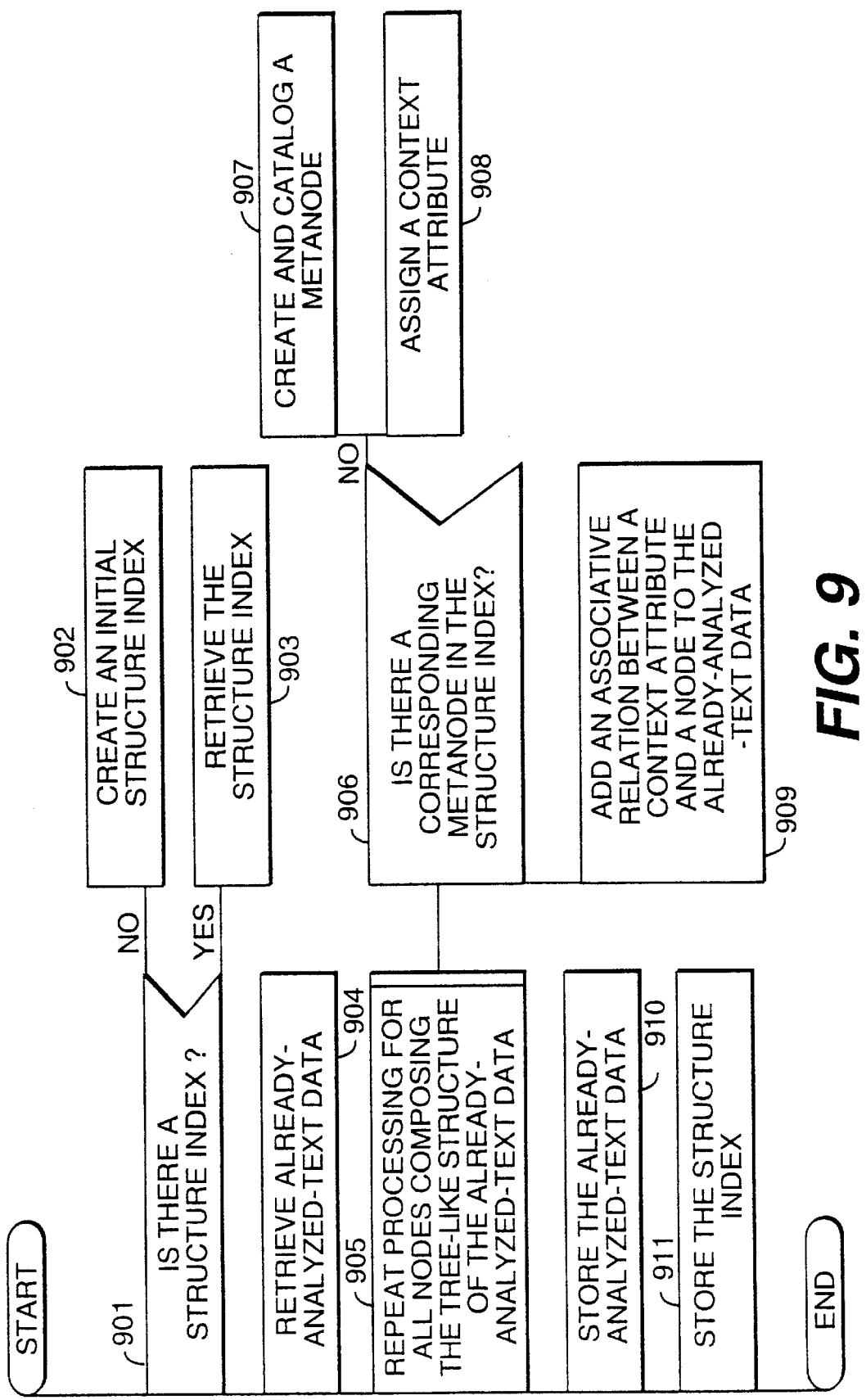
FIG. 9 is a PAD showing details of the procedure carried out by a structure-index creating program provided by the first embodiment of the present invention.

FIG. 9 is a PAD showing details of the processing carried out at Step 305 of the procedure shown in FIG. 3 (that is, a procedure carried out by the structure-index creating program 211 of the present embodiment).

As shown in FIG. 9, the processing procedure begins with Step 901, at which the structure-index creating program 211 forms a judgment as to whether a structure index already exists in the structure-index storing area 218. If no structure index exists in the structure-index storing area 218 yet, the flow goes on to Step 902, at which the structure-index creating program 211 creates an initial-state (or empty) structure index. If a structure index already exists in the structure-index storing area 218, on the other hand, the flow proceeds to Step 903, at which the structure-index creating program 211 retrieves the structure index from the structure-index storing area 218.

The flow then continues to Step 904, at which the structure-index creating program 211 retrieves the already-analyzed-text data of the text to be cataloged from the already-analyzed-text-data storing area 217.

Then, the flow goes on to Step 905, at which the structure-index creating program 211 searches the already-analyzed-text data for all nodes, that is, elements and pieces of character-string data, which form the tree-like structure of the already-analyzed-text data. Pieces of processing of Steps 906 to 909 are repeated with the each of the nodes treated as an object of processing.

At Step 906, the structure-index creating program 211 forms a judgment on a node of the already-analyzed-text data currently being processed (that is, a judgment as to whether a metanode associated with the node exists in the structure index). A metanode is either a metaelement or a piece of meta-character-string data. If a metanode associated with the node does not exist in the structure index, the flow goes on to Step 907, at which a metanode is created and cataloged in the structure index. The flow then proceeds to Step 908, at which a context identifier is assigned to the cataloged metanode. A context identifier is a number used for uniquely identifying a metanode in the structure index. Then, the flow continues to Step 909, at which the structure-index creating program 211 adds an associative relation between a node in the already-analyzed-text data currently being processed and the context identifier uniquely identifying the cataloged metanode in the structure index associated with the node to the already-analyzed-text data, updating the already-analyzed-text data.

After Steps 906 to 909 have been repeated for all nodes, the flow continues to Step 910, at which the updated already-analyzed-text data is output and stored in the already-analyzed-text-data storing area 217. Then, the flow proceeds to Step 911, at which the updated structure index is output and stored in the structure-index storing area 218, and the structure-index creating program 211 ends the processing.

Figure 10:
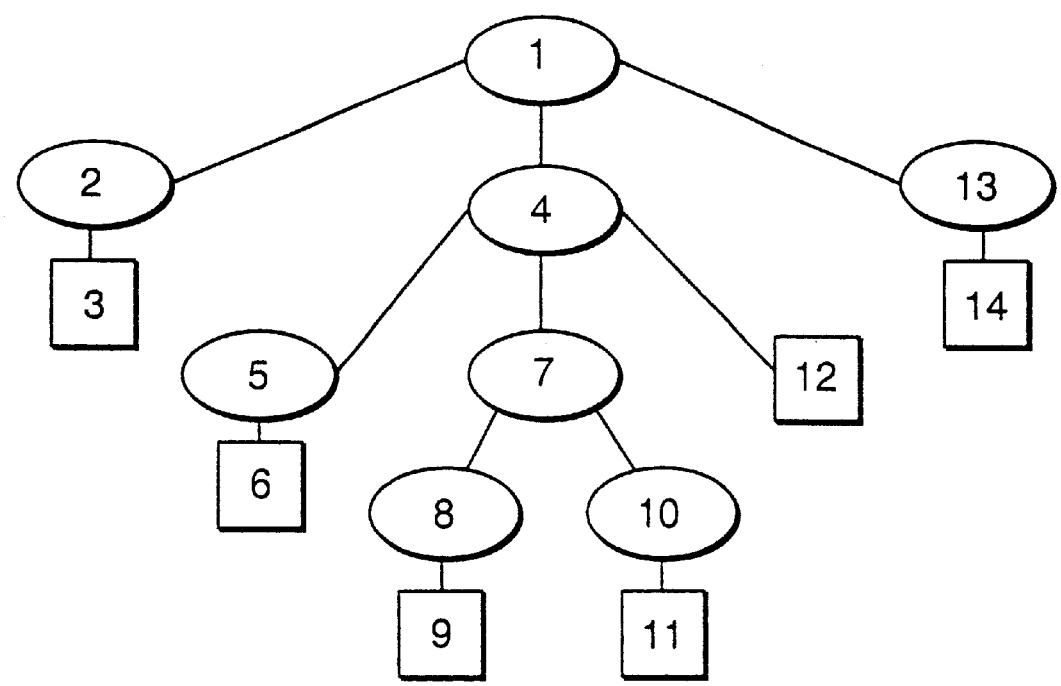
FIG. 10 is a diagram showing an order of tracing already-analyzed-text data in the first embodiment of the present invention.

When carrying out the pieces of processing at Steps 906 to 909 repeatedly, by treating each node composing the tree-like structure of the already-analyzed-text data as an object, the individual nodes of the tree-like structure are processed by tracing the tree-like structure in an order to be explained by referring to FIG. 10.

In this figure, an ellipse represents an element node, whereas a rectangle represents a character-string node. If a node has a plurality of lower-level nodes directly subordinate to the node, the lower-level nodes are represented by arranging them from the left to the right in the order in which they appear in the already-analyzed-text data. A number shown inside a node is a processing order number of the node. As shown in this figure, the order in which a group of nodes are processed at Steps 906 to 909 starts with a node located at the root of the tree-like structure. In addition, the order of processing of a specific node and a group of lower-level nodes directly subordinate to the specific node starts with the specific node, to be followed by processing of the lower-level nodes in the order they appear in the tree-like structure, beginning with the left-most directly subordinate node.

Figure 11:
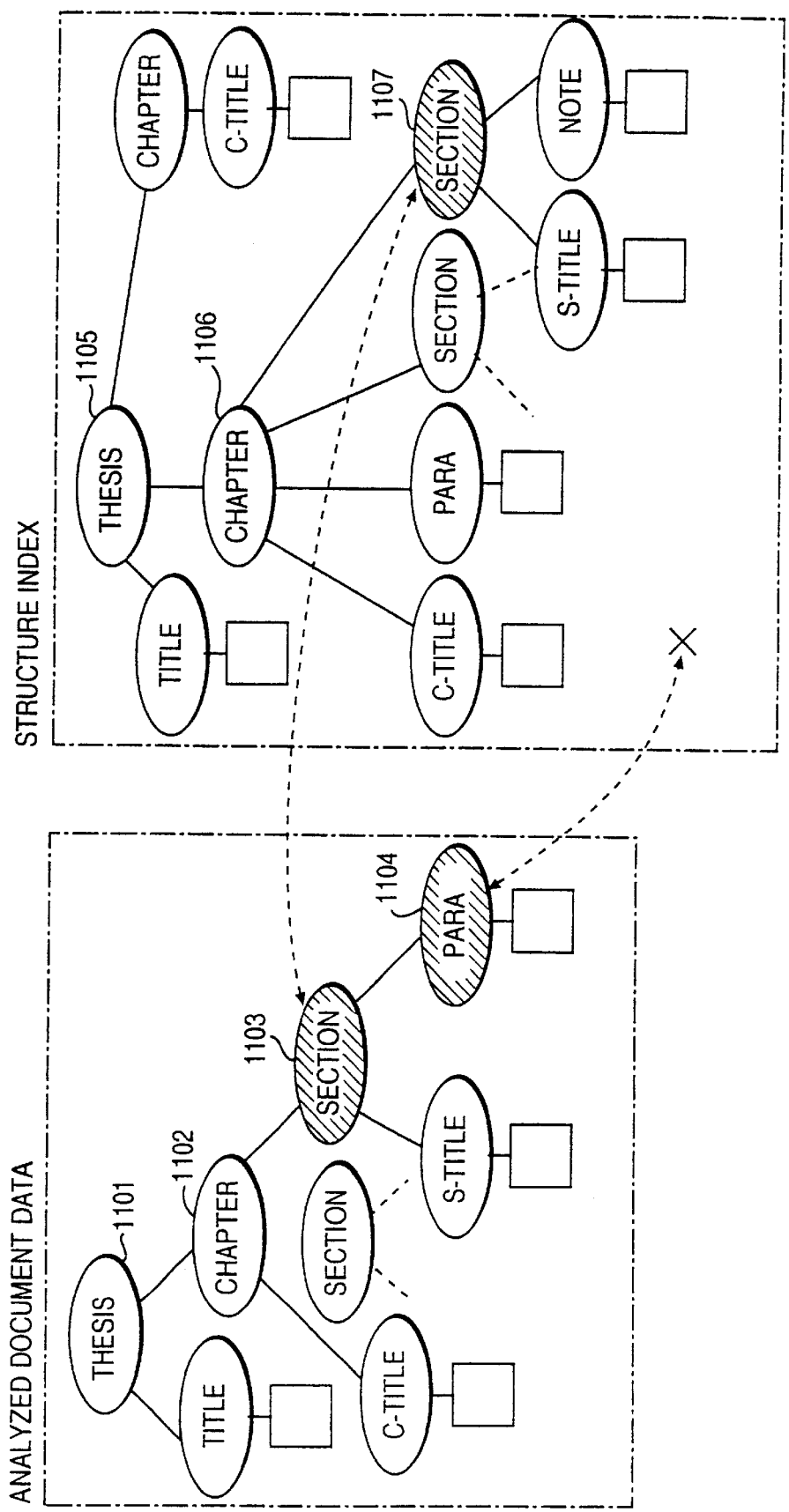
FIG. 11 is a diagram showing an associative relation between a group of nodes composing the tree-like structure of already-analyzed-text data shown on the left-hand side of the figure and a group of nodes (strictly speaking, metanodes) composing the tree-like structure of a structure index for the already-analyzed-text data shown on the right-hand side of the figure, in the first embodiment of the present invention.

The following is a description of details of the processing carried out at Step 906 on a node of the already-analyzed-text data that is currently being processed to form a judgment as to whether a metanode associated with (or mutually corresponding to) the node exists in the structure index, with reference to FIG. 11. FIG. 11 is a diagram showing an associative relation between a group of nodes composing the tree-like structure of the already-analyzed-text data shown on the left-hand side of the figure, and a group of nodes (strictly speaking, metanodes) composing the tree-like structure of the structure index created for the already-analyzed-text data shown on the right-hand side of the figure.

Here, in the present embodiment, a node in already-analyzed-text data and a metanode in a structure index created for the already-analyzed-text data are defined to be associated with (or corresponding to) each other if the tree-like-structure address of the node in the tree-like structure of the already-analyzed-text data is the same as the tree-like-structure address of the metanode in the tree-like structure of the structure index created for the already-analyzed-text data. A tree-like-structure address of a particular node in a tree-like structure is a series of pairs of codes which are determined when tracing a path in the tree-like structure starting from the root of the tree-like structure and ending at the particular node in order of descending node level. Each pair of codes represents a node encountered in the traced path.

The first code in each pair indicates the type of the node. More particularly, the first code indicates whether the node is an element or a piece of character-string data and, if the node is an element, the first code also indicates the type of the element. The second code in each pair is an appearance-order number of the node in a tree-like structure among brother nodes, which are nodes pertaining to the same type in the tree-like structure. The pairs of codes are arranged in the same chronological order in which the respective nodes are encountered along the traced path. A tree-like-structure address of a metanode in the tree-like structure of a structure index is defined in the same way as a node in the tree-like structure of already-analyzed-text data.

A group of nodes composing the already-analyzed-text data shown on the left-hand side of FIG. 11 can be taken as an example from which the tree-like-structure addresses of some nodes in the tree-like structure can be found. As shown in this figure, a node 1101 in the group is the root node in the tree-like structure which does not have a node directly superordinate thereto.

The tree-like-structure address of a node 1104 is found by tracing the tree-like structure of the already-analyzed-text data, starting from the root node 1101. Since the node 1101 is a first one among brother nodes pertaining to the an element node "thesis", the tree-like-structure address of the node 1101 is "/thesis[1]". Tracing the tree-like structure further, a node 1102 is found directly subordinate to the node 1101. In addition, the node 1102 is a first one among brother nodes pertaining to the element node "chapter". Thus, the tree-like-structure address of the node 1102 is "/thesis[1]/chapter[1]".

By the same token, the tree-like-structure address of a node 1103 can be described as "/thesis[1]/chapter[1]/paragraph[2]". This is because the node 1103 is directly subordinate to the node 1102 and a second one among brother nodes pertaining to the an element node "paragraph". Likewise, the tree-like-structure address of a node 1104 can be described as "/thesis[1]/chapter[1]/paragraph[2]/comment[1]". This is because the node 1104 is directly subordinate to the node 1103 and a first one among brother nodes pertaining to the an element node "comment".

Tree-like-structure addresses of metanodes composing the tree-like structure of the structure index shown on the right-hand side of FIG. 11 are found in the same way as nodes in the already-analyzed-text data on the left-hand side of the figure as follows. The tree-like-structure address of a metanode 1105 is "/thesis[1]" which is the same as that of the node 1101. Similarly, the tree-like-structure address of a metanode 1106 is "/thesis[1]/chapter[1]" which is the same as that of the node 1102, and the tree-like-structure address of a metanode 1107 is "/thesis[1]/chapter[1]/paragraph[2]", which is the same as that of the node 1103. Thus, the metanodes 1105, 1106, and 1107 are judged to be associated with (or to mutually correspond to) the nodes 1101, 1102, and 1103, respectively, at Step 906 of the processing procedure shown in FIG. 9.

Since the structure index shown in FIG. 11 does not include a metanode that has the same tree-like-structure address as the node 1104 of the already-analyzed-text data, the node 1104 is judged not to have a metanode associated with (or mutually corresponding to) it in the structure index. Thus, a new metanode associated with the node 1104 is created and cataloged in the structure index at Step 907. A new metanode associated with (or mutually corresponding to) a node is cataloged in the structure index at Step 907 by adding the new metanode to the end of a group of metanodes directly subordinate to a higher-level metanode associated with (or mutually corresponding to) a higher-level node directly superordinate to the node, and assigning a type corresponding to the type of the node to the new metanode. Thus, in the case of the node 1104, a new metanode associated with the node 1104 is cataloged in the structure index at Step 907 by adding the new metanode to the end of a group of metanodes directly subordinate to the higher-level metanode 1107 associated with (or mutually corresponding to) the higher-level node 1103 directly superordinate to the node 1104, and assigning the type "comment" corresponding to the type of the node 1104 to the new metanode.

Figure 12:
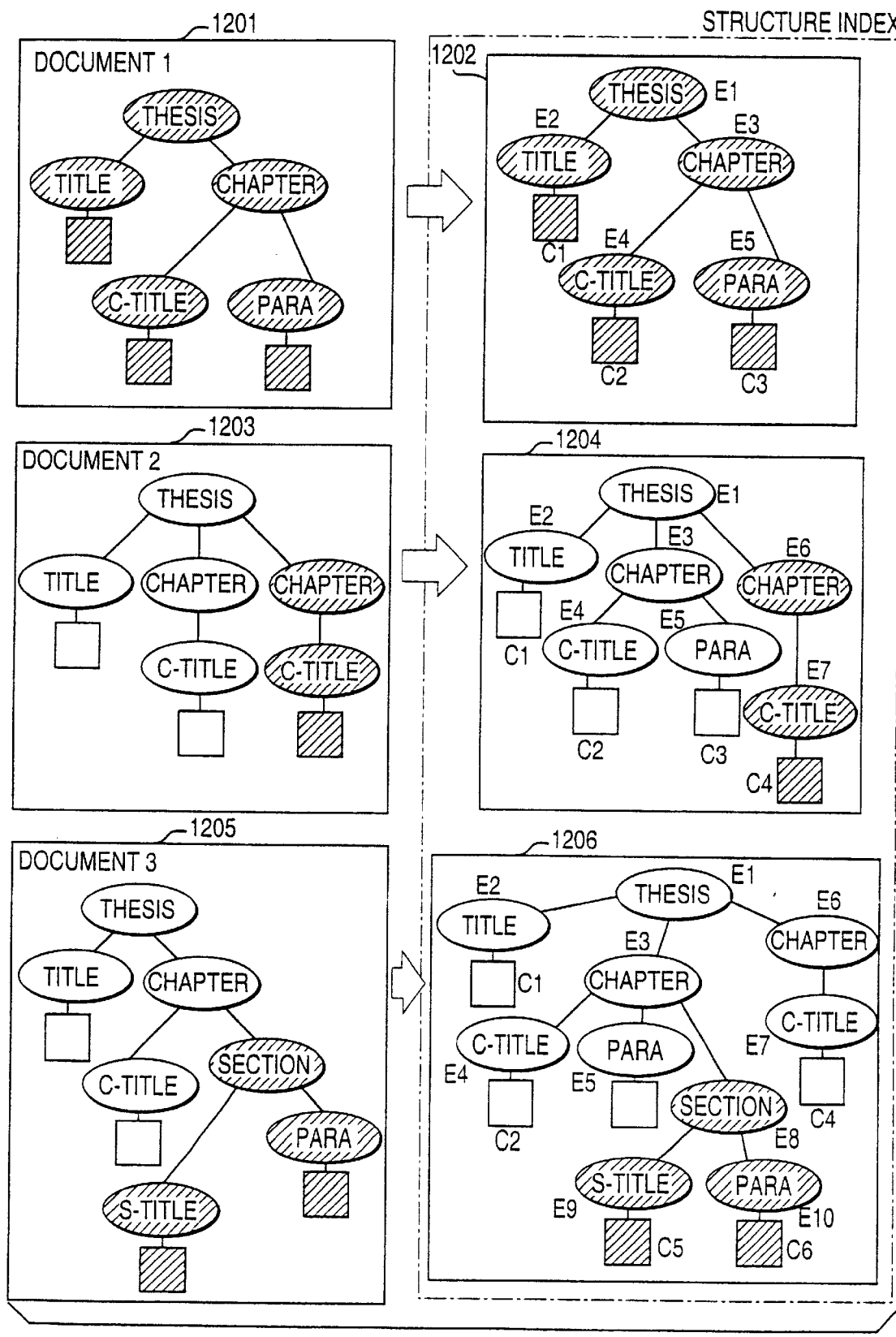
FIG. 12 is a diagram showing a process for developing a structure index by sequentially superposing a plurality of pieces of already-analyzed-text data one after another, in the first embodiment of the present invention.

The following is description of a process to develop a structure index by sequentially superposing a plurality of pieces of already-analyzed-text data one after another, with reference to FIG. 12. In this figure, reference numerals 1201, 1203, and 1205 each denote a piece of already-analyzed-text data of a text to be cataloged. The tree-like structures of the pieces of already-analyzed-text data are sequentially superposed one-by-one on the structure index, in the process of developing the structure index.

First of all, when the already-analyzed-text data 1201 of Text 1 is input at an initial stage, the structure index is in an initial (or empty) state. In this case, a tree-like structure equivalent to that of the already-analyzed-text data 1201 is cataloged in the structure index, which has the state denoted by reference numeral 1202. At this time, context identifiers E1, E2, E3, E4, and E5 are assigned to metaelements that are newly created in the structure index 1202, whereas context identifiers C1, C2, and C3 are assigned to newly created pieces of meta-character-string data.

Next, when the already-analyzed-text data 1203 of Text 2 is input, nodes in the tree-like structure of the already-analyzed-text data 1203 overlapping those of the existing structure index 1202 are not processed. In other words, only nodes in the tree-like structure of the already-analyzed-text data 1203 that have no mutually corresponding metanodes in the existing structure index 1202 (that is, only hatched nodes in the tree-like structure of the already-analyzed-text data 1203) are newly cataloged in the structure index 1202. At this time, context identifiers E6 and E7 are assigned to newly-cataloged metaelements in the structure index 1202, whereas a context identifier C4 is assigned to a newly-cataloged piece of meta-character-string data, resulting in the structure index state denoted by reference numeral 1204.

Similarly, when the already-analyzed-text data 1205 of Text 3 is then input, nodes in the tree-like structure of the already-analyzed-text data 1205 that overlap those of the existing structure index 1204 are not processed. In other words, only nodes in the tree-like structure of the already-analyzed-text data 1205 that have no mutually corresponding metanodes in the existing structure index 1204 (that is, only hatched nodes in the tree-like structure of the already-analyzed-text data 1205) are newly cataloged in the structure index 1204. At this time, context identifiers E8, E9, and E10 are assigned to newly-cataloged metaelements in the structure index 1204, whereas context identifiers C5 and C6 are assigned to newly-cataloged pieces of meta-character-string data. The structure index state 1206 results upon completion of the cataloging of the three pieces of already-analyzed-text data 1201, 1203, and 1205 has been completed.

Figure 13:
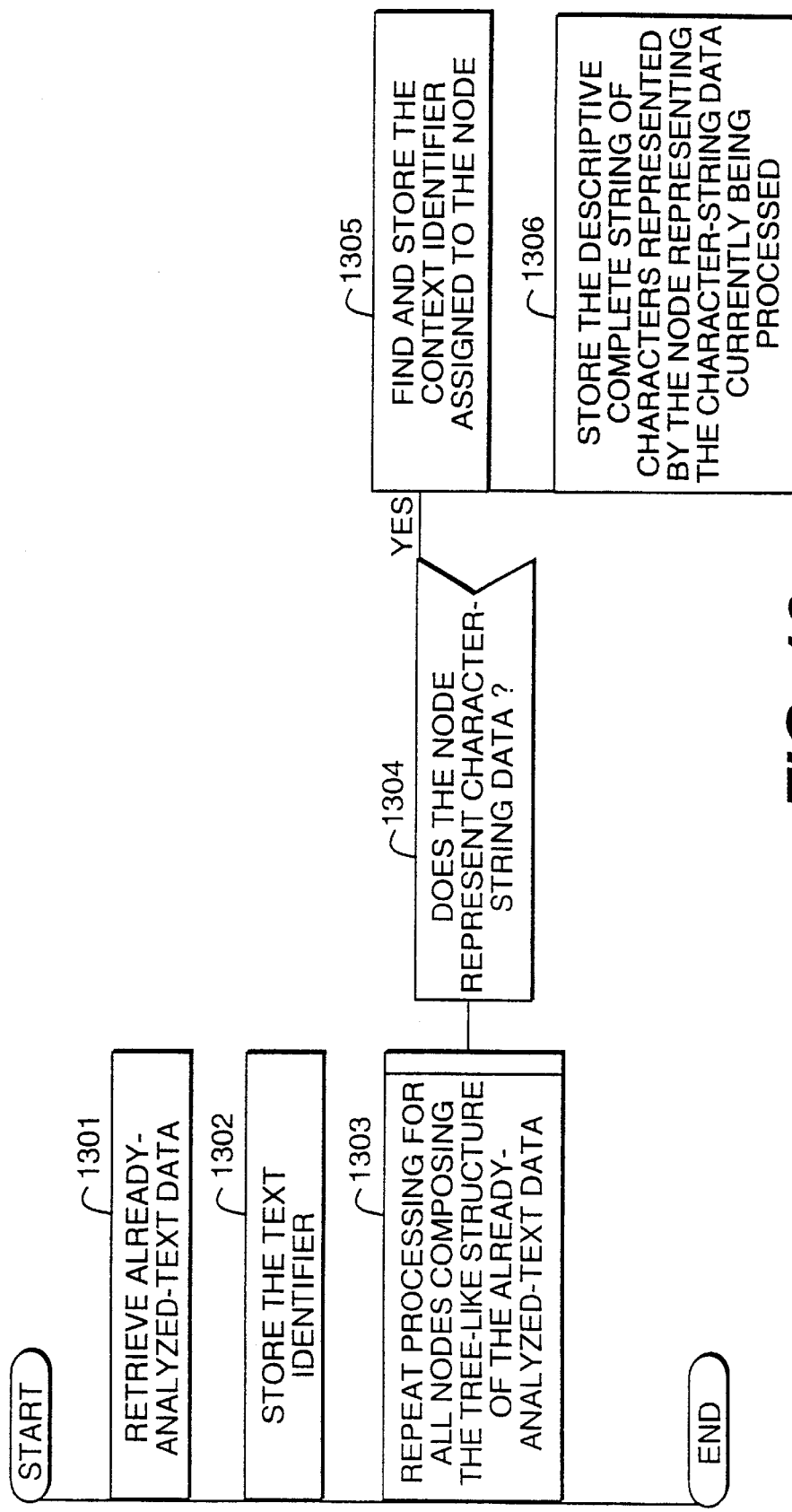
FIG. 13 is a PAD showing details of a procedure carried out by a structured-full-text-data generating program in the first embodiment of the present invention.

FIG. 13 is a PAD showing details of the processing carried out at Step 306 of the procedure shown in FIG. 3, that is, a procedure carried out by the structured-full-text-data generating program 212 of the present embodiment.

As shown in FIG. 13, the procedure begins with Step 1301, at which the structured-full-text-data generating program 212 retrieves the already-analyzed-text data of a text to be cataloged from the already-analyzed-text-data storing area 217.

The flow then goes on to Step 1302, at which a text identifier for identifying a text to be cataloged is output to the structured-full-text-data storing area 219.

Then, the flow proceeds to Step 1303, at which the structured-full-text-data generating program 212 searches the already-analyzed-text data for all nodes (that is, elements and pieces of character-string data) which form the tree-like structure of the already-analyzed-text data. Pieces of processing of Steps 1304 to 1306 are repeated, with each node treated as an object of processing.

At Step 1304, the structured-full-text-data generating program 212 forms a judgment as to whether a node of the already-analyzed-text data currently being processed is an element or character-string data. Only if the node of the already-analyzed-text data currently being processed is character-string data does the flow continue to Step 1305, at which a context identifier assigned to the character-string data currently being processed is found from the already-analyzed-text data and output to the structured-full-text-data storing area 219. The flow then goes on to Step 1306, at which a descriptive complete string of characters of the node representing the character-string data currently being processed is output to the structured-full-text-data storing area 219.

When the pieces of processing of Steps 1304 to 1306 have been repeated for all of the nodes, the structured-full-text-data generating program 212 ends.

FIG. 14 is a diagram showing a format in which structured-full-text data is output by the structured-full-text-data generating program 212 to a file. FIG. 14 exemplifies a case in which the structured-full-text data is generated from the SGML text shown in FIG. 5. As shown in FIG. 14, the format of the file for storing the structured-full-text data adopted in the present embodiment starts with a text identifier, followed repetitively by as many pairs of a context identifier and a descriptive complete string of characters associated with the context identifier as pieces of character-string data existing in the text.

For example, the text identifier D1 identifies a text to be cataloged by the structured-full-text data shown in FIG. 14, and a context identifier C5 is assigned to character-string data described as the contents of a "date" element shown in FIG. 5. These identifiers are each expressed by a symbol in FIG. 14 and in other diagrams for simplicity of explanation. It should be noted, however, that a text identifier is actually a number (strictly speaking, an integer) recorded in data for uniquely identifying a specific text among a group of texts to be cataloged, whereas an actually recorded context identifier is also a number (strictly speaking, an integer) for uniquely identifying a specific metanode among a group of metanodes composing a structure index.

Figure 15:
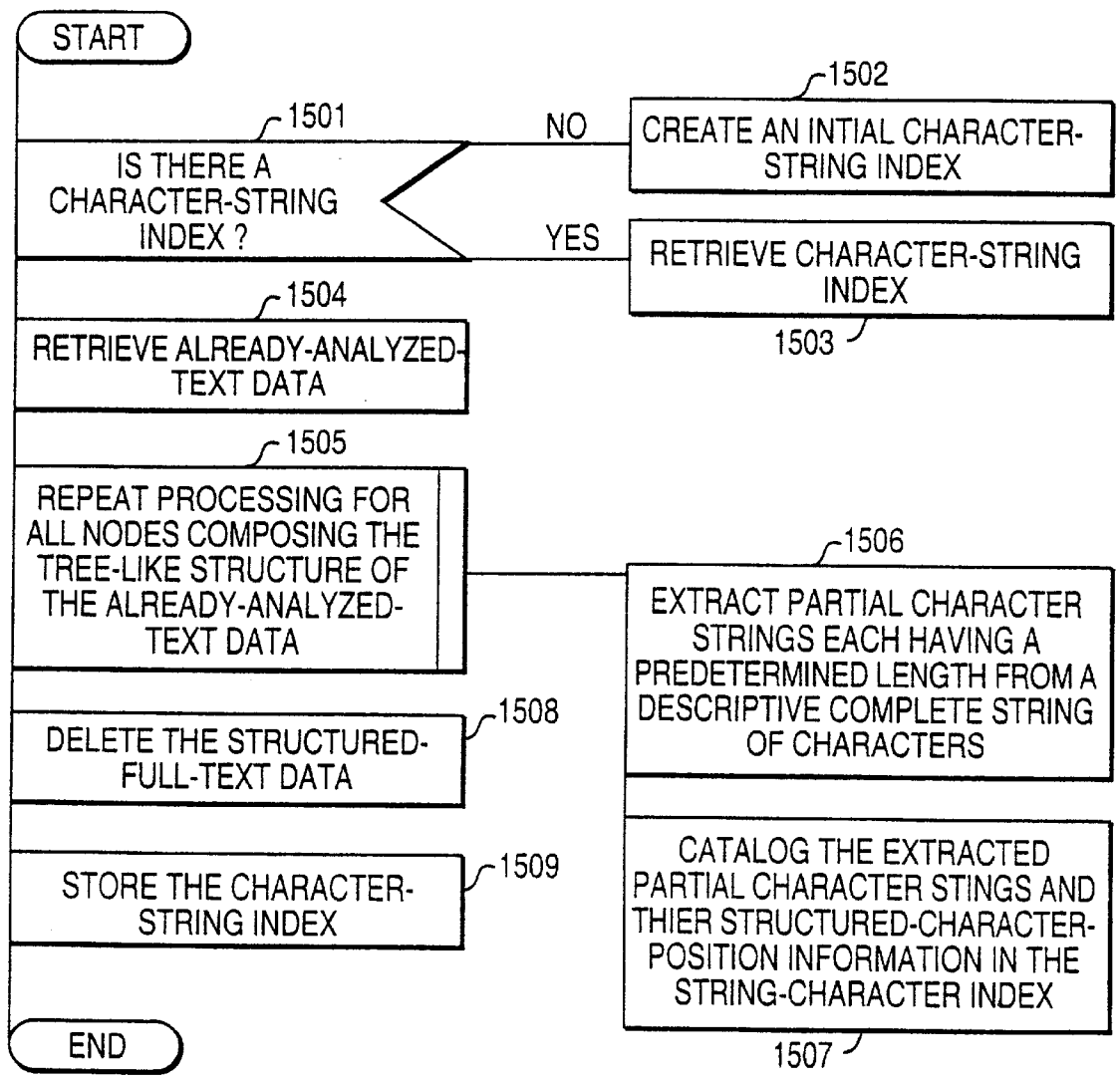
FIG. 15 is a PAD showing details of the procedure carried out by a character-string-index creating program in the first embodiment of the present invention.

FIG. 15 is a PAD showing details of Step 307 (FIG. 3), which is carried out by the character-string-index creating program 213 of the present embodiment.

At Step 1501, the character-string-index creating program 213 forms a judgment as to whether a character-string index already exists in the character-string-index storing area 220. If no character-string index exists yet in the character-string-index storing area 220, the flow goes on to Step 1502, at which the character-string-index creating program 213 creates an initial-state (or empty) character-string index. If a character-string index already exists in the character-string-index storing area 220, on the other hand, the flow proceeds to Step 1503, at which the character-string-index creating program 213 retrieves the character-string index from the character-string-index storing area 220.

The flow then continues to Step 1504, at which the character-string-index creating program 213 retrieves the structured-full-text data of the text to be cataloged from the structured-full-text-data storing area 219.

Then, the flow goes on to Step 1505, at which the character-string-index creating program 213 searches the structured-full-text data for all descriptive complete character strings. Pieces of processing of Steps 1506 and 1507 are repeated, with all descriptive complete character strings each being treated as an object of processing.

At Step 1506, the character-string-index creating program 213 extracts partial character strings, each of which has a predetermined length, from a descriptive complete string of characters in the structured-full-text data currently being processed. The flow then goes on to Step 1507, at which an associative relation between each of the partial character strings extracted at Step 1506 and structured-character-position information of the partial character strings is cataloged in the character-string index.

After the pieces of processing carried out at Steps 1506 and 1507 have been completed for all of the descriptive complete character strings, the flow proceeds to Step 1508 to delete and discard the structured-full-text data, which became no longer necessary, from the structured-full-text-data storing area 219. Then, the flow of the processing procedure continues to Step 1509, at which the updated character-string index is output and stored in the character-string-index storing area 220.

When a partial string of characters having a predetermined length is extracted from a certain descriptive complete string of characters at Step 1506, as described above, the number of characters to be extracted is determined by the length (the character count) of the partial string of characters to be extracted, which is determined in advance. A group of partial character strings, each having a character count determined in advance, is then extracted from the descriptive complete string of characters sequentially, one partial string after another. The extraction begins with a partial string of characters at the head of the descriptive complete string of characters, and proceeds while shifting the extracted position one character at a time, until the last partial string of characters of the descriptive complete string of characters is extracted. For example, considering a partial string having a length (character count) of 2 characters, and "an example of transformation" as the descriptive complete string of characters (the object to be processed) identified by a context identifier C129 from which a group of partial character strings each having the character count are to be extracted, 27 partial character strings can be extracted: "an", "n_", "_e", "ex", "xa", "am", "mp", "pl", "le", "e_", "_o", "of", "f_", "_t", "tr", "ra", "an", "ns", "sf", "fo", "or", "rm", "ma", "at", "ti", "io" and "on".

As for the end portion of a descriptive complete character string, the number of characters in the length of a partial string of characters (the character count), minus one, are further extracted. In the case of the descriptive complete string, "an example of transformation", the last character "n" is further extracted from the end portion thereof. When the extracted partial character strings extracted at Step 1506 are cataloged in the character-string index at Step 1507, an associative relation between each of the partial character strings and the structured-character-position information of the partial character strings showing the positions of the partial character strings in the descriptive complete string of characters, is also cataloged in the character-string index. Here, the structured-character-position information associated with a partial string of characters comprises the text identifier of a text including the partial character string, a context identifier identifying the descriptive complete string of characters including the partial character string (that is, identifying a position in the text of the character-string data including the partial string of characters), and a number identifying a position of the head character of the partial string of characters in the descriptive complete character string.

Figure 16:
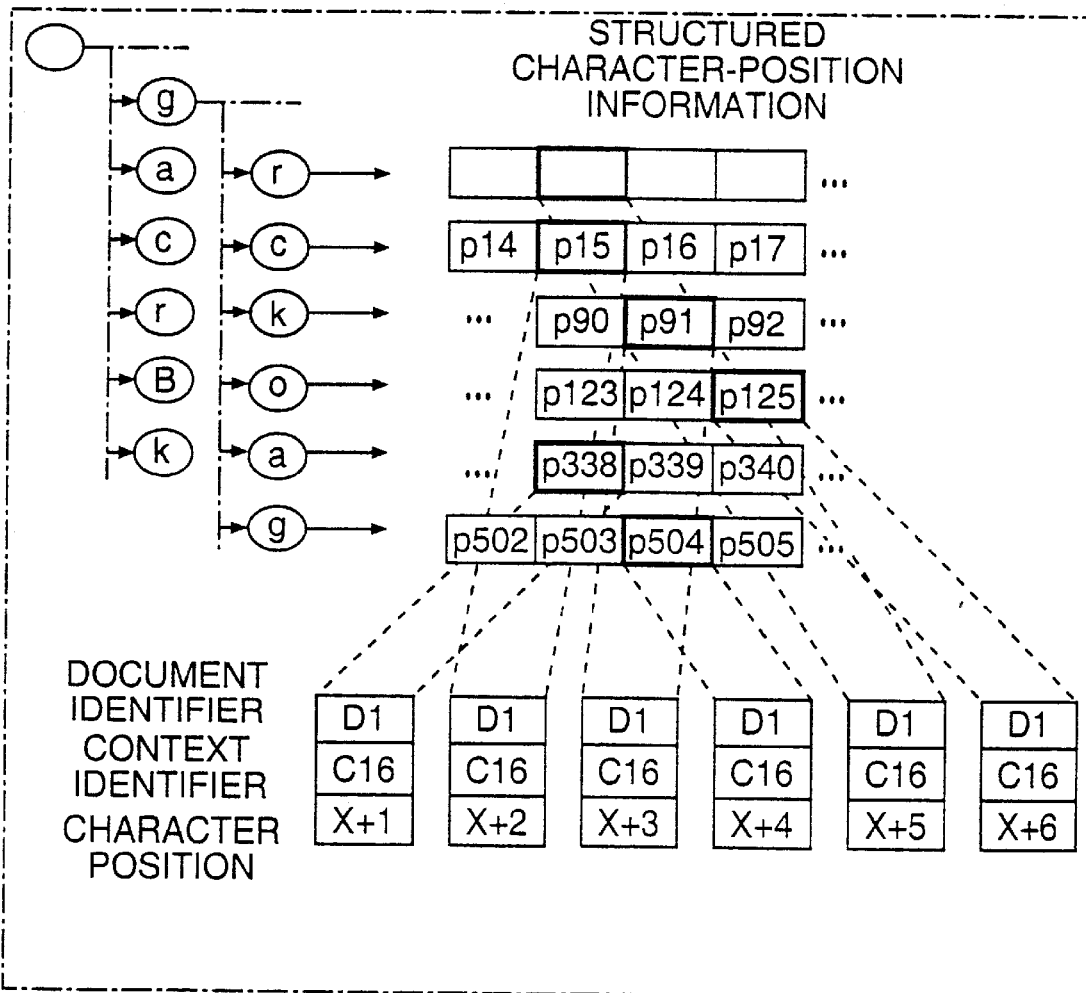
FIG. 16 is a diagram showing the data structure of a character-string index used in the first embodiment of the present invention.

FIG. 16 is a diagram showing the data structure of a character-string index used in the present embodiment. More particularly, FIG. 16 shows only a portion of the data structure of a character-string index, obtained at a stage where an operation to catalog a group of partial character strings included in the structured-full-text data into the character-string index has been completed, at the end of the processing of the structured-full-text data carried out by the character-string-index created program 213. The portion of the data structure of the character-string index corresponds to the descriptive complete string of characters "an example of transformation" described above. It should be noted, however, that the character node for the last character "n" of the descriptive complete string of characters and the structured-character-position information for the last character are omitted from the portion of the data structure of the character-string index shown in FIG. 16. In addition, the position of the head character of a partial string of characters in the descriptive complete string of characters is expressed as a position relative to X, the position of a character immediately preceding the descriptive complete character string.

As shown in FIG. 16, the character-string index is used for holding a list of pieces of appearance position information (that is, a list of pieces of the structured-character-position information described above) for each partial character string appearing in a text to be cataloged with a predetermined character count. As described above, each piece of structured-character-position information comprises a text identifier, a context identifier, and a number indicating the position of the head character in a partial character string. In order to increase the speed of searching the character-string index, the character-string index adopts a data structure in which, for a group of partial character strings having a common first character, information on the first common character is made common to and shared by all the partial character strings pertaining to the group. In addition, pointers pointing to nodes of first characters from the root of the character-string index are arranged in the order the codes of the first characters pointed to by the pointers are arranged. By the same token, pointers pointing to nodes of second characters from a node of a first character are arranged in the order the codes of the second characters pointed to by the pointers are arranged.

By processing all texts to be cataloged in a text database and cataloging a group of partial character strings appearing in the texts into a character-string index as described above, it is possible to know the position of and text containing a string of characters comprising any two characters merely by referencing the character-string index, without the need to scan the text data itself at all. A method for searching the text database for a string of characters having a length other than two characters will be described later.

In the present embodiment, the predetermined length (the character count) of the partial string of characters is two. It should be noted, however, that a similar character-string index can also be constructed with a character count set at a value other than two. In addition, even though the predetermined character count of the partial string of characters in the present embodiment is fixed, a similar character-string index can be constructed as well with a variable character count.

At this point, the explanation of the text cataloging sub-system 101 implemented by the present embodiment is completed.

The following is description of the text searching server implemented by the first embodiment of the present invention, that is, the apparatus denoted by reference numeral 102 in FIG. 1.

Figure 17:
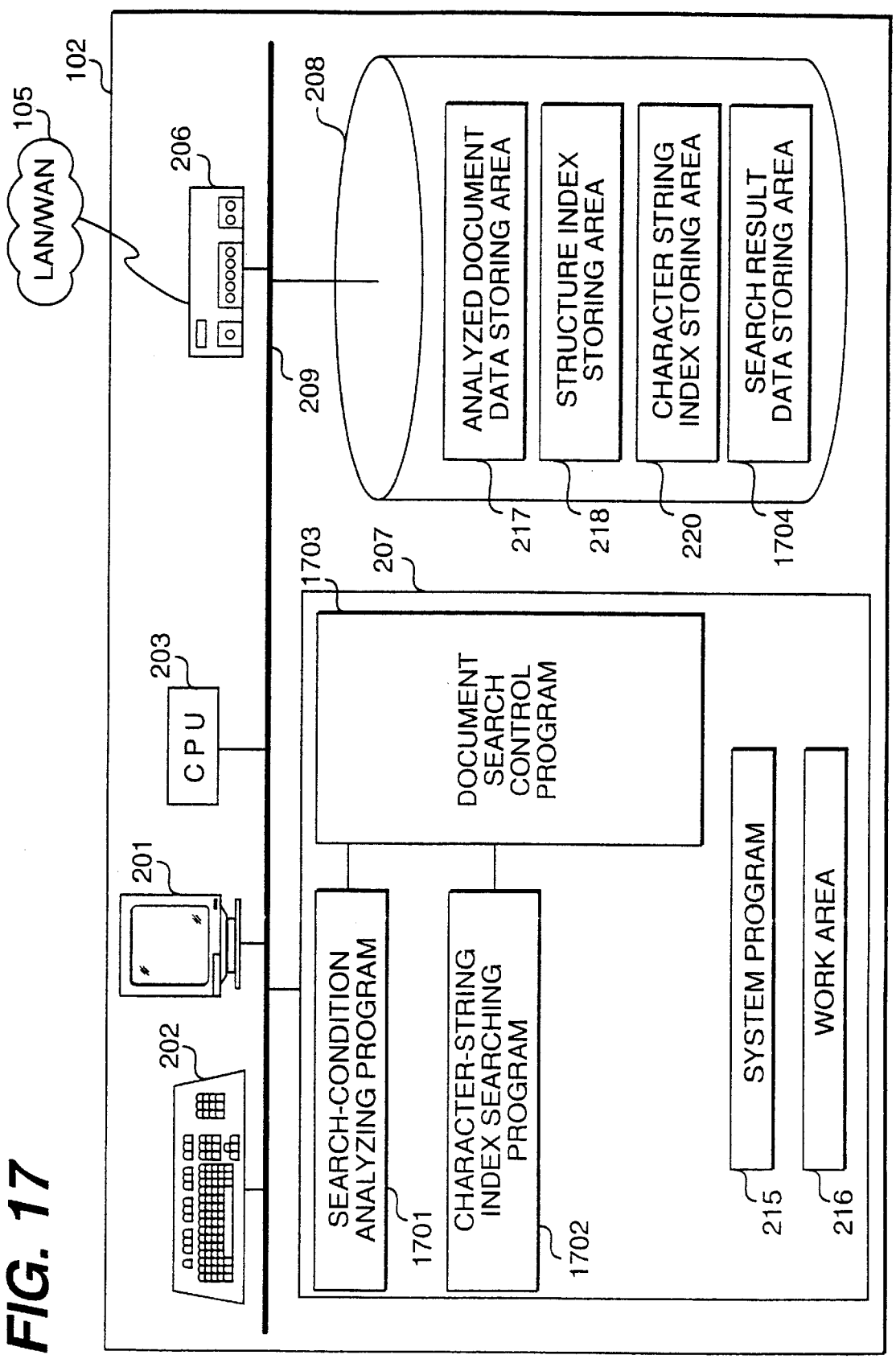
FIG. 17 is a diagram showing the configuration of a text searching server implemented by the first embodiment of the present invention.

FIG. 17 is a diagram showing the configuration of a text searching server 102 implemented by the present embodiment.

As shown in this figure, the text searching server 102 comprises a display unit 201, a keyboard 202, a central processing unit (CPU) 203, a floppy-disk drive 204, a floppy disk 205, a communication control apparatus 206, a main memory unit 207, a magnetic-disk drive 208, and a system bus 209.

The display unit 201 is used for displaying information such as an execution state of processing carried out in the text cataloging sub-system 101, and the keyboard 202 is used for entering a command making a request for an operation such as the activation and the halting of the text searching server 102. The central processing unit 203 executes a variety of programs constituting the functions of the text searching server 102. The communication control unit 206 is used for communicating with the text cataloging sub-system 101 and the text searching clients 103 and 104 through the network 105, in order to exchange requests and data with the text cataloging sub-system 101 and the text searching clients 103 and 104.

The main memory unit 207 is used for storing a variety of programs to be executed for carrying out various kinds of processing of the text searching server 102, and for holding data temporarily. The magnetic-disk drive 208 is used for storing text data in a text database and index data referenced by the text searching server 102. The system bus 209 is used for connecting the display unit 201, the keyboard 102, the central processing unit (CPU) 203, the communication control apparatus 206, the main memory unit 207, and the magnetic-disk drive 208 with each other.

Including also a work area 216, the main memory unit 207 is used for storing a search-condition analyzing program 1701, a character-string-index searching program 1702, a text-search control program 1703, and a system program 215. The magnetic-disk drive 208 stores an already-analyzed-text-data storing area 217, a structure-index storing area 218, a character-string-index storing area 220, and a search-result-data storing area 1704.

The search-condition analyzing program 1701 analyzes a search-condition equation included in a request for a search operation received from the text searching client 103 or 104, and translates the search-condition equation into a condition specification that can be readily searched by the character-string-index searching program 1702. The character-string-index searching program 1702 searches the character-string index stored in the character-string-index storing area 220 for desired information in accordance with the condition specification resulting from the translation carried out by the search-condition analyzing program 1701. Search-result data obtained from the search operation (that is, the desired information) is stored in the search-result-data storing area 1704.

The text-cataloging control program 1703 controls the activation and the execution of the search-condition analyzing program 1701 and the character-string-index searching program 1702. The text-searching control program 1703 also exchanges requests and data with the text cataloging sub-system 101 and the text searching clients 103 and 104 by way of the network 105. The system program 215 provides basic functions for executing the programs implementing the functions of the text searching server 102 on the computer. The basic functions include inputting and outputting data from and to peripheral devices. The work area 216 is used for storing data required temporarily in the execution of the programs.

As described above, in the present embodiment, the text-searching control program 1703 exchanges requests and data with the text cataloging sub-system 101 and the text searching clients 103 and 104 by way of the network 105. However, it is also possible to build a configuration wherein another portable medium such as the floppy disk 205, an optical magnetic disk, or a writable optical disk is used in place of the network 105. As an alternative, it is also possible to build a configuration wherein the text cataloging sub-system 101 and the text searching server 102 are implemented by a single computer so that no data transfers are needed between the text cataloging sub-system 101 and the text searching server 102. As another alternative, it is also possible to build a configuration wherein one or more text searching clients and the text searching server 102 are implemented by a single computer so that no data transfers are needed between the text searching clients and the text searching server 102.

Figure 18:
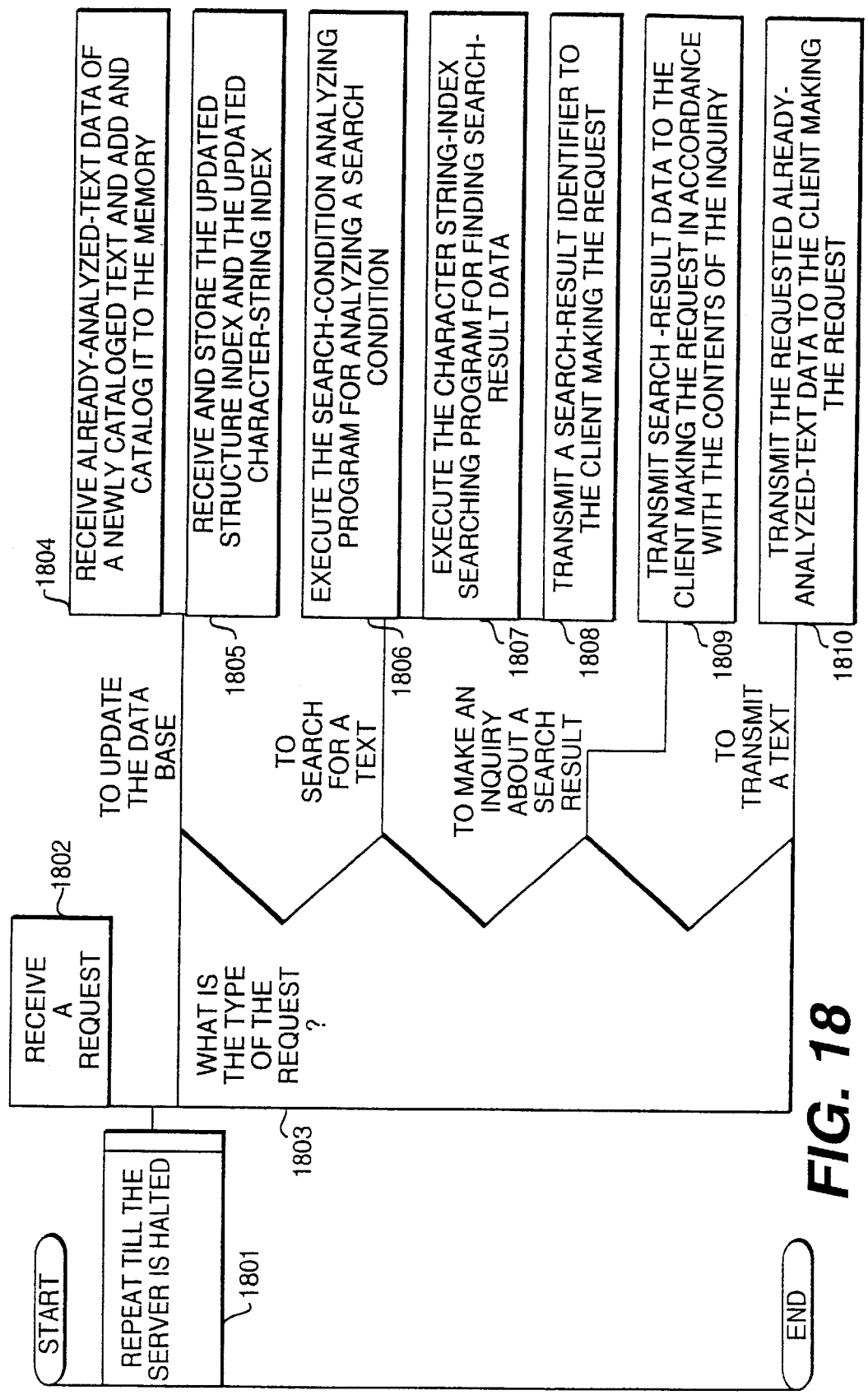
FIG. 18 is a PAD showing a procedure for searching a text adopted by the first embodiment of the present invention.

FIG. 18 is a PAD showing a procedure for searching a text adopted by the first embodiment of the present invention. When the text-searching control program 1703 is invoked, typically by a server invoking a command entered via the keyboard 202, the program executes a function of the text searching server 102 to receive a request transmitted from the text cataloging sub-system 101 or the text searching client such as that denoted by reference numeral 103 or 104, getting in a processing performing loop at Step 1801. The loop is continued until a request to halt the processing is entered via the keyboard 202.

At Step 1801, the processing of Step 1802 to receive a request transmitted from the text cataloging sub-system 101 or the text searching client 103 or 104, and processing of Step 1803 to determine the type of the request and to make a decision as to which step to branch to in accordance with the type of the request, are repeated.

If a result of the determination of the request type at Step 1803 indicates that the request is a data-base-update request received from-the text cataloging sub-system 101, the flow goes on to Step 1804 and then to Step 1805. A data-base-update request is a request to update the database by cataloging a group of new texts.

If a result of the determination of the request type at Step 1803 indicates that the request is for a text search transmitted by a text searching client such as that denoted by reference numeral 103 or 104, the flow proceeds to pieces of processing carried out at Steps 1806 to 1808. A request for a text search is a request for an operation to search the database for a group of texts that satisfy a specific search condition. If a result of the determination of the request type at Step 1803 indicates that the request is a search-result inquiring request transmitted by a text searching client such as that denoted by reference numeral 103 or 104, the flow proceeds to Step 1809. A search-result inquiring request is a request to make an inquiry about a specific search result.

If a result of the determination of the request type at the step 1803 indicates that the request is a text-transfer request transmitted by a text searching client such as that denoted by reference numeral 103 or 104, the flow proceeds to Step 1810. A text-transfer request is a request for a transfer of specified text data. After the processing carried out at Step 1805, 1808, 1809, or 1810 (the destination step of the branch from Step 1803) has been completed, the processing returns to Step 1802.

At Step 1804, already-analyzed-text data of a newly cataloged text group is received from the text cataloging sub-system 101 and added to data already stored in the already-analyzed-text-data storing area 216. The flow then goes on to Step 1805, at which an updated character-string index and an updated structure index reflecting the contents of the newly cataloged text group are received from the text cataloging sub-system 101 and added to a character-string index and a structure index already existing in the character-string-index storing area 220 and the structure-index storing area 218, respectively.

At Step 1806, the search-condition analyzing program 1701 is executed in order to analyze a search condition included in a request for a search operation received from the text searching client 103 or 104, and to translate the search condition into a condition specification that can be readily searched by the character-string-index searching program 1702. The condition specification is referred to hereafter as "already-developed-search-condition data". The flow then proceeds to Step 1807, at which the character-string-index searching program 1702 is executed by treating the already-developed-search-condition data generated at Step 1806 as an input to search the database for a group of texts that satisfy the condition specified by the already-developed-search-condition data. Search-result data obtained from the search operation is associated with a search-result identifier for uniquely identifying the search-result data, and stored in the search-result-data storing area 1704. Then, the flow continues to Step 1808, at which the search-result identifier is transmitted to the text searching client that made the request for a text search.

At Step 1809, part or all of the search-result data obtained at Step 1807 is retrieved from the search-result-data storing area 1704 in accordance with the contents of the inquiry, and transmitted to the text searching client that made the search-result inquiring request.

At Step 1810, already-analyzed-text data of a text specified in the text-transfer request is retrieved from the already-analyzed-text-data storing area 217 and transmitted to the text searching client that made the text-transfer request. It should be noted that, if a plurality of texts are specified in the text-transfer request, pieces of already-analyzed-text data of all texts are retrieved from the already-analyzed-text-data storing area 217 and transmitted to the text searching client that made the text-transfer request.

Figure 19:
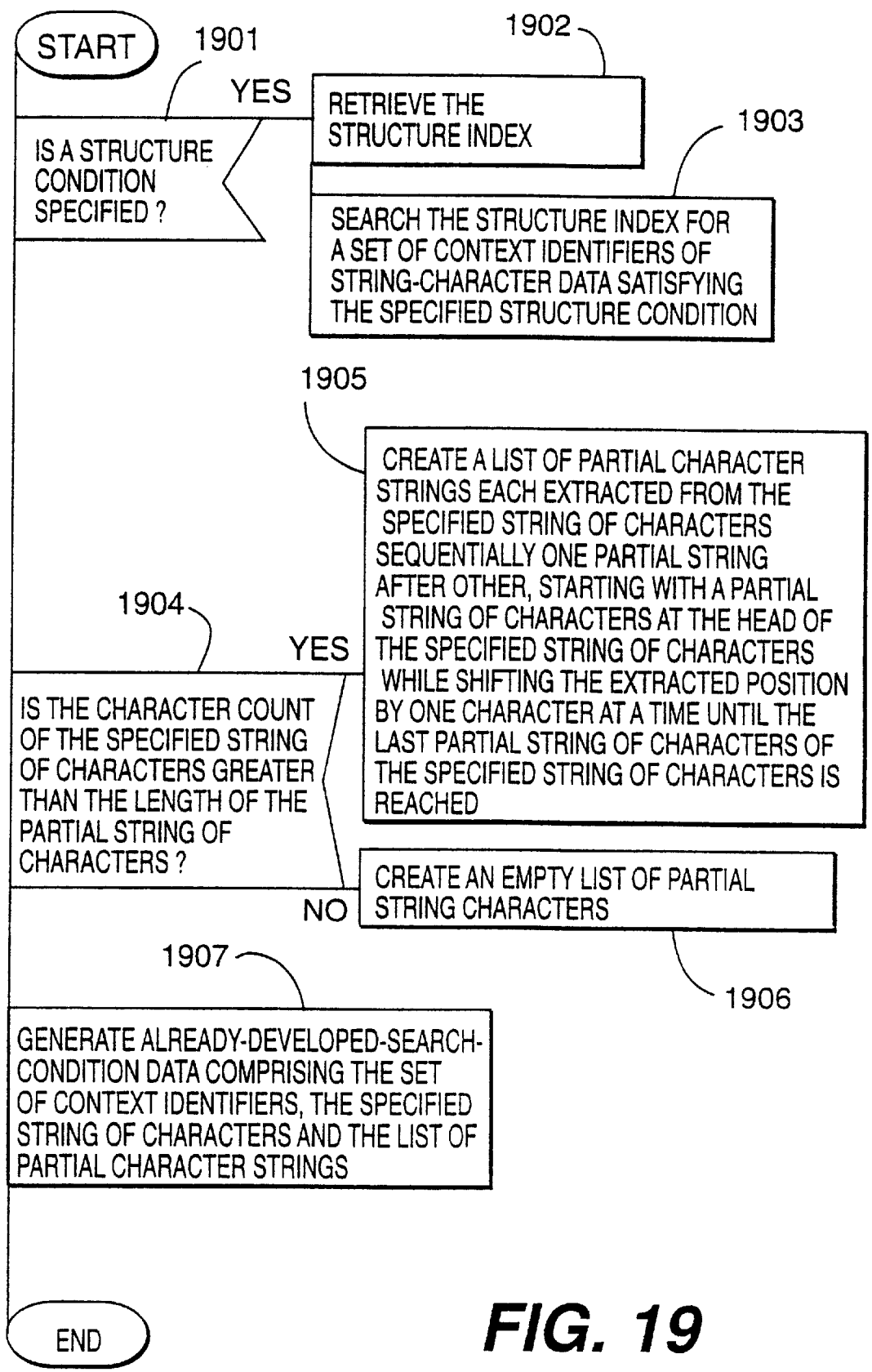
FIG. 19 is a PAD showing details of the procedure carried out by a search-condition analyzing program in the first embodiment of the present invention.

FIG. 19 is a PAD showing details of the procedure carried out at Step 1806 shown in FIG. 18, which is a procedure of carried out by the search-condition analyzing program 1701 of the present embodiment.

As shown in FIG. 19, the procedure begins with Step 1901, at which the search-condition analyzing program 1701 is invoked by a request for a text search including a specified search condition as an input to the program, and forms a judgment as to whether the search condition includes a structure condition. Only if the search condition includes a structure condition are pieces of Steps 1902 and 1903 carried out. If the search condition does not include a structure condition, however, the flow goes on to Step 1904.

At Step 1902, the structure index is retrieved from the structure-index storing area 218. The flow then proceeds to Step 1903, at which the structure index is searched for a set of context identifiers of all pieces of character-string data included in the structure index which satisfies the structure condition. The set of context identifiers is referred to hereafter as a "context-identifier set".

At Step 1904, on the other hand, the search-condition analyzing program 1701 forms a judgment as to whether the character count of a string of characters specified as a character-string condition in the search condition exceeds the length of the partial string of characters which was determined in advance at the time the character-string index was created. If the character count of the string of characters exceeds the length of the partial character string, the flow goes on to Step 1905, at which the search-condition analyzing program 1701 sequentially extracts a group of partial character strings, each having the predetermined character count of two, from the specified string of characters. The extraction starts with the partial string of characters at the head of the specified string of characters, and proceeds while shifting the extracted position by one character at a time until the last partial string of characters of the specified string of characters is extracted. Then, a list of partial character strings including the extracted partial character strings is generated as members thereof. If the character count of a string of characters does not exceed the predetermined length of the partial character string, on the other hand, the flow goes on to Step 1906, at which an empty list of partial character strings including no members is created.

At Step 1907, the search-condition analyzing program 1701 generates already-developed-search-condition data comprising the set of context identifiers found at Step 1903, the specified string of characters included in the search condition, and the list of partial character strings generated at Step 1905 or 1906, terminating the processing.

Figure 20:
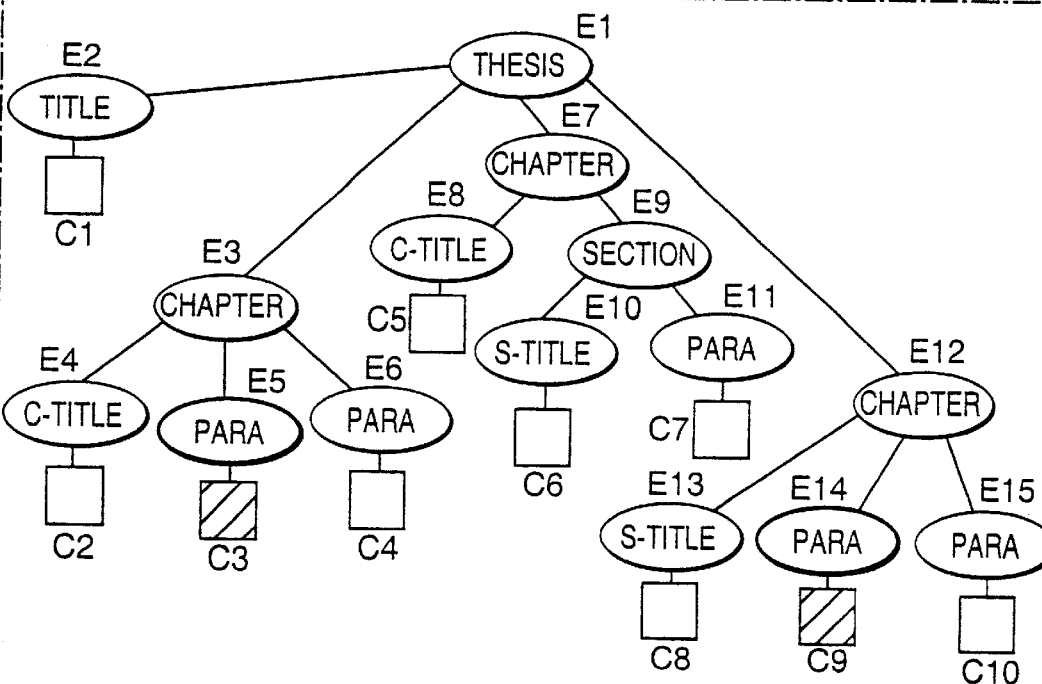
FIG. 20 is a diagram showing an example of generation of already-developed-search-condition data in processing carried out by the search-condition analyzing program in the first embodiment of the present invention.

FIG. 20 is a diagram showing an example of generation of the already-developed-search-condition data in processing carried out by the search-condition analyzing program 1701.

In this figure, reference numeral 2001 denotes an example of a search condition specified in a request for a text search. The search condition 2001 comprises a specification of a structure condition "chapter/comment[1]" and a specification of a character-string condition "guard". The search condition 2001 specifies a search of the structure index to be carried out for a case in which the string of characters "guard" appears in the first element "comment", which is directly subordinate to the element "chapter".

Assuming that the contents of the structure index are as shown by reference numeral 2002, the search of the structure index carried out at Step 1903 reveals that "comment" elements satisfying the specification of the structure conditions have the context identifiers E5 and E14. Thus, pieces of character-string data directly subordinate to these "comment" elements (that is, pieces of character-string data with the context identifiers C3 and C9) must be searched for next when the string of characters "guard" appears. In the character-string index to be used in the search, however, only appearance positions of partial character strings each having a length of two characters are cataloged. Thus, a direct search for a specified string of three or more characters like the string "guard" cannot be carried out.

In order to solve this problem, the search-condition analyzing program 1701 sequentially extracts a group of partial character strings, each having the predetermined character count of two, from the specified string of characters. The extraction starts with the partial string of characters at the head of the specified string of characters, and proceeds while shifting the extracted position by one character at a time until the last partial string of characters of the specified string of characters is extracted. The program then generates a list of partial character strings including the extracted partial character strings as members thereof at Step 1905. In the case of the specified string of characters "guard", the list of partial character strings extracted from the specified string has partial string characters "gu", "ua", "ar", and "rd" as its members.

As a result, already-analyzed-search-condition data 2003 comprising a context-identifier set (C3, C9), the specified string of characters "guard", and a list of partial character strings {"gu", "ua", "ar", and "rd"} as shown in FIG. 20 is generated at Step 1907 of the procedure shown in FIG. 19.

Figure 21:
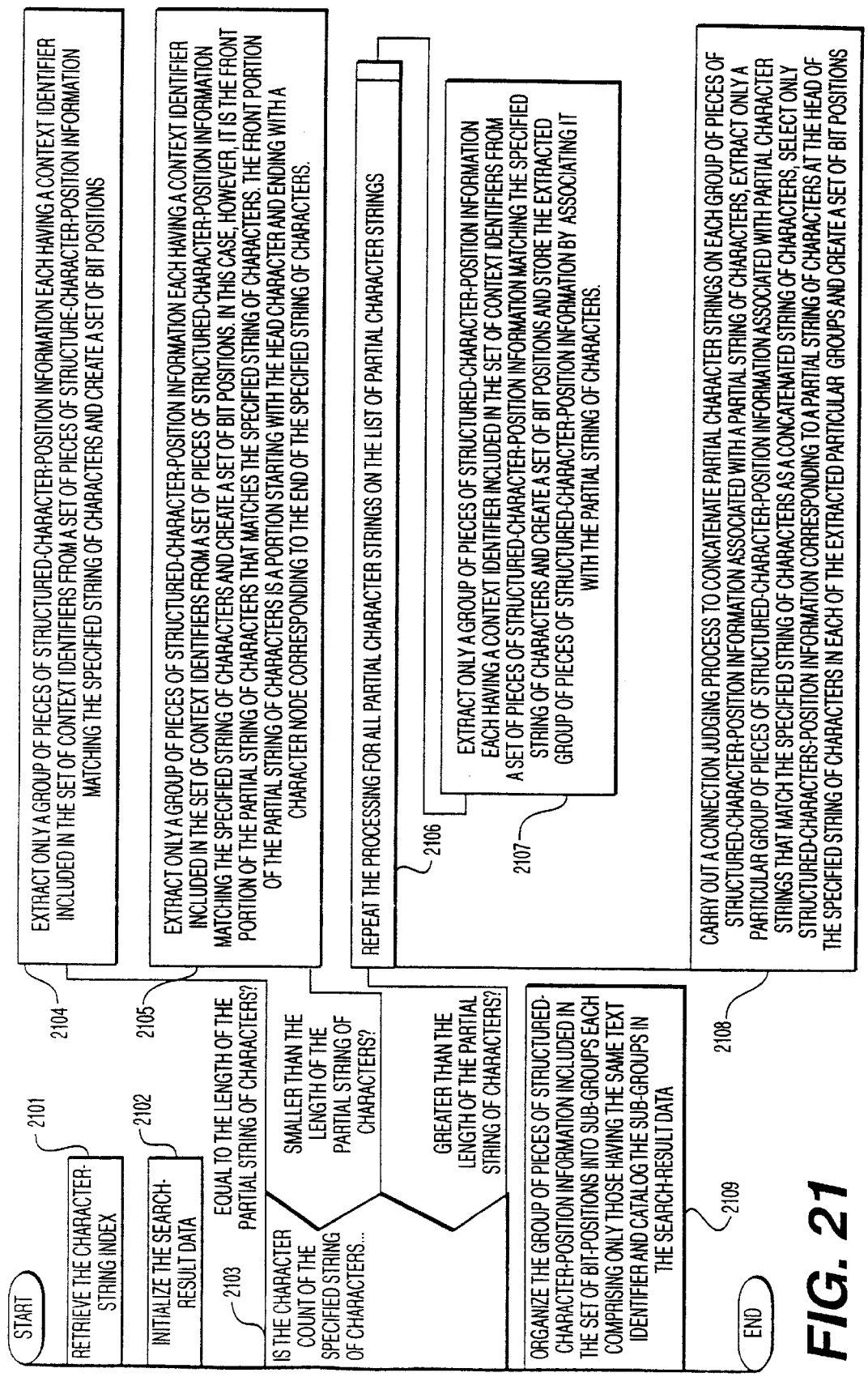
FIG. 21 is a PAD showing details of the procedure carried out by a character-string-index searching program in the first embodiment of the present invention.

FIG. 21 is a PAD showing details of the procedure carried out at Step 1807, which is carried out by the character-string-index searching program 1702 of the present embodiment.

The character-string-index searching program 1702 is activated, inputting already-developed-search-condition data generated by the search-condition analyzing program 1701. When the character-string-index searching program 1702 is invoked, the character-string-index searching program 1702 retrieves the character-string index from the character-string-index storing area 220 at Step 2101 of the procedure shown in FIG. 21. The flow then goes on to Step 2102, at which the search-result data is initialized.

Then, the flow proceeds to Step 2103 to compare the character count of a specified string of characters included in the already-developed-search-condition data with the length of the partial string of characters which was determined in advance at the time the character-string index was created. If the character count of the specified string of characters is found to be equal to the length of the partial character string, the flow goes on to Step 2104. If the character count of the specified string of characters is found to be smaller than the length of the partial character string, on the other hand, the flow proceeds to Step 2105. If the character count of the specified string of characters is found to be greater than the length of the partial character string, the flow goes on to Step 2106.

At Step 2104, the character-string index is searched for partial character strings matching the specified string of characters, and a set of pieces of structured-character-position information corresponding to the partial character strings are found. Then, only a group of pieces of structured-character-position information, each having a context identifier included in the set of context identifiers of the already-developed-search-condition data, are extracted from the set of pieces of structured-character-position information. Finally, a set of bit positions composed of the extracted group of pieces of structured-character-position information is created.

Much like Step 2104, at Step 2105, the character-string index is searched for partial character strings matching the specified string of characters, and a set of pieces of structured-character-position information corresponding to the partial character strings are found. In this case, however, since the character count of the specified string of characters is smaller than the length of a partial string of characters, the character-string index is searched for partial character strings, the front portion of each of which matches the specified string of characters. The front portion of a partial string of characters is a portion starting with the head character and ending with a character node corresponding to the end character of the specified string of characters. Then, only a group of pieces of structured-character-position information, each of which has a context identifier included in the set of context identifiers of the already-developed-search-condition data, are extracted from the group of pieces of structured-character-position information. Finally, a set of bit positions composed of the extracted group of pieces of structured-character-position information is created.

At Step 2106, Step 2107 is repeated for each partial character string constituting the list of partial character strings in the already-developed-search-condition data. At Step 2107, the character-string index is searched for a partial string of characters, and a set of pieces of structured-character-position information corresponding to the partial string of characters is found. Then, only a group of pieces of structured-character-position information that have a context identifier included in the set of context identifiers of the already-developed-search-condition data are extracted from the set of pieces of structured-character-position information. Finally, the extracted group of pieces of structured-character-position information are stored by being associated with the partial string of characters.

When the repetitive processing of Step 2106 is completed, the flow goes on to Step 2108, at which a connection judging process is carried out on each group of pieces of structured-character-position information associated with a partial string of characters, to concatenate partial character strings. Then, as a concatenated string of characters, only a particular group of pieces of structured-character-position information associated with partial character strings that match the specified string of characters are extracted, and only structured-character-position information corresponding to the partial string of characters at the head of the specified string of characters in each of the particular groups is extracted as a representative of the particular group. Finally, a set of bit positions composed of the extracted group of pieces of structured-character-position information (particularly, a set of bit positions composed of representatives of the particular groups of pieces of structured-character-position information) is created.

When Step 2104, 2105, or 2108 (that is, the last step of the destination of the branch from Step 2103) has been completed, the flow proceeds to Step 2109, at which the group of pieces of structured-character-position information included in the set of bit positions is organized into subgroups, each comprising only those pieces of structured-character-position information having the same text identifier, and cataloged in the search-result data.

The concatenation judging process, the processing of the character-string-index searching program 1702 carried out at Step 2108, is described in more detail by referring to FIG. 22 as follows.

In this figure, reference numeral 2201 denotes an example (or a portion) of the character-string index. When the character-string index holding the data 2201 is searched in accordance with a condition shown by the already developed search-condition data 2003 shown in FIG. 20, a group of pieces of structured-character-position information for the partial character strings "gu" and "ua" identified by context identifiers C3 and C9 are extracted as indicated by the step 2107. The extracted pieces of information are then associated with the partial character strings to form data 2202. The concatenation judging process is carried out on the data.

In the concatenation judging process carried out at Step 2108, the character-string-index searching program 1702 forms a judgment as to whether a combination of concatenated partial character strings represented by pieces of information in the extracted group that matches the whole specified string of characters exists. Such a combination must satisfy the following conditions:

(1) The pieces of structured-character-position information have the same text identifier.
(2) The pieces of structured-character-position information have the same context identifier.
(3) If the pieces of structured-character-position information are arranged in an order of increasing character-position values, and then the group of partial character strings represented by the pieces of structured-character-position information are arranged in the same order of character position, as a whole, a string of characters equivalent to the specified string of characters is obtained.

The example 2202 includes a combination which, as a whole, composes the specified string of characters "guard".

If a combination of particular pieces of structured-character-position information satisfying the conditions described above is found, the piece of structured-character-position information with the smallest character-position value is selected from the particular pieces of structured-character-position information constituting each combination, and cataloged in the set of bit positions as a representative of the combination.

Figure 23:
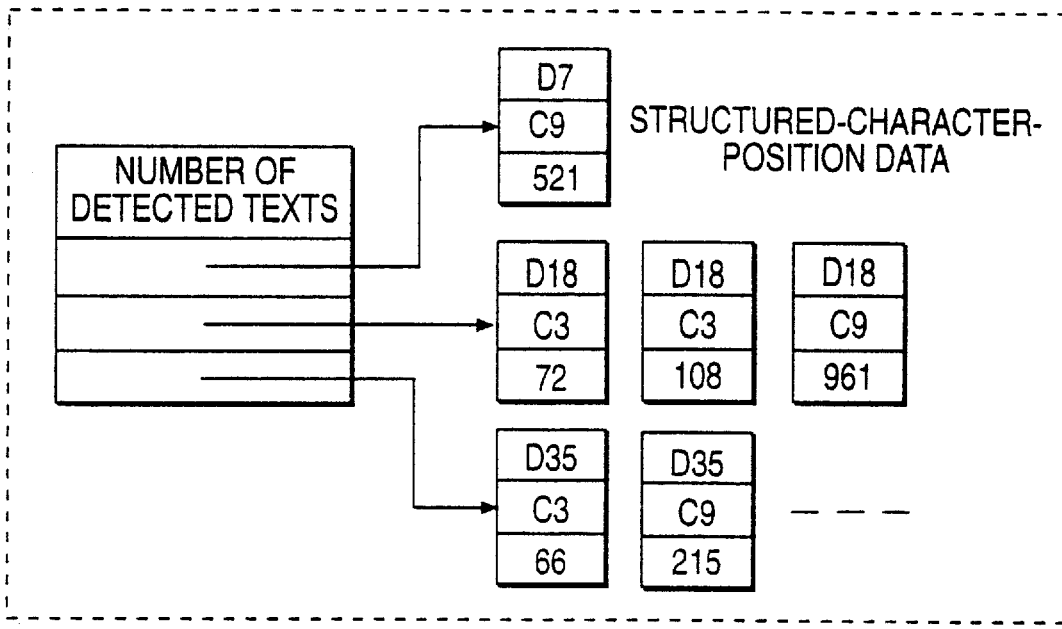
FIG. 23 is a diagram showing the structure of search-result data in the first embodiment of the present invention.

FIG. 23 is a diagram showing the structure of the search-result data generated as a result of individual pieces of search processing. As shown in this figure, the search-result data is organized into sub-groups, each of which comprises pieces of structured-character-position information included in the set of bit positions. Pieces of structured-character-position information pertaining to a sub-group have the same text identifier. The structure of the search-result data also includes a list with the sub-groups each serving as a member of the list, and information indicating the total number of detected texts. After being associated with a search-result identifier for uniquely identifying the search-result data, the search-result data is stored in the search-result-data storing area 1704 as a member of a set of pieces of search-result data.

Figure 24:
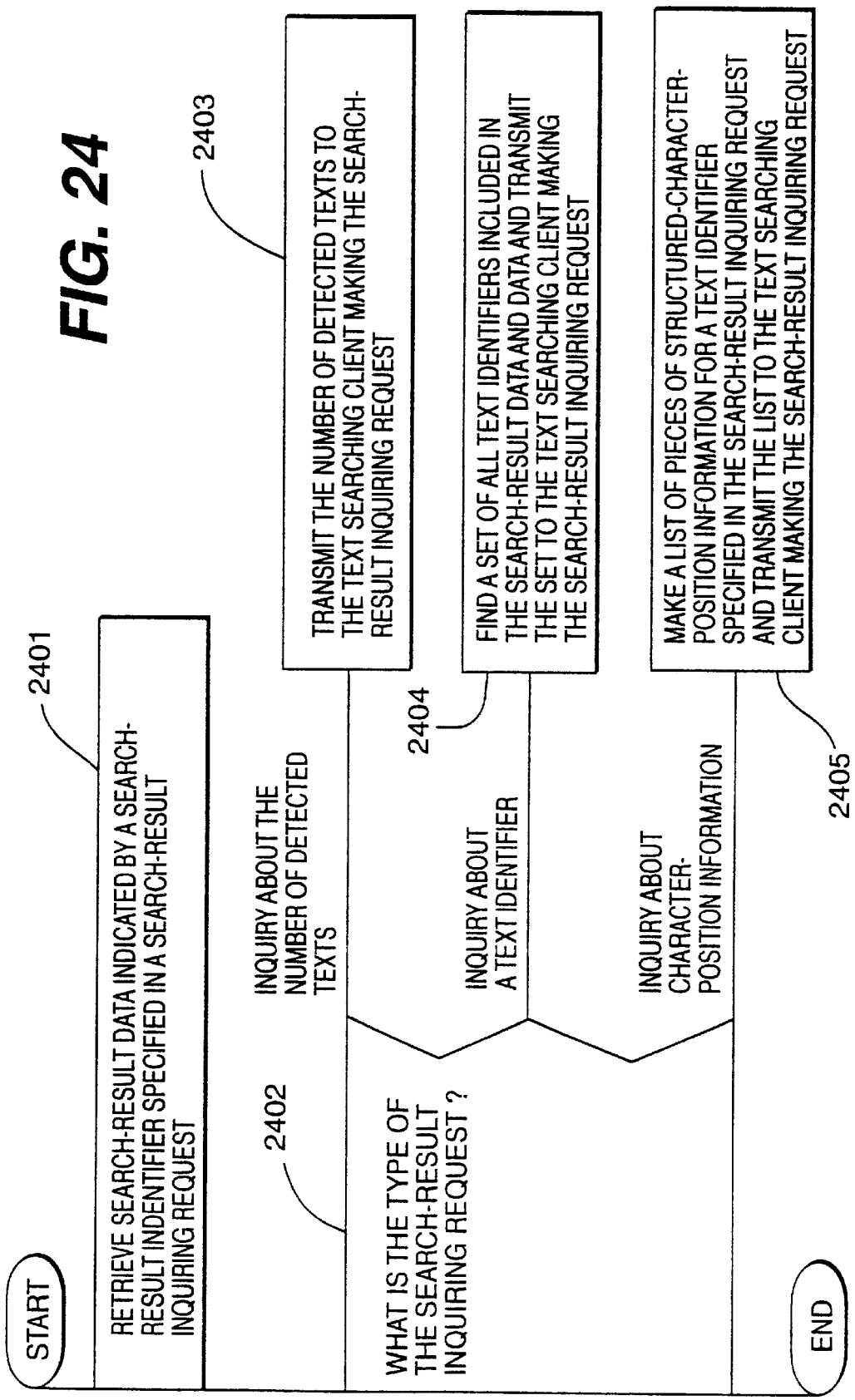
FIG. 24 is a PAD showing a detailed procedure of the processing to transfer already-analyzed-text data in the first embodiment of the present invention.

The following is a more detailed description of the processing carried out at Step 1809 of the procedure shown in FIG. 18, in which a search result is transferred to a client making a search-result inquiring request in accordance with the contents of the request, with reference to FIG. 24. FIG. 24 is a PAD showing details of the procedure for transferring search-result data carried out at Step 1809.

Here, a search-result inquiring request itself comprises three portions: a specification of a search-result identifier, a specification of the type of inquiry, and a specification of a text identifier. Depending on the type of inquiry, the search-result inquiring request may not include a specification of a text identifier.

As shown in FIG. 24, the processing carried out at Step 1809 begins with Step 2401, at which the search-result data storing area 1704 is searched for search-result data indicated by a search-result identifier included in the search-result inquiring request.

The flow then goes on to Step 2402 to determine the type of inquiry. If the inquiry is about the number of detected texts, the flow proceeds to Step 2403. If the inquiry is about a text identifier, on the other hand, the flow proceeds to Step 2404. If the inquiry is about character-position information, the flow proceeds to Step 2405.

At Step 2403, the number of detected texts is extracted from the search-result data retrieved from the search-result data storing area 1704 at Step 2401, and transmitted to the client making the request, ending the process.

At Step 2404, a set of all text identifiers included in the search-result data retrieved from the search-result data storing area 1704 at Step 2401 is gathered, and transmitted to the client making the request, ending the process.

At Step 2405, a list of pieces of structured-character-position information corresponding to the text identifier specified in the inquiry are extracted from the search-result data retrieved from the search-result data storing area 1704 at Step 240, and transmitted to the client making the request, ending the process.

At this point, the explanation of the text searching server 102 provided by the present embodiment is completed.

Figure 25:
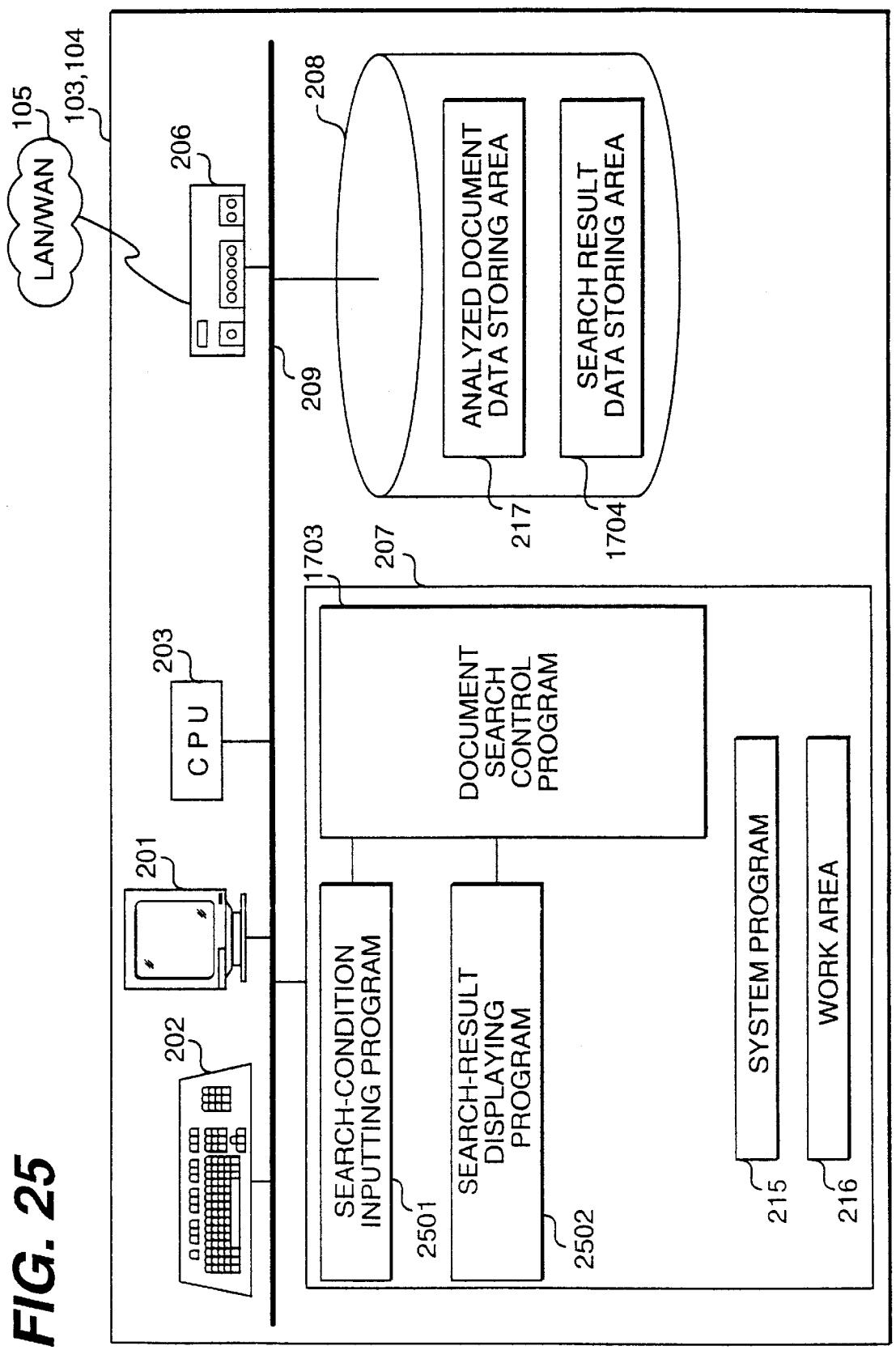
FIG. 25 is a diagram showing the configuration of a text searching client in the first embodiment of the present invention.

The following is a description of a text searching client 103 or 104 employed in the first embodiment of the present invention, with reference to FIGS. 1 and 25.

As shown in FIG. 25, the text searching client comprises a display unit 201, a keyboard 202, a central processing unit (CPU) 203, a communication control apparatus 206, a main memory unit 207, a magnetic-disk drive 208, and a system bus 209.

The display unit 201 is used for displaying a screen on which the user interactively enters a search condition, and for displaying information such as a search result. The keyboard 202 is used for entering a search condition and a command for requesting an operation, such as the activation of search processing. The central processing unit 203 executes a variety of programs constituting the functions of the text searching client. The communication control unit 206 is used for communicating with the text searching server 102 through the network 105 in order to exchange requests and data with the text searching server 102.

The main memory unit 207 is used for storing a variety of programs to be executed for carrying out various kinds of processing by the text searching client, and for holding data temporarily. The magnetic-disk drive 208 is used for storing a text obtained as a search result and other data. The system bus 209 is used for connecting the display unit 201, the keyboard 102, the central processing unit 203, the communication control apparatus 206, the main memory unit 207, and the magnetic-disk drive 208 with each other.

Including a work area 216, the main-memory unit 207 is used for storing a search-condition inputting program 2501, a search-result displaying program 2502, a client control program 2503, and a system program 215. The magnetic-disk drive 208 includes an already-analyzed-text-data storing area 217 and a search-result-data storing area 1704.

The search-result inputting program 2501 inputs and interprets a search condition entered by the user in an interactive manner. The search-result displaying program 2502 displays a search result received from the text searching server 102. The client control program 2503 controls the activation and execution of the search result inputting program 2501 and the search-result displaying program 2502, and exchanges requests and data with the text searching server 102 through the network 105. The system program 215 provides basic functions for executing the programs implementing the functions of the text searching server 102 on the computer, including inputting and outputting data from and to peripheral devices. The work area 216 is used for storing data required temporarily in the execution of the programs.

As described above, in the present embodiment, requests and data are exchanged with the text searching server 102 by way of the network 105. Note, however, that it is also possible to build a configuration wherein another portable medium, such as a floppy disk 205, an optical magnetic disk, or a writable optical disk, is used in place of the network 105. As an alternative, it is also possible to build a configuration wherein one or more text searching clients and the text searching server 102 are implemented by a single computer so that no data transfers are needed between the text searching clients and the text searching server 102. As another alternative, it is also possible to build a configuration wherein the text searching client is connected to a printer for printing a search result.

Figure 26:
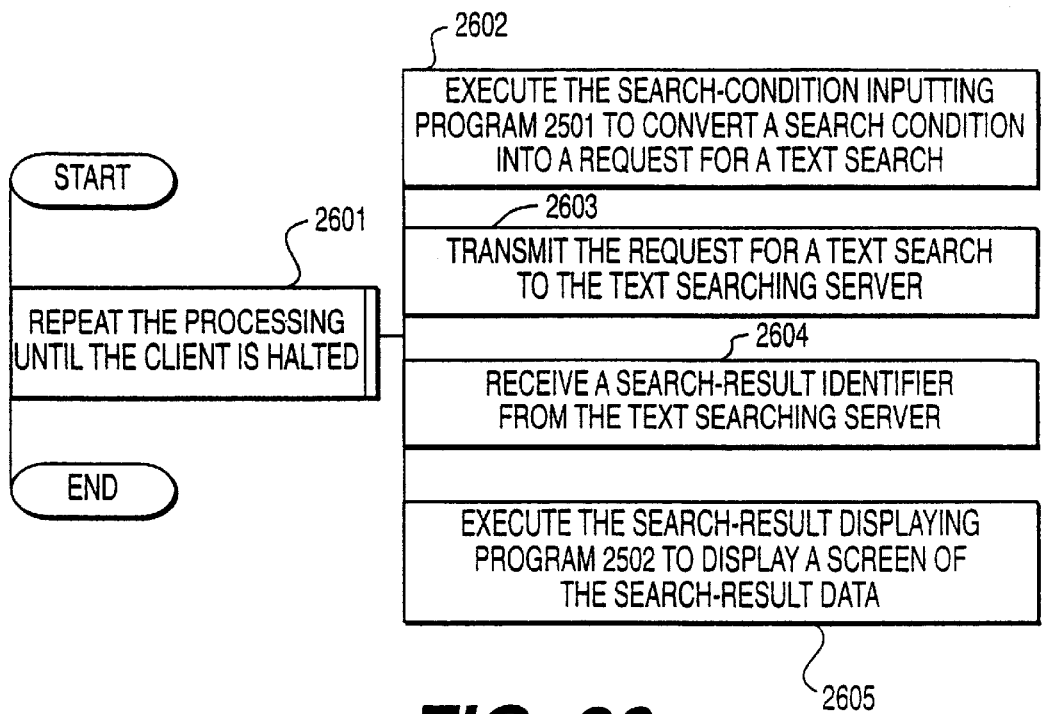
FIG. 26 is a PAD showing an operational procedure carried out by the text searching client provided by the first embodiment of the present invention.

FIG. 26 is a PAD showing an operational processing procedure of the text searching client provided by the first embodiment of the present invention. As shown in this figure, the procedure begins with Step 2601, at which, activated by a client activating command entered via the keyboard 202, the client control program 2503 receives the command for making a request for a text search from the user and gets in a processing loop. The loop is continued until a request to halt the client processing is entered via the keyboard 202.

In the loop of the step 2601, pieces of processing of Steps 2602 to 2605 are repeated.

At Step 2602, the search-condition inputting program 2501 is executed to input a search condition entered by the user in an interactive manner. The search condition is then converted into a request for a text search that can be readily interpreted by the text searching server 102. Then, the flow goes on to Step 2603, at which the request for a text search is transmitted to the text searching server 102 by way of the network 105. Subsequently, the flow proceeds to Step 2604 to wait for a search-result identifier to be transmitted by the text searching server 102 as a response to the request for a text search, and receives the search-result identifier as soon as it arrives.

The flow of the processing procedure then continues to Step 2605, at which the search-result displaying program 2502 is executed to input the search-result identifier. The search-result displaying program 2502 displays a screen of the search-result data in response to an inquiry about the search result made by the user in an interactive manner.

Figure 27:
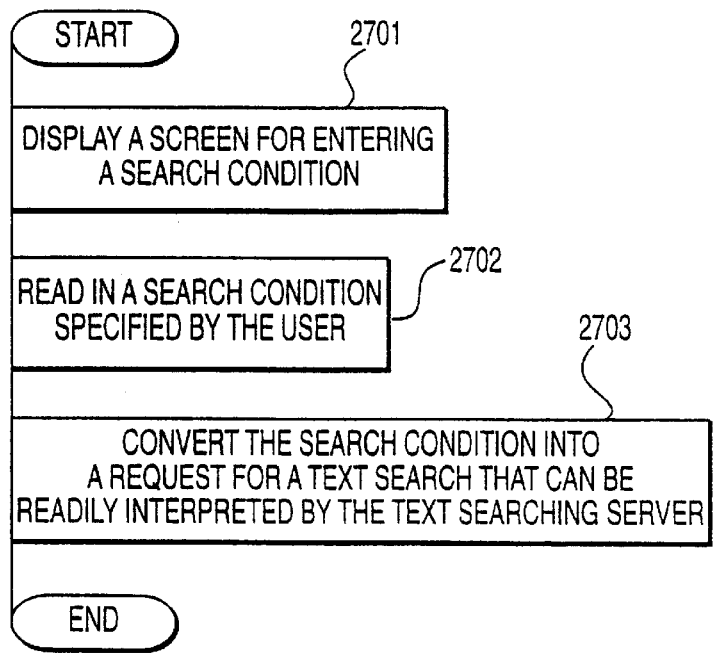
FIG. 27 is a PAD showing a detailed procedure of processing carried out by the search-condition inputting program in the first embodiment of the present invention.

FIG. 27 is a PAD showing a detailed procedure carried out by the search-result inputting program 2501 at Step 2602. As shown in FIG. 27, the procedure begins with Step 2701, at which, invoked by the client control program 2503, the search-condition inputting program 2501 displays a screen by which the user enters a search condition in an interactive manner on the display unit 201.

The flow then goes on to Step 2702, at which a search condition specified by the user on the screen is read in.

Then, the flow proceeds to Step 2703, at which the search condition read in at Step 2702 is converted into a request for a text search that can be readily interpreted by the text searching server 102.

Figure 28:
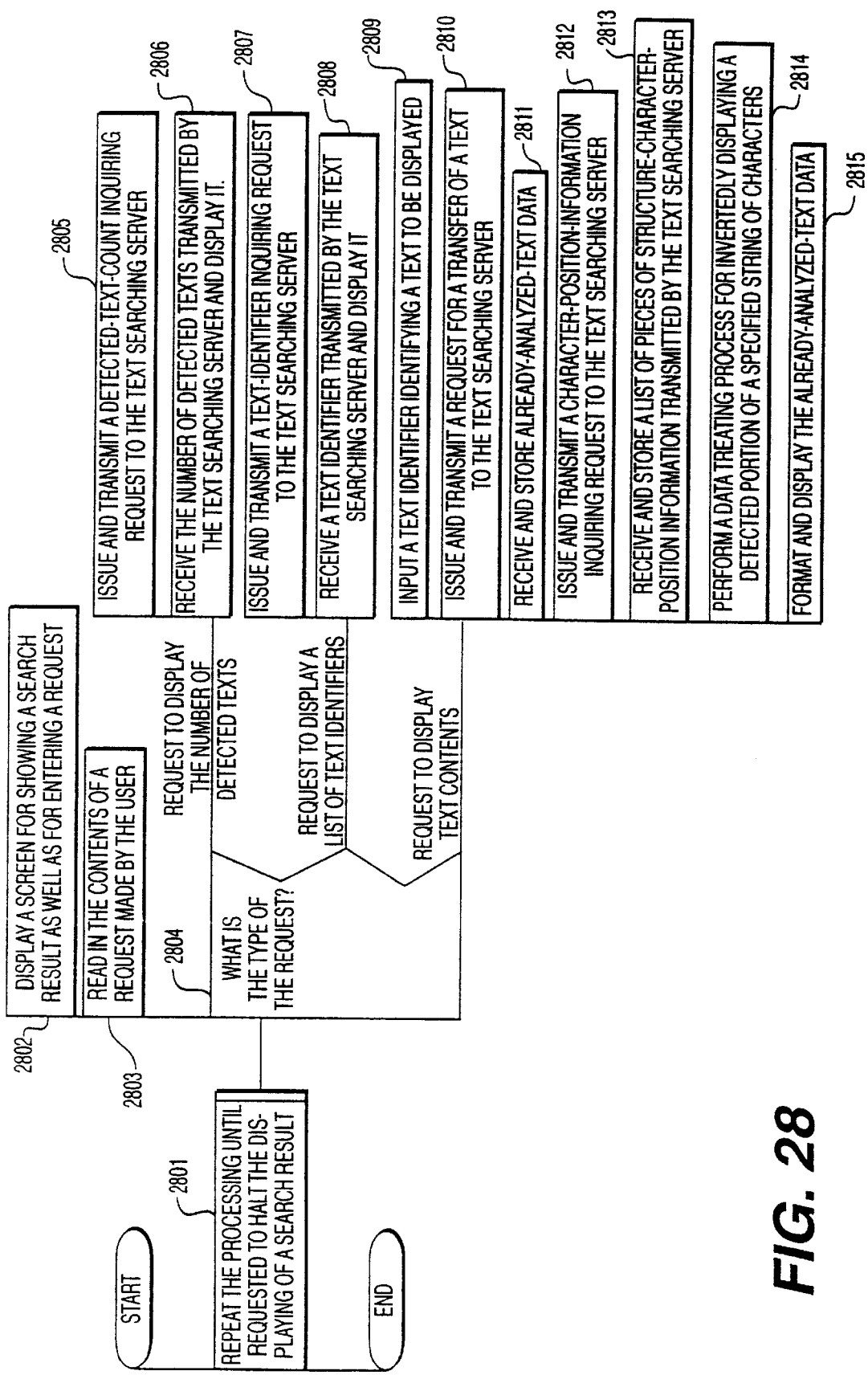
FIG. 28 is a PAD showing a detailed procedure of processing carried out by the search-result displaying program in the first embodiment of the present invention.

FIG. 28 is a PAD showing a detailed procedure carried out by the search-result displaying program 2502 at Step 2605.

As shown in this figure, the procedure begins with Step 2801, at which, activated by the client control program 2503, the search-result displaying program 2502 inputs a search-result identifier, immediately getting in a processing loop. The loop is continued until a request is entered by the user to halt the processing to display a search result. In the loop of Step 2801, pieces of processing of Steps 2802 to 2815 are repeated.

The loop of Step 2801 begins with Step 2802, at which a screen for displaying a search result and for the user to enter a request is displayed on the display unit 201. The flow then goes on to Step 2803, at which the contents of a request made by the user on the display screen are read in.

Then, the flow proceeds to Step 2804, at which the search-result displaying program 2502 determines the type of request made by the user, making a decision as to which destination the flow is to branch in dependence on the type of request. More particularly, if the request is for displaying the number of detected texts, the flow goes on to pieces of processing of Steps 2805 and 2806. If the request is for displaying a list of text identifiers for a group of detected texts, on the other hand, the flow goes on to pieces of processing of Steps 2807 and 2808. If the request is for displaying the contents of a text, the flow goes on to pieces of processing of Steps 2809 to 2815. After all the pieces of processing at Step 2806, 2808, or 2815 (the last step of one of the branch destinations) have been carried out, the flow returns to Step 2802, resuming the loop.

At Step 2805, a detected-text-count inquiring request for making an inquiry about the number of detected texts is issued and transmitted to the text searching server 102. The flow then goes on to Step 2806, at which the number of detected texts transmitted by the text searching server 102 in response to the detected-text-count inquiring request is received and displayed on the display unit 201.

At Step 2807, a text-identifier inquiring request for making an inquiry about a list of text identifiers for a group of detected texts is issued and transmitted to the text searching server 102. The flow then goes on to Step 2808, at which a set of text identifiers transmitted by the text searching server 102 in response to the text-identifier inquiring request is received and a group of text identifiers included in the set are displayed on the display unit 201.

At Step 2809, a text identifier identifying a text to be displayed is input. The flow then goes on to Step 2810, at which a text-transfer request for obtaining already-analyzed-text data of a text identified by the text identifier is issued and transmitted to the text searching server 102. The flow then goes on to Step 2811, at which already-analyzed-text data transmitted by the text searching server 102 in response to the text-transfer request is received and stored in the already-analyzed-text-data storing area 217.

Then, the flow proceeds to Step 2812, at which a character-position-information inquiring request for making an inquiry about a position in the already-analyzed-text data at which a specified string of characters included in a search condition was detected, is issued and transmitted to the text searching server 102. The flow then goes on to Step 2813, at which a list of pieces of structured-character-position information transmitted by the text searching server 102 in response to the character-position-information inquiring request is received and stored in the search-result-data storing area 1704.

Subsequently, the flow continues to Step 2814, at which a data treating process for invertedly displaying a detected portion of a specified string of characters at a text search time is carried out by referring to the already-analyzed-text data received at Step 2811 and the list of pieces of structured-character-position information received at the step 2813. The flow then proceeds to Step 2815, at which the already-analyzed-text data which underwent the inversion processing at Step 2814 is formatted and displayed on the display unit 201.

At this point, the explanation of the operational procedure of the text searching clients 103 and 104 provided by the first embodiment of the present invention is completed.

Second Embodiment

A second embodiment of the present invention is described as follows.

Figure 29:
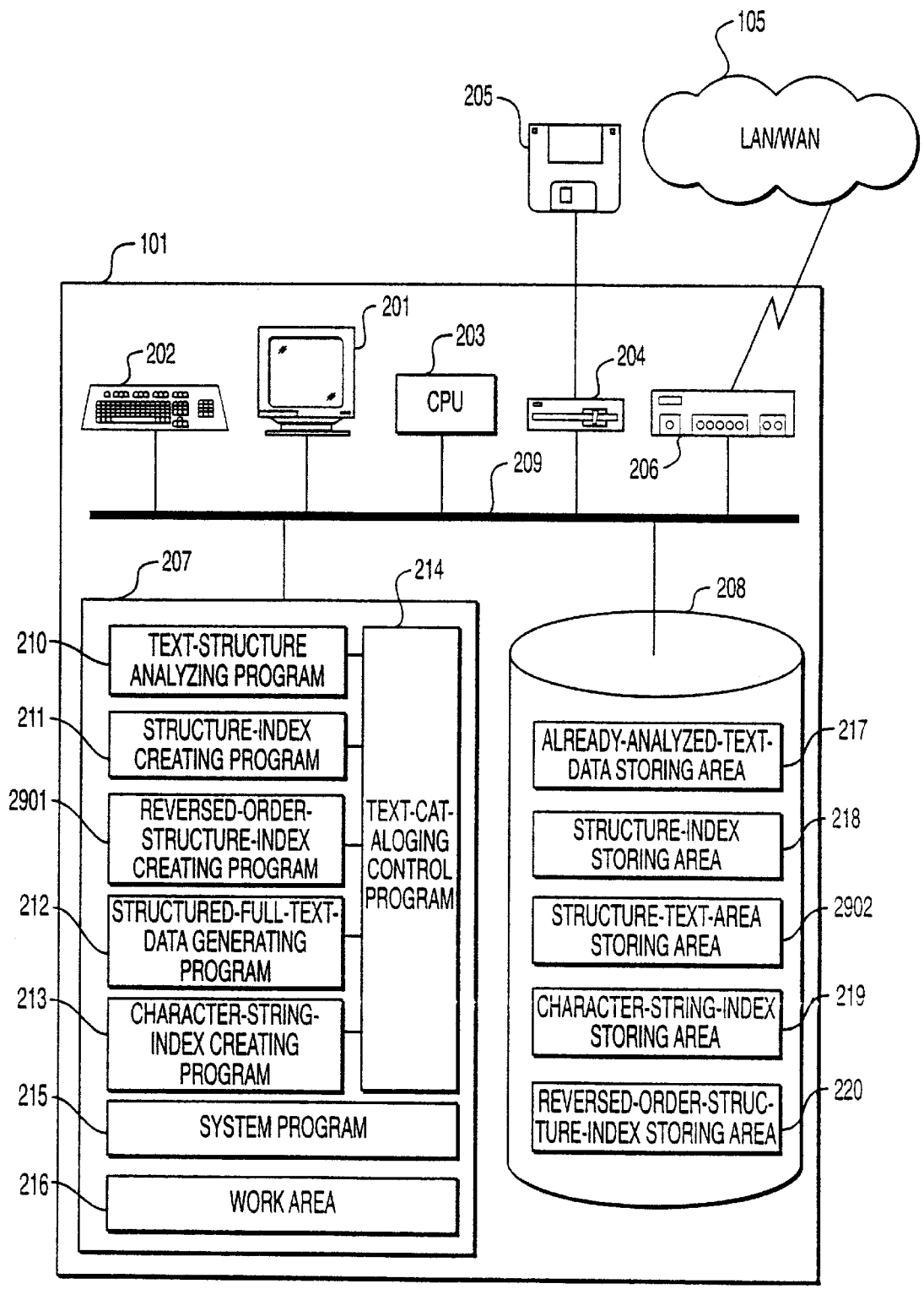
FIG. 29 is a diagram showing the configuration of a text cataloging sub-system as implemented by a second embodiment of the present invention.

FIG. 29 is a diagram showing the configuration of a text cataloging sub-system 101 as implemented by the present embodiment.

The hardware configuratio of the text cataloging subsystem 101 shown in FIG. 29 is identical to that implemented by the first embodiment shown in FIG. 2. In the case of the text cataloging sub-system 101 provided by the second embodiment shown in FIG. 29, however, the main memory unit 207 stores a reversed-order-structure-index creating program 2901 in addition to the programs stored in the main memory unit 207 of the first embodiment. The magnetic-disk drive 208 also has a reversed-order-structure-index storing area 2902 in addition to the areas stored in the magnetic-disk drive 208 of the first embodiment. The reversed-order-structure-index creating program 2901 catalogs information on the logical structure of already-analyzed-text data of a text to be cataloged into a reversed-order-structure index stored in the reversed-order-structure-index storing area 2902, updating the reversed-order-structure index.

In the present embodiment, the text-cataloging control program 214 controls the activation and the execution of the text-structure analyzing program 210, the structure-index creating program 211, the reversed-order-structure-index creating program 2901, the structured-full-text-data generating program 212, and the character-string-index creating program 213. The text-cataloging control program 214 also transmits the already-analyzed-text data generated by the text-structure analyzing program 210, the structure index generated by the structure-index creating program 211, the reversed-order-structure index generated by the reversed-order-structure-index creating program 2901, and the character-string index generated by the character-string-index creating program 213 to the text searching server 102 by way of the network 105.

As described above, the present embodiment has a configuration wherein a text to be cataloged is input from the floppy disk 205. However, another kind of portable medium, such as an optical magnetic disk or a writable optical disk, may be used in place of the floppy disk 205, with appropriate changes to the hardware and software. As an alternative configuration, a text to be cataloged can also be input through the network 105. In addition, in the configuration of the present embodiment, the already-analyzed-text data generated by the text-structure analyzing program 210, the structure index generated by the structure-index creating program 211, the reversed-order-structure index generated by the reversed-order-structure-index creating program 2901, and the character-string index generated by the character-string-index creating program 213 are transmitted to the text searching server 102 by way of the network 105.

Furthermore, instead of using the network 105, a portable medium such as a floppy disk, an optical magnetic disk, or a writable optical disk can be used for transferring the information. As an alternative, the text cataloging subsystem 101 and the text searching server 102 can be implemented by a single computer so that no data transfers are needed between the text cataloging sub-system 101 and the text searching server 102.

Figure 30:
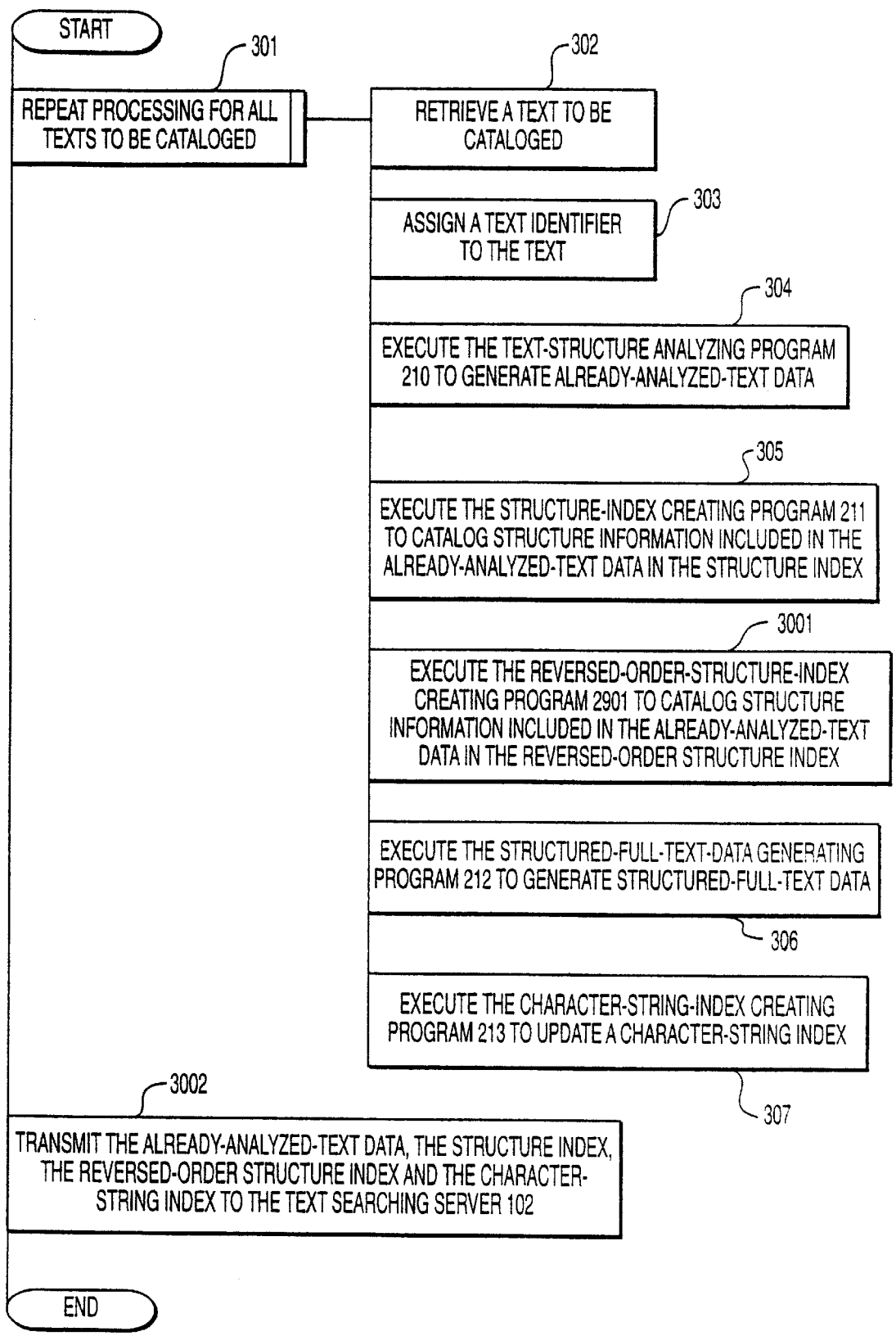
FIG. 30 is a PAD showing a procedure for cataloging a text adopted by the second embodiment of the present invention.

FIG. 30 is a PAD showing a procedure for cataloging a text according to the second embodiment of the present invention. The procedure shown in this figure is similar to that of the first embodiment shown in FIG. 3. However, FIG. 30 is different from FIG. 3 in that Step 3001 is inserted right after Step 305, and Step 308 is replaced by Step 3002.

At the newly inserted Step 3001, the reversed-order-structure-index creating program 2901 is executed, inputting the already-analyzed-text data generated at Step 304. The reversed-order-structure-index creating program 2901 retrieves the current reversed-order-structure index from the reversed-order-structure-index storing area 2902, cataloging structure information of the input already-analyzed-text data in the current reversed-order-structure index. The reversed-order-structure-index creating program 2901 then stores back the updated reversed-order-structure index in the reversed-order-structure-index storing area 2902.

At the new Step 3002, on the other hand, the text-cataloging control program 214 transmits all pieces of already-analyzed-text data stored in the already-analyzed-text-data storing area 217, the structure index stored in the structure-index storing area 218, the reversed-order-structure index stored in the reversed-order-structure-index storing area 2902, as well as the character-string index stored in the character-string-index storing area 220 to the text searching server 102 by way of the network 105.

Figure 31:
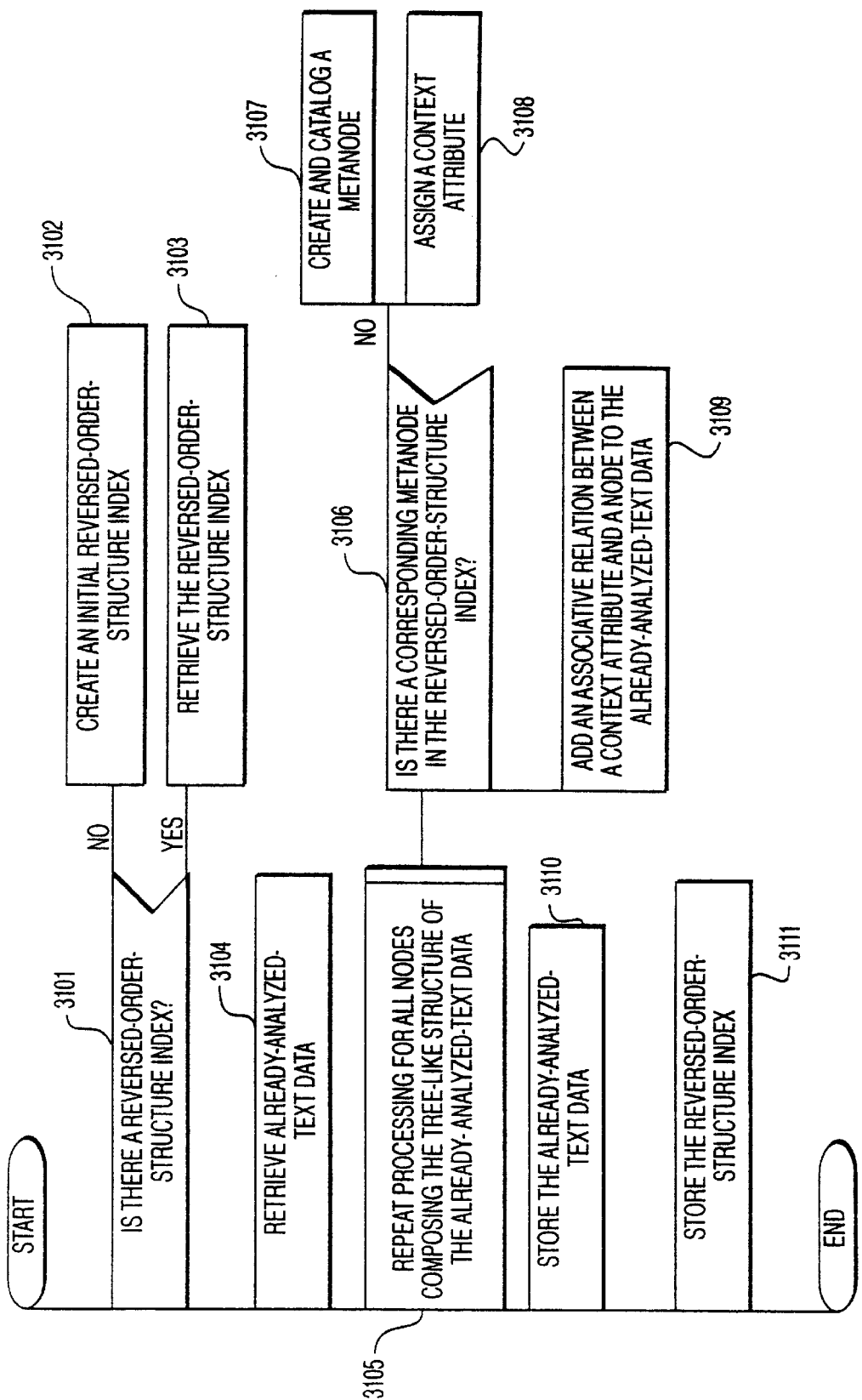
FIG. 31 is a PAD showing details of the procedure carried out by a reversed-order-structure-index creating program in the second embodiment of the present invention.

FIG. 31 is a PAD showing details of the processing carried out at Step 3001 of the procedure shown in FIG. 30, which is carried out by the reversed-order-structure-index creating program 2901.

As shown in FIG. 31, the processing procedure begins with Step 3101, at which the updated reversed-order-structure-index creating program 2901 forms a judgment as to whether a reversed-order-structure index already exists in the reversed-order-structure-index storing area 2902. If no reversed-order-structure index exists in the reversed-order-structure-index storing area 2902 yet, the flow goes on to Step 3102, at which the reversed-order-structure-index creating program 2901 creates an initial-state (or empty) reversed-order-structure index. If a reversed-order-structure index already exists in the reversed-order-structure-index storing area 2902, on the other hand, the flow proceeds to Step 3103, at which the reversed-order-structure-index creating program 2901 retrieves the reversed-order-structure index from the reversed-order-structure-index storing area 2902.

The flow then continues to Step 3104, at which the reversed-order-structure-index creating program 2901 retrieves the already-analyzed-text data of the text to be cataloged from the already-analyzed-text-data storing area 217.

Then, the flow goes on to Step 3105, at which the reversed-order-structure-index creating program 2901 searches the already-analyzed-text data for all nodes, that is, elements and pieces of character-string data, which form the tree-like reversed-order-structure of the already-analyzed-text data. Pieces of processing of Steps 3106 to 3109 are repeated, with the nodes each treated as an object of processing.

At Step 3106, the reversed-order-structure-index creating program 2901 forms a judgment on a node of the already-analyzed-text data currently being processed (that is, a judgment as to whether a metanode associated with (or mutually corresponding to) the node exists in the reversed-order-structure index). A metanode is either a metaelement or a piece of meta-character-string data. If an associated metanode does not exist in the reversed-order-structure index, the flow goes on to Step 3107, at which a metanode is created and cataloged in the reversed-order-structure index. The flow then proceeds to Step 3108, at which a reversed-order context identifier is assigned to the cataloged metanode. A reversed-order context identifier is a number used for uniquely identifying a metanode in the reversed-order-structure index.

Then, the flow continues to Step 3109, at which the reversed-order-structure-index creating program 2901 adds an associative relation between a node in the already-analyzed-text data currently being processed and the reversed-order context identifier uniquely identifying the cataloged metanode in the reversed-order-structure index associated with the node to the already-analyzed-text data, updating the already-analyzed-text data.

After Steps 3106 to 3109 have been repeated for all nodes, the flow continues to Step 3110, at which the updated already-analyzed-text data is output and stored in the already-analyzed-text-data storing area 217. Then, the flow goes on to Step 3111, at which the updated reversed-order-structure index is output and stored in the reversed-order-structure-index storing area 2902, and the reversed-order-structure-index creating program 2901 ends the processing.

As described above, the procedure carried out by the reversed-order-structure-index creating program 2901 is similar to the procedure carried out by the structure-index creating program 211 shown in FIG. 9. In the repetition of the pieces of processing of Steps 3106 to 3109, however, the order of tracing the tree-like structure of the already-analyzed text is different from that of the structure-index creating program 211, resulting in a reversed-order-structure index having a tree-like structure different from the tree-like structure of the structure index produced by the structure-index creating program 211.

Figure 32:
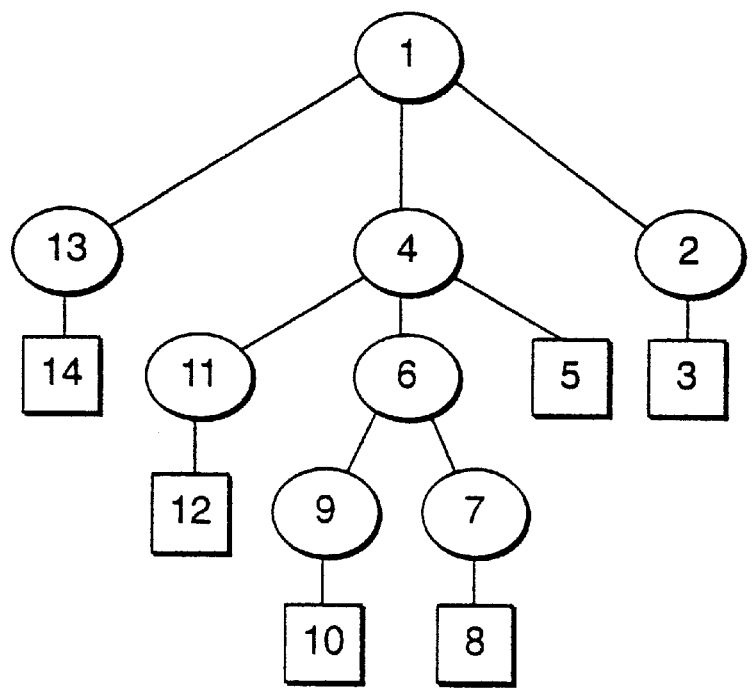
FIG. 32 is a diagram showing an order of tracing already-analyzed-text data in the second embodiment of the present invention.

When repeatedly carrying out the pieces of processing at Steps 3106 to 3109 by treating each node composing the tree-like structure of the already-analyzed-text data as an object, the individual nodes of the tree-like structure are processed by tracing the tree-like structure in an order to be explained by referring to FIG. 32. In this figure, an ellipse represents an element node, whereas a rectangle represents a character-string node. If a node has a plurality of lower-level nodes directly subordinate to it, the lower-level nodes are represented by arranging them from the left to the right in the order in which they appear in the already-analyzed-text data. A number shown inside a node is a processing order number for the node.

As shown in this figure, the order in which a group of nodes are processed at Steps 3106 to 3109 starts with a node located at the root of the tree-like structure. In addition, the order of processing of a specific node and a group of lower-level nodes directly subordinate to the specific node starts with the specific node, followed by processing of the lower-level nodes in an order opposite to the order in which they appear in the tree-like structure, beginning with the right-most directly subordinate node.

Figure 33:
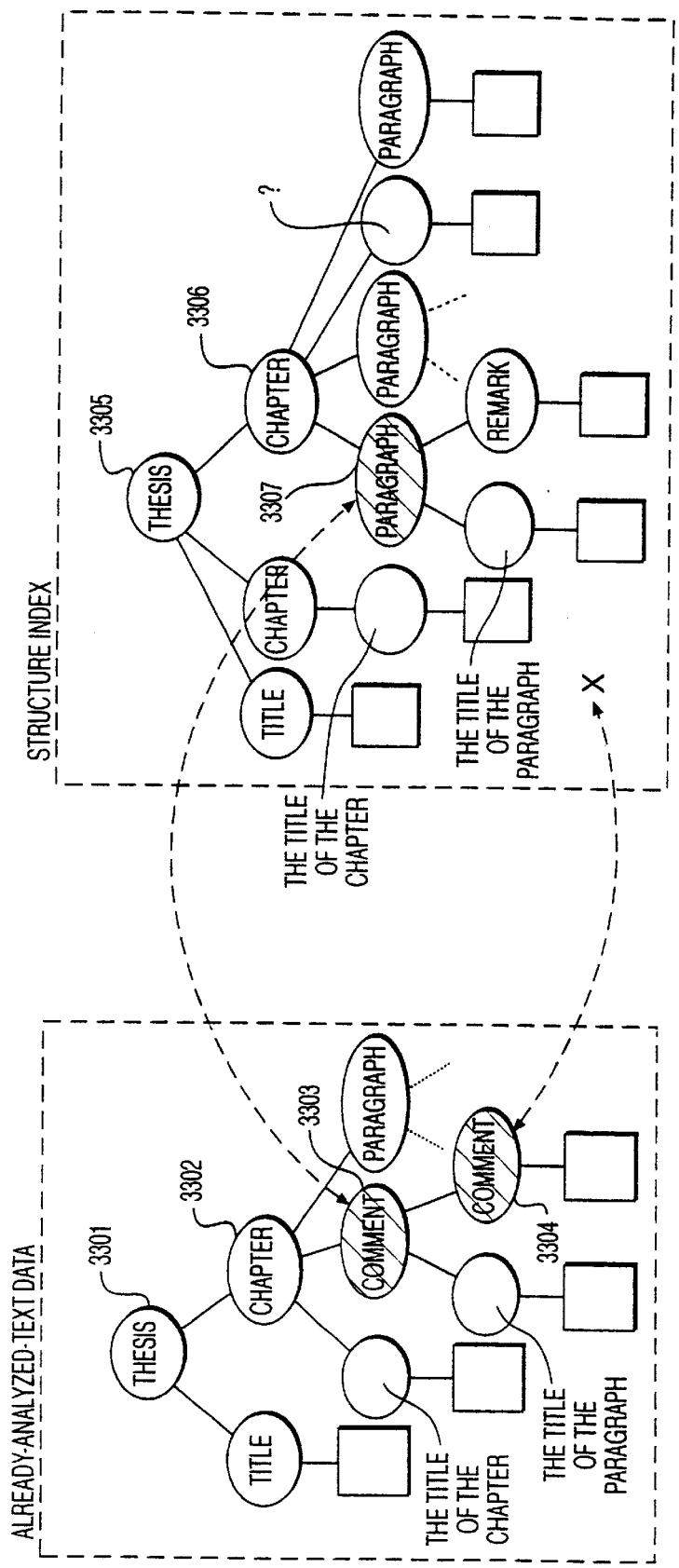
FIG. 33 is a diagram showing an associative relation between a group of nodes composing the tree-like structure of already-analyzed-text data shown on the left-hand side of the figure and a group of nodes (strictly speaking, metanodes) composing the tree-like structure of a reversed-order-structure index for the already-analyzed-text data shown on the right-hand side of the figure in the second embodiment of the present invention.

With reference to FIG. 33, the following is a detailed description of the processing carried out at Step 3106 on a node of the already-analyzed-text data currently being processed to form a judgment as to whether a metanode associated with the node exists in the reversed-order-structure index. FIG. 33 is a diagram showing an associative relation between a group of nodes composing the tree-like structure of the already-analyzed-text data shown on the left-hand side of the figure, and a group of nodes (metanodes) composing the tree-like structure of the reversed-order-structure index for the already-analyzed-text data shown on the right-hand side of the figure.

Here, in the present embodiment, a node in already-analyzed-text data and a metanode in a reversed-order-structure index created for the already-analyzed-text data are defined to be associated with each other (or to mutually correspond to each other) if the reversed-order-tree-like-structure address of the node in the tree-like structure of the already-analyzed-text data is the same as the reversed-order-tree-like-structure address of the metanode in the tree-like structure of the reversed-order-structure index created for the already-analyzed-text data. A reversed-order-tree-like-structure address of a specific node in a tree-like structure of already-analyzed-text data is a sequence of code pairs which are determined when tracing a path in the tree-like structure starting from the root of the tree-like structure and ending at the specific node in an order of descending node level.

Each pair of codes represents a node encountered in the traced path. The first code in each couple indicates the type of the node. Particularly, the first code indicates whether the node is an element or a piece of character-string data and, if the node is an element, the first code also indicates the type of element. The second code in each couple is a number indicating a position in an order of appearance of the node among brother nodes (nodes pertaining to the same type in the tree-like structure), with the last node among the brother nodes regarded as the first one in the order of appearance. The pairs of codes are arranged in the chronological order in which the respective nodes are encountered along the traced path. A reversed-order-tree-like-structure address of a metanode in the tree-like structure of a reversed-order structure index is defined in the same way as a node. In order to distinguish a reversed-order-tree-like-structure address from an ordinary tree-like-structure address, each number in the former has the negative sign as a prefix thereof.

Taking a group of nodes composing the already-analyzed-text data shown on the left-hand side of FIG. 33 as an example, and finding the tree-like-structure addresses of some nodes in the tree-like structure, a node 3301 in the group is the root node in the tree-like structure which does not have a node directly superordinate thereto. The tree-like-structure address of a node 3304 is found by tracing the tree-like structure of the already-analyzed-text data shown, starting from the root node 1101.

Since the node 3301 is found to be a first one among brother nodes pertaining to an element node "thesis", the reversed-order-tree-like-structure address of the node 3301 is "/thesis[-1]". Tracing the tree-like structure further, a node 3302 is found to be a node directly subordinate to the node 3301 and the last one among brother nodes pertaining to the an element node "chapter". Thus, the reversed-order-tree-like-structure address of the node 3302 is "/thesis[1]/chapter[-1]". By the same token, the reversed-order-tree-like-structure address of a node 3303 can be described as "/thesis[-1]/chapter[-1]/paragraph[-2]". This is because the node 3303 is directly subordinate to the node 3302 and a second one from the last among brother nodes pertaining to the an element node "paragraph". Likewise, the reversed-order-tree-like-structure address of a node 3304 can be described as "/thesis[-1]/chapter[-1]/paragraph[-2]/comment[-1]". This is because the node 3304 is directly subordinate to the node 3303 and the last one among brother nodes pertaining to the an element node "comment".

Reversed-order-tree-like-structure addresses of metanodes composing the tree-like structure of the reversed-orderstructure index shown on the right-hand side of FIG. 33 are found in the same way as nodes of the already-analyzed-text data on the left-hand side of the figure. The reversed-order-tree-like-structure address of a metanode 3305 is "/thesis[-1]", which is the same as that of the node 3301. Similarly, the reversed-order-tree-like-structure address of a metanode 3306 is "/thesis[-1]/chapter[-1]", which is the same as that of the node 3302, and the reversed-order-tree-like-structure address of a metanode 3307 is "/thesis[-1]/chapter[-1]/paragraph[-2]", which is the same as that of the node 3303. Thus, the metanodes 3305, 3306, and 3307 are judged to be associated with the nodes 3301, 3302, and 3303 respectively at Step 3106 of the processing procedure shown in FIG. 31.

Since the reversed-order-structure index shown in FIG. 33 does not include a metanode that has the same reversed-order-tree-like-structure address as the node 3304 of the already-analyzed-text data, the node 3304 is judged not to have a metanode associated with it in the reversed-order-structure index. Thus, a new metanode associated with the node 3304 is created and cataloged in the reversed-order-structure index at Step 3107.

A new metanode associated with a node is cataloged in the reversed-order-structure index at Step 3107 by adding the new metanode to the head of a group of metanodes directly subordinate to a higher-level metanode associated with a higher-level node directly superordinate to the node, and assigning a type corresponding to the type of the node to the new metanode. Thus, in the case of the node 3304, a new metanode associated with the node 3304 is cataloged in the reversed-order-structure index at Step 3107 by adding the new metanode to the head of a group of metanodes directly subordinate to the-higher-level metanode 3307 associated with the higher-level node 3303 directly superordinate to the node 3304, and assigning the type "comment" corresponding to the type of the node 3304 to the new metanode.

Figure 34:
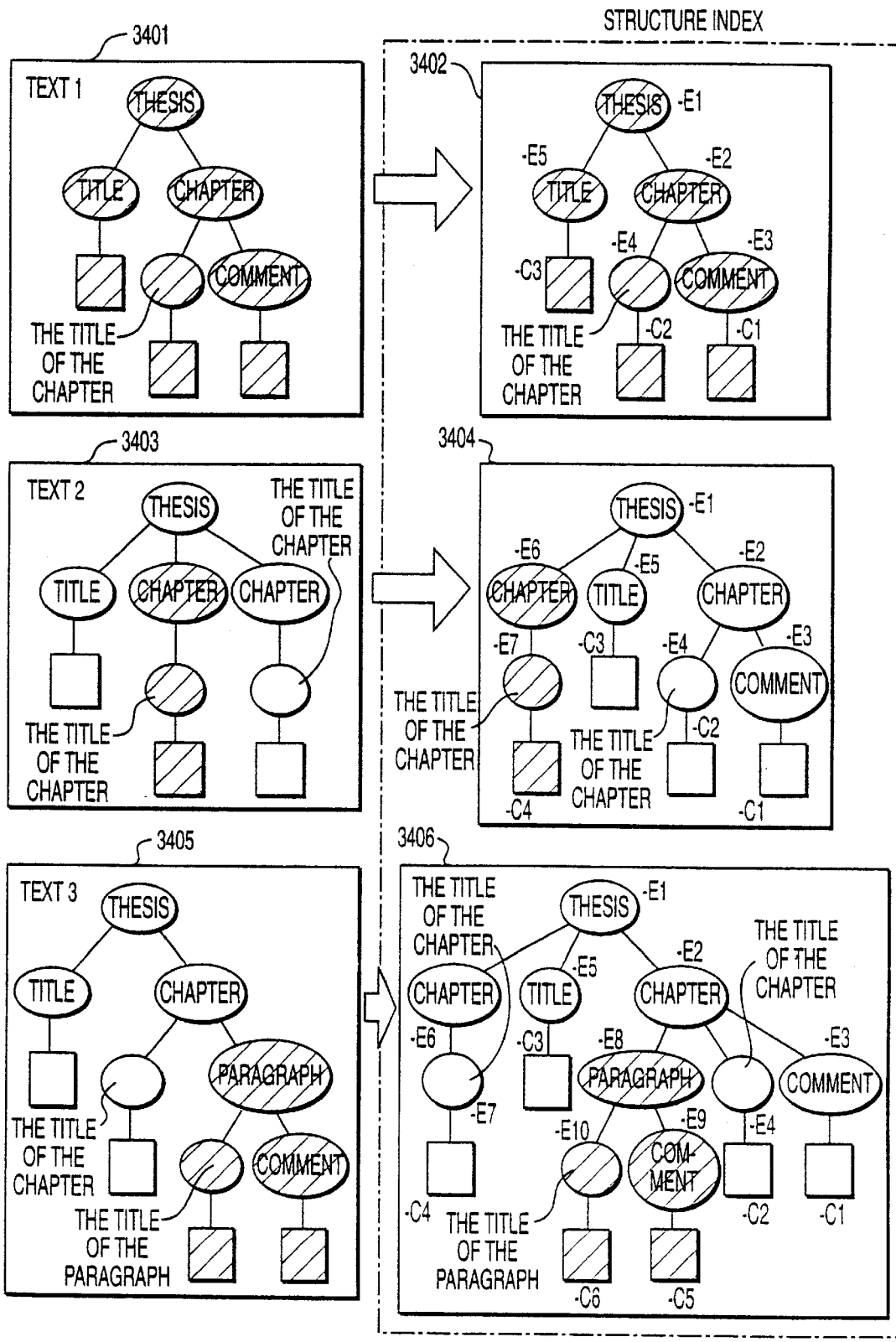
FIG. 34 is a diagram showing a process to develop a reversed-order-structure index by sequentially superposing a plurality of pieces of already-analyzed-text data one after another in the second embodiment of the present invention.

The following is a description of a process to develop a reversed-order-structure index by sequentially superposing a plurality of pieces of already-analyzed-text data one after another, with reference to FIG. 34. In this figure, reference numerals 3401, 3403, and 3405 each denote a piece of already-analyzed-text data of a text to be cataloged. The tree-like structures of the pieces of already-analyzed-text data are sequentially superposed on a reversed-order-structure index in a process of developing the reversed-order-structure index.

When the already-analyzed-text data 3401 of Text 1 is input at an initial stage, the reversed-order-structure index is in an initial (or empty) state. In this case, a tree-like structure equivalent to that of the already-analyzed-text data 3401 is cataloged in the reversed-order-structure index, resulting in the reversed-order-structure index state denoted by reference numeral 3402. At that time, context identifiers -E1, -E2, -E3, -E4, and -E5 are assigned to metaelements newly created in the reversed-order-structure index 3402, whereas context identifiers -C1, -C2, and -C3 are assigned to newly created pieces of meta-character-string data.

Next, when the already-analyzed-text data 3403 of Text 2 is input, nodes in the tree-like structure of the already-analyzed-text data 3403 overlapping those of the existing reversed-order-structure index 3402 are not processed. In other words, only nodes in the tree-like structure of the already-analyzed-text data 3403 with no corresponding ones in the existing reversed-order-structure index 3402 (that is, only hatched nodes in the tree-like structure of the already-analyzed-text data 3403) are newly cataloged in the reversed-order-structure index 3402. At that time, context identifiers -E6 and -E7 are assigned to metaelements newly cataloged in the reversed-order-structure index 3402, whereas a context identifier -C4 is assigned to a newly cataloged piece of meta-character-string data, resulting in the reversed-order-structure index state denoted by reference numeral 3404.

Then, when the already-analyzed-text data 3405 of Text 3 is input, nodes in the tree-like structure of the already-analyzed-text data 3405 overlapping those of the existing reversed-order-structure index 3404 are not processed. In other words, only nodes in the tree-like structure of the already-analyzed-text data 3405 with no corresponding ones in the existing reversed-order-structure index 3404 (that is, only hatched nodes in the tree-like structure of the already-analyzed-text data 3405) are newly cataloged in the reversed-order-structure index 3404. At that time, context identifiers -E8, -E9, and -E10 are assigned to metaelements newly cataloged in the reversed-order-structure index 3404, whereas context identifiers -C5 and -C6 are assigned to newly cataloged pieces of meta-character-string data. When the cataloging of the three pieces of already-analyzed-text data 3401, 3403, and 3405 has been completed, the reversed-order-structure index takes the state denoted by reference numeral 3406.

Figure 35:
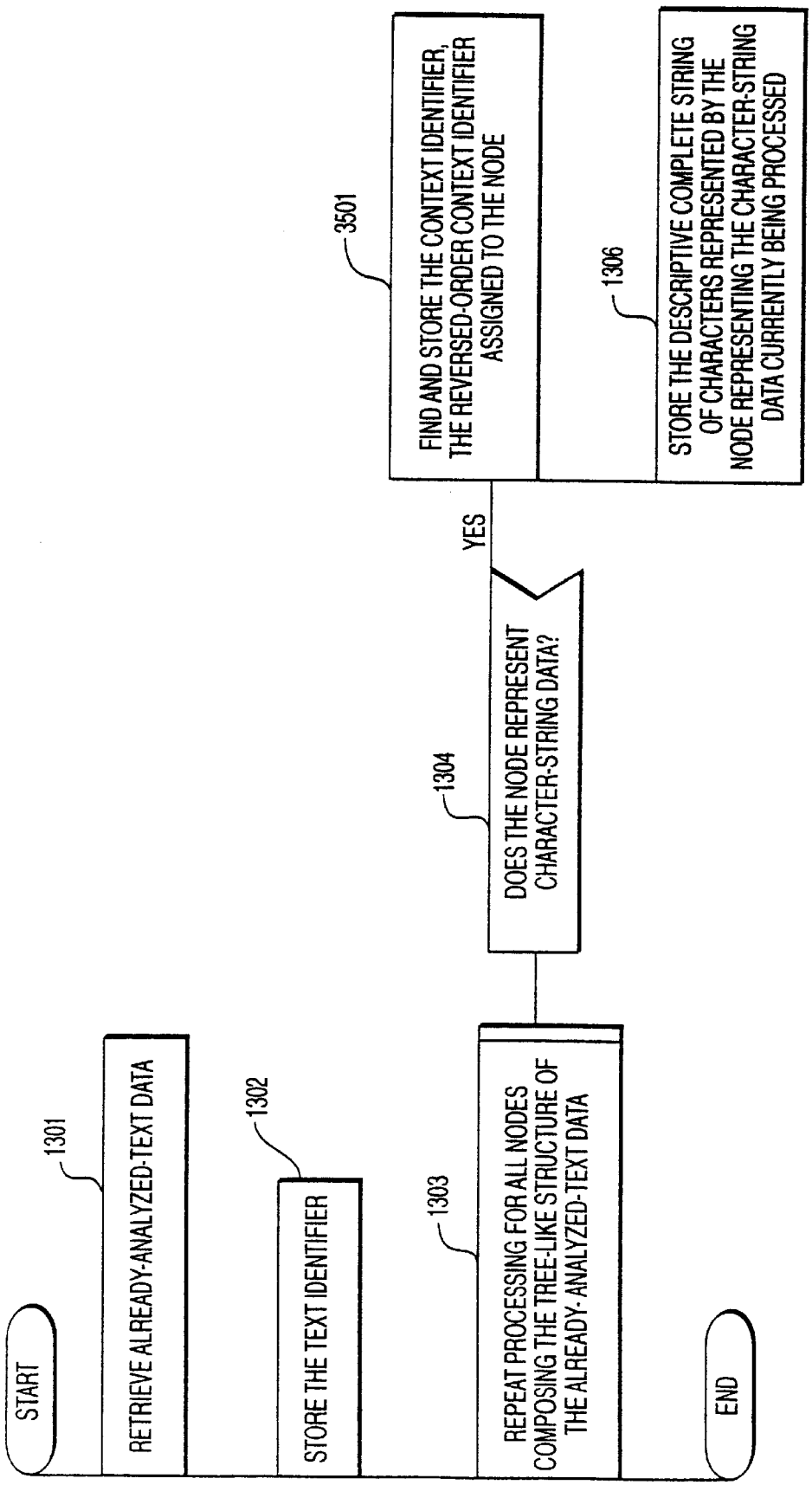
FIG. 35 is a PAD showing details of the procedure carried out by a structured-full-text-data generating program in the second embodiment of the present invention.

FIG. 35 is a PAD showing details of the processing carried out at Step 306 of the procedure shown in FIG. 30, which is carried out by the structured-full-text-data generating program 212 of the present embodiment. As shown in FIG. 35, the procedure carried out by the reversed-order-structured-full-text-data generating program 212 of the present embodiment is similar to that of the first embodiment shown in FIG. 13. However, the present embodiment is different from the first embodiment in that Step 3501 is introduced as a substitute for Step 1305.

At Step 3501, a context identifier and a reversed-order context identifier for a character-string-data node currently being processed are found from the already-analyzed-text data and output to the structured-full-text-data storing area 219.

FIG. 36 is a diagram showing the format in which structured-full-text data is output to a file by the structured-full-text-data generating program 212. FIG. 36 exemplifies a case in which structured-full-text data is generated from the SGML text shown in FIG. 5. As shown in FIG. 36, the format of a file for storing structured-full-text data adopted in the present embodiment starts with a text identifier, followed repetitively by as many sets of three pieces of information as there are pieces of character-string data in the text. The three pieces of information are a context identifier, a reversed-order context identifier, and a descriptive complete string of characters associated with the context identifiers.

Figure 37:
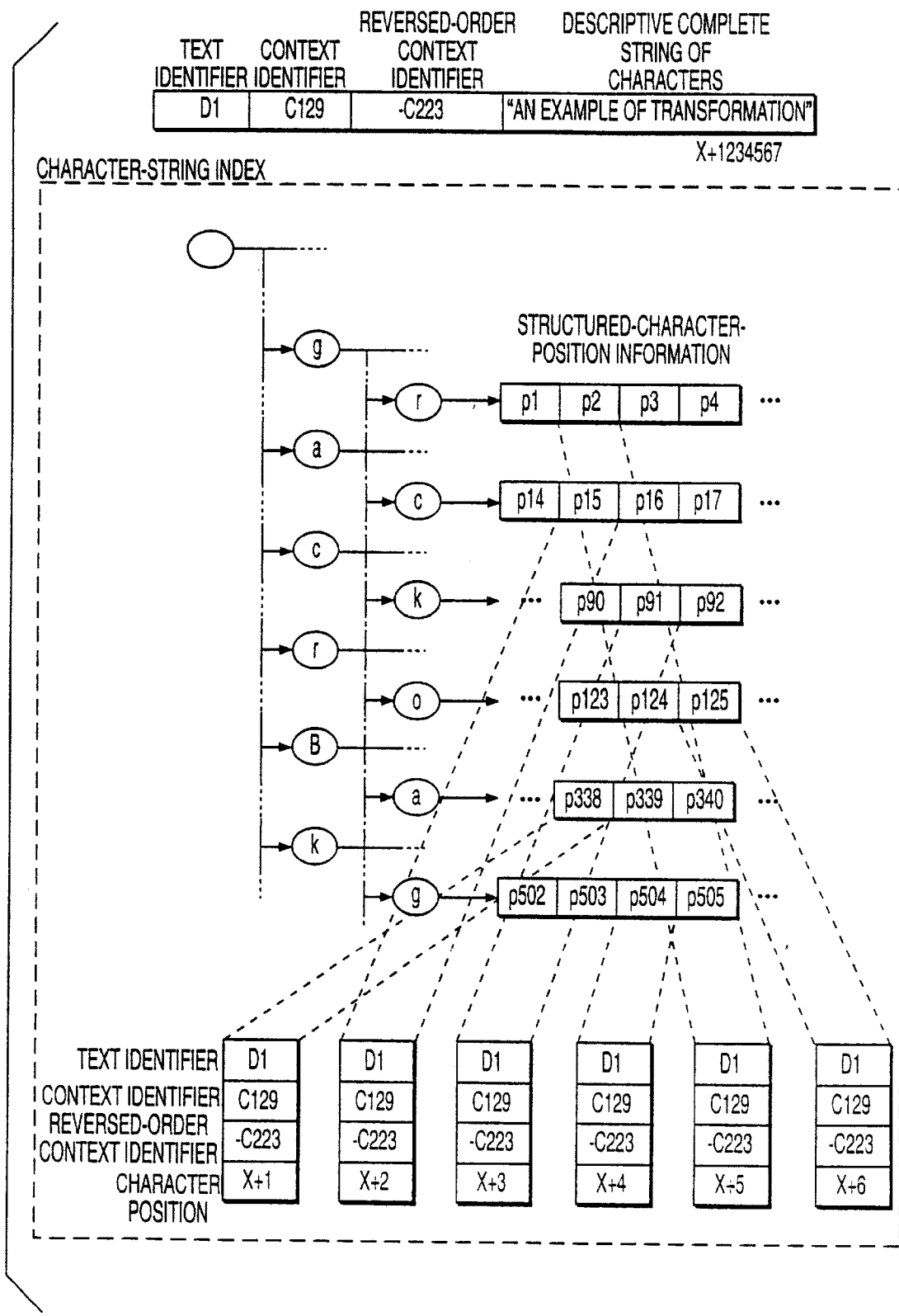
FIG. 37 is a diagram showing the data structure of a character-string index used in the second embodiment of the present invention.

A character-string index of the present embodiment is created according to the same procedure as that of the first embodiment shown in FIG. 15. FIG. 37 is a diagram showing the data structure of a character-string index used in the present embodiment. In more detail, FIG. 37 is a diagram showing a portion of the data structure of a character-string index obtained at a stage where an operation to catalog a group of partial character strings included in the structured-full-text data shown in FIG. 36 into the character-string index has been completed at the end of processing of the structured-full-text data carried out by the character-string-index creating program 213. The portion of the data structure of the character-string index corresponds to the descriptive complete string of characters, "an example of transformation".

As shown in FIG. 37, the character-string index of the present embodiment is also used for holding reversed-order context identifiers, in addition to the pieces of information kept in the character-string index of the first embodiment shown in FIG. 16. Much like the character-string index of the first embodiment, the character node for the last character "n" of the descriptive complete string of characters and the structured-character-position information for the last character are omitted from the portion of the data structure of the character-string index shown in FIG. 16. In addition, the position of the head character of a partial string of characters in the descriptive complete string of characters is expressed as a position relative to X, the position of a character immediately preceding the descriptive complete character string.

At this point, the explanation of the text cataloging sub-system 101 provided by the present embodiment is completed.

Next, the text searching server implemented by the second embodiment of the present invention, that is, the apparatus denoted by reference numeral 102 in FIG. 1, is explained.

Figure 38:
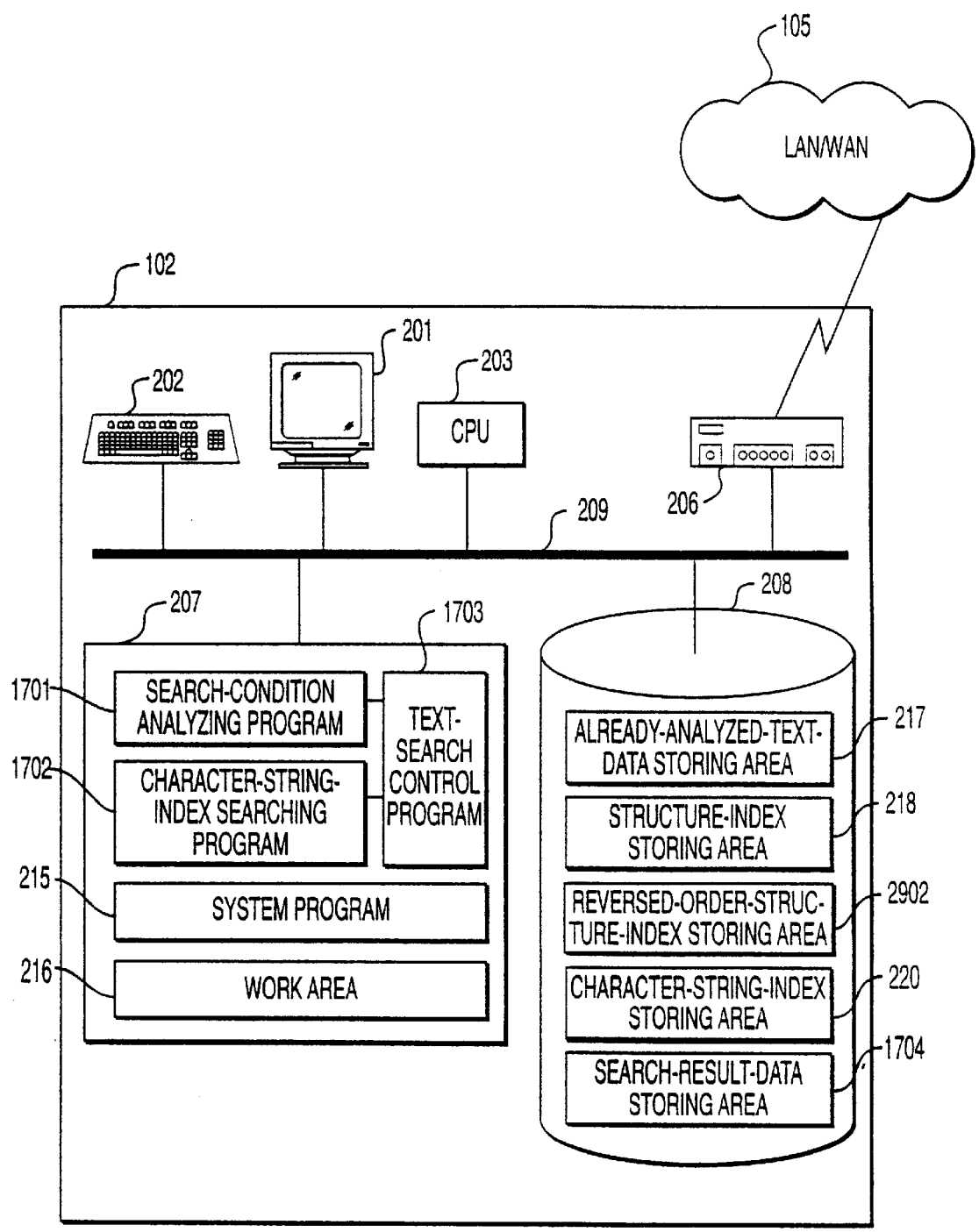
FIG. 38 is a diagram showing the configuration of the text searching server implemented by the second embodiment of the present invention.

FIG. 38 is a diagram showing the configuration of the text searching server 102 implemented by the present embodiment. As shown in this figure, the text searching server 102 has a reversed-order-structure-index storing area 2902 in the magnetic-disk drive 208, in addition to the configuration elements of the text searching server 102 provided by the first embodiment.

Also in the present embodiment, requests and data are exchanged between the text cataloging sub-system 101 and the text searching clients 103 and 104 by way of the network 105. However, it is also possible to employ a portable medium, such as the floppy disk 205, an optical magnetic disk, or a writable optical disk in place of the network 105. As an alternative, the text cataloging sub-system 101 and the text searching server 102 may be implemented by a single computer so that no data transfers are needed between the text cataloging sub-system 101 and the text searching server 102. As another alternative, one or more text searching clients and the text searching server 102 may be implemented by a single computer so that no data transfers are needed between the text searching clients and the text searching server 102.

Figure 39:
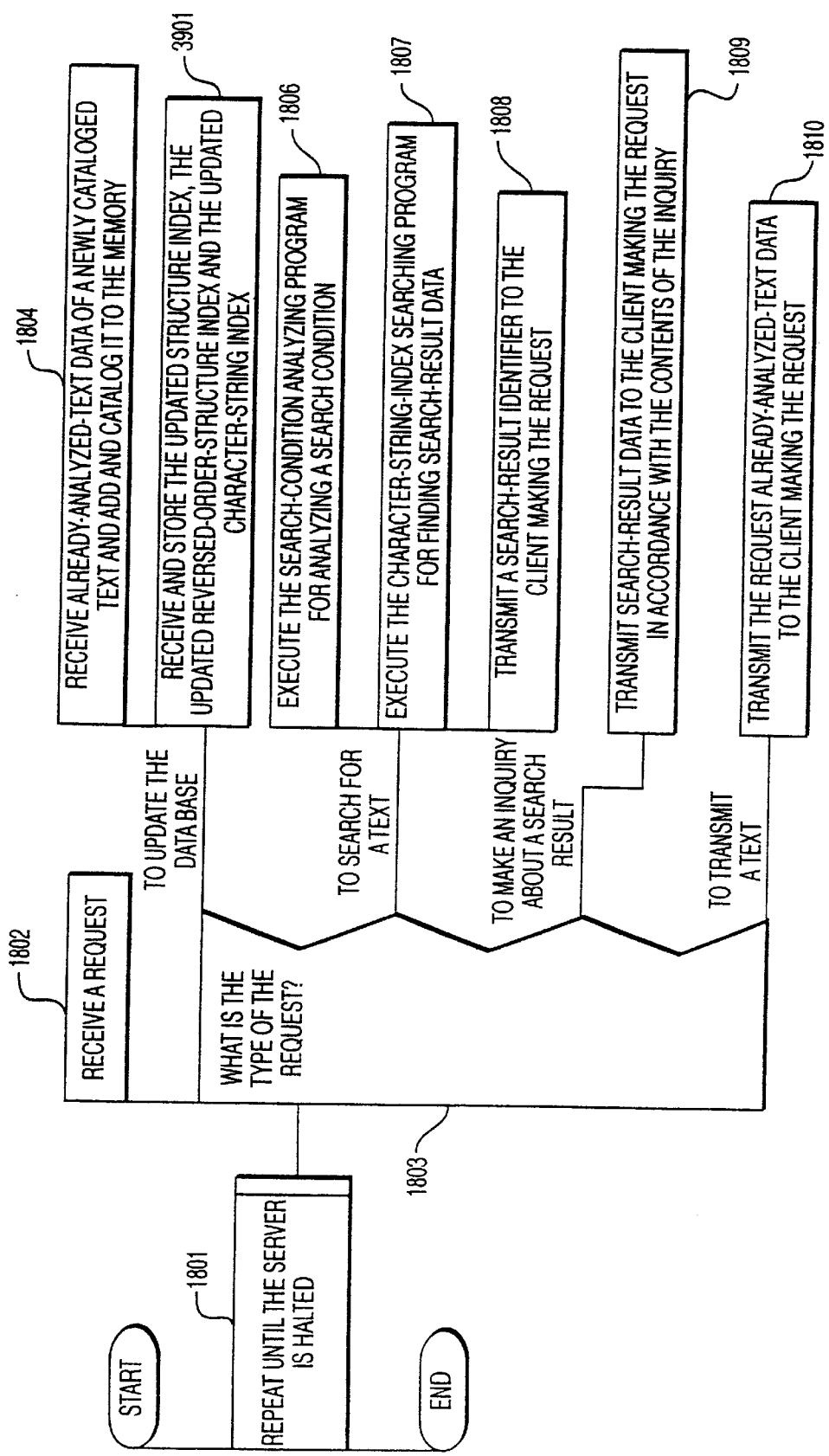
FIG. 39 is a PAD showing a procedure for searching a text adopted by the second embodiment of the present invention.

FIG. 39 is a PAD showing a procedure for searching a text adopted by the second embodiment of the present invention. As shown in this figure, the procedure for searching a text adopted by the second embodiment is similar to that of the first embodiment shown in FIG. 18. However, the procedure for searching a text adopted by the second embodiment is different from that of the first embodiment in that Step 3901 is carried out in place of Step 1805. At Step 3901, an updated character-string index, an updated reversed-order-structure index, and an updated structure index reflecting the contents of a group of newly cataloged texts are received from the text cataloging sub-system 101 and stored in the character-string-index storing area 220, the reversed-order-structure-index storing area 2902, and the structure-index storing area 218, respectively.

Figure 40:
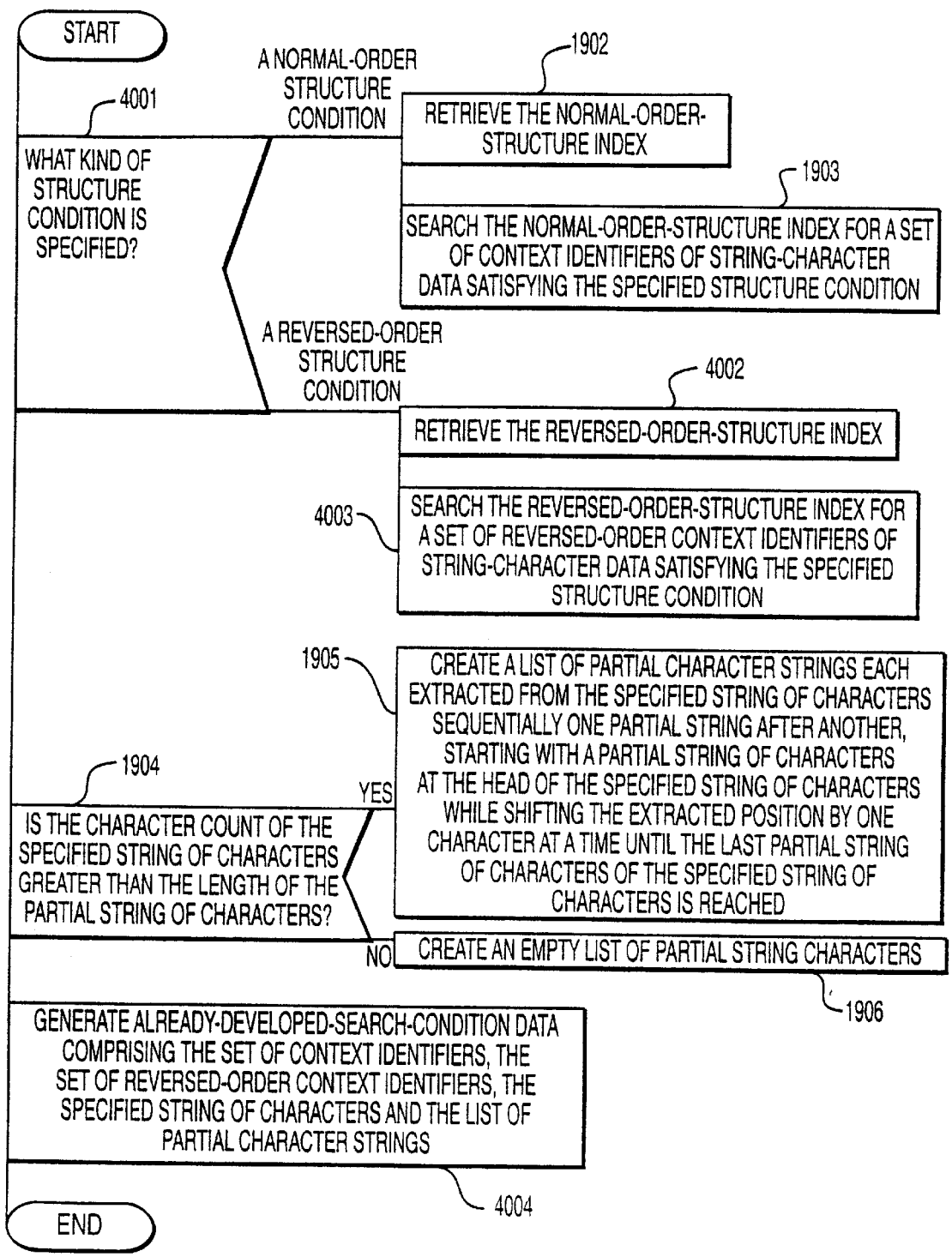
FIG. 40 is a PAD showing details of the procedure carried out by a search-condition analyzing program in the second embodiment of the present invention.

FIG. 40 is a PAD showing details of the processing carried out at Step 1806 of the processing shown in FIG. 39, which is a carried out by the search-condition analyzing program 1701 of the present embodiment.

The procedure shown in FIG. 40 begins with Step 4001, at which the search-condition analyzing program 1701 is invoked by a request for a text search, including a specified search condition as an input to the program, forming a judgment on a structure condition included in the search condition. If the search condition includes a normal-order structure condition, that is, the same structure condition as the first embodiment, pieces of processing of Steps 1902 and 1903 are carried out. Here, the pieces of processing of Steps 1902 and 1903 are the same as those of the first embodiment. If the search condition includes a reversed-order structure condition, on the other hand, pieces of processing of Steps 4002 and 4003 are carried out. If the search condition does not include a reversed-order structure condition or a normal-order structure condition, however, the flow goes on to Step 1904.

At Step 4002, the reversed-order-structure index is retrieved from the reversed-order-structure-index storing area 2902. The flow then proceeds to Step 4003, at which the reversed-order-structure index is searched for a set of reversed-order context identifiers of all pieces of character-string data included in the reversed-order-structure index which satisfies the structure condition. The set of reversed-order context identifiers is referred to hereafter as a reversed-order-context-identifier set.

The pieces of processing carried out at Steps 1904, 1905, and 1906 are the same as those of the first embodiment. After the processing carried out at Step 1903, 4003, or 1906 is completed, the flow goes on to a step 4004.

At Step 4004, the search-condition analyzing program 1701 generates already-developed-search-condition data comprising the set of context identifiers found at Step 4003, the specified string of characters included in the search condition, and the list of partial character strings generated at Step 1905 or 1906, terminating the processing.

Figure 41:
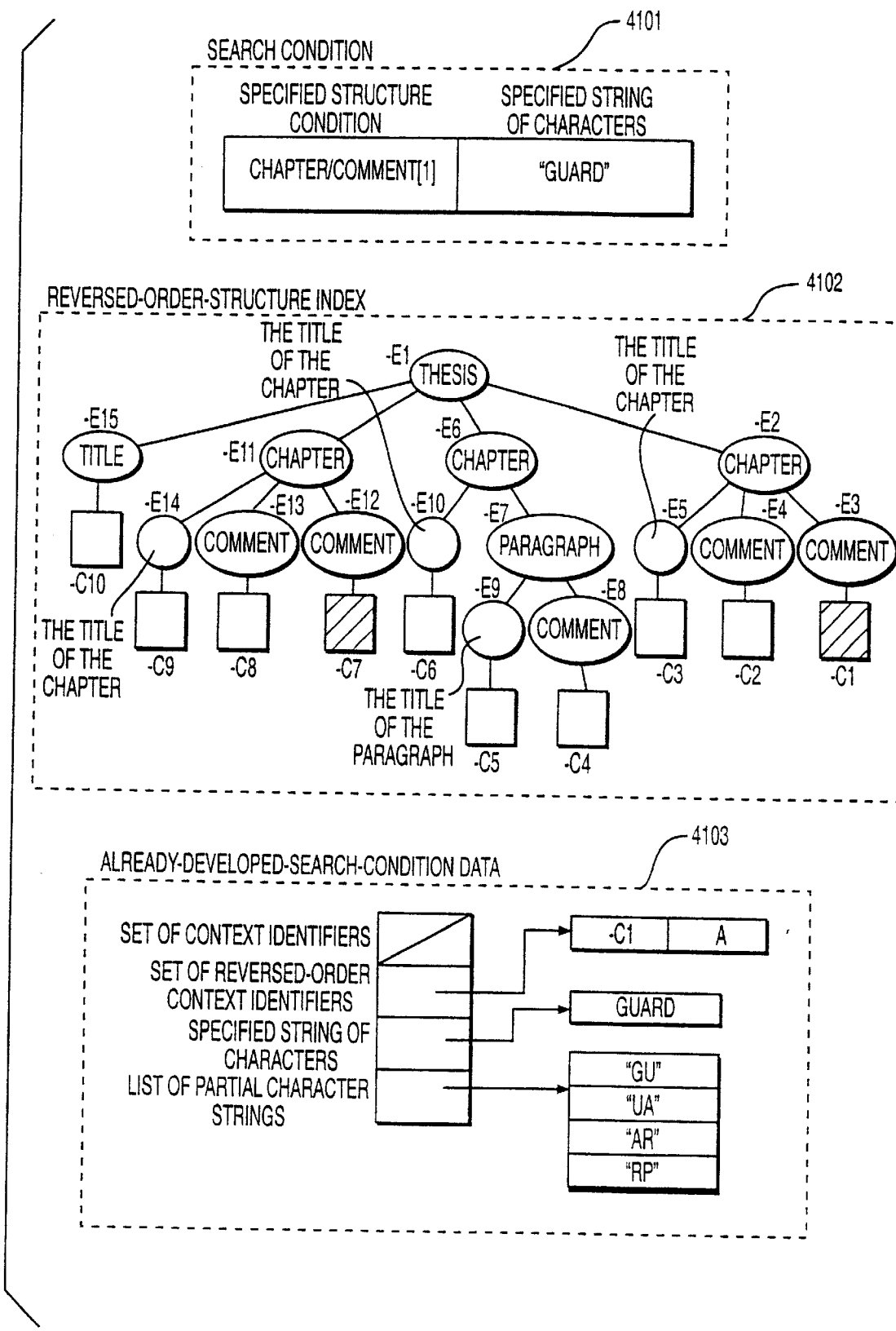
FIG. 41 is a diagram showing an example of generation of already-developed-search-condition data in processing carried out by the search-condition analyzing program in the second embodiment of the present invention.

FIG. 41 is a diagram showing an example of generation of the already-developed-search-condition data in processing carried out by the search-condition analyzing program 1701 in the present embodiment.

In this figure, reference numeral 4101 denotes an example of a search condition specified in a request for a text search. As shown in this figure, the search condition 4101 comprises a specification of a reversed-order-structure condition "chapter/comment[-1]" and a specification of a character-string condition "guard". The search condition 4101 specifies a search of the reversed-order-structure index to be carried out for a case in which a string of characters "guard" appears in a last element "comment" directly subordinate to an element "chapter".

Assuming that the contents of the reversed-order structure index are as shown by reference numeral 4102, since the structure condition specified in the search condition is a reversed-order structure condition prescribing a search to be started from the end of the structure, as a result of the search of the reversed-order-structure index carried out at Step 4003 of the processing procedure shown in FIG. 40, "comment" elements satisfying the specification of the reversed-order-structure condition are found out to be those having context identifiers -E3 and -E12. Thus, pieces of character-string data directly subordinate to these "comment" elements (that is, pieces of character-string data with the context identifiers -C1 and -C7) must be next searched for a case in which the string of characters "guard" appears. In the character-string index to be used in the search, however, only appearance positions of partial character strings each having a length of two characters are cataloged. Thus, a direct search for a specified string of three or more characters like the string "guard" cannot be carried out.

In order to solve this problem, the search-condition analyzing program 1701 sequentially extracts a group of partial character strings, each of which has a character count of two from the specified string of characters, starting with the partial string of characters at the head of the specified string of characters, while shifting the extracted position by one character at a time until the last partial string of characters of the specified string of characters is extracted. The program then generates a list of partial character strings, including the extracted partial character strings, as members thereof at Step 1905. In the case of the specified string of characters "guard", the list of partial character strings extracted from the specified string has the partial character strings "gu", "ua", "ar", and "rd" as its members.

As a result, already-analyzed-search-condition data 4103, which comprises an empty context-identifier set, a reversed-order context-identifier set (-C1, -C7), the specified string of characters "guard", and a list of partial character strings ("gu", "ua", "ar", and "rd") as shown in FIG. 41, is generated at Step 4004 of the procedure shown in FIG. 40.

Figure 42:
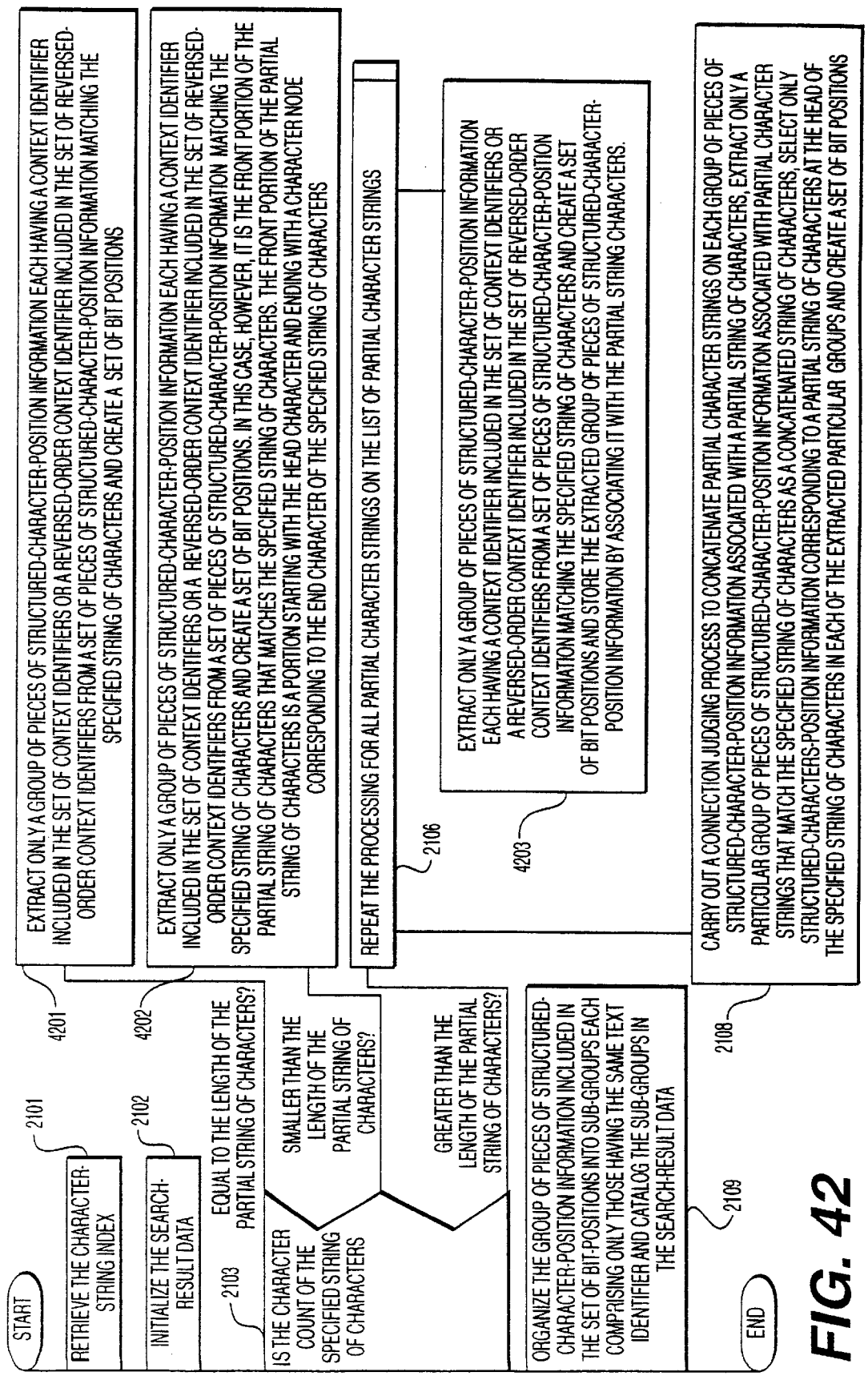
FIG. 42 is a PAD showing details of the procedure carried out by a character-string-index searching program in the second embodiment of the present invention.

FIG. 42 is a PAD showing details of the processing carried out at Step 1807 of the procedure shown in FIG. 39, which is carried out by the character-string-index searching program 1702 of the present embodiment.

The character-string-index searching program 1702 is activated, inputting already-developed-search-condition data generated by the search-condition analyzing program 1701. As shown in FIG. 42, the procedure carried out by the character-string-index searching program 1702 of the present embodiment is similar to that of the first embodiment. However, the procedure carried out by the character-string-index searching program 1702 of the present embodiment is different from that of the first embodiment in that, in the case of the present embodiment, pieces of processing of Steps 4201, 4202, and 4203 are carried out in place of those of the Steps 2104, 2105, and 2107, respectively, of the first embodiment shown in FIG. 21.

At Step 4201, the character-string index is searched for partial character strings matching the specified string of characters, and a set of pieces of structured-character-position information corresponding to the partial character strings are found. Then, only a group of pieces of structured-character-position information, each of which has a context identifier included in the set of context identifiers of the already-developed-search-condition data or a reversed-order context identifier included in the set of reversed-order context identifiers of the already-developed-search-condition data, are extracted from the set of pieces of structured-character-position information. Finally, a set of bit positions composed of the extracted group of pieces of structured-character-position information is created.

Much like Step 4201, at Step 4202, the character-string index is first searched for partial character strings matching the specified string of characters, and a set of pieces of structured-character-position information corresponding to the partial character strings are found. In this case, however, since the character count of the specified string of characters is smaller than the length of a partial string of characters, the character-string index is searched for partial character strings, the front portion of each of which matches the specified string of characters. The front portion of a partial string of characters is the portion starting with the head character and ending with a character node corresponding to the end character of the specified string of characters. Then, only a group of pieces of structured-character-position information, each of which has a context identifier included in the set of context identifiers of the already-developed-search-condition data or a reversed-order context identifier included in the set of reversed-order context identifiers of the already-developed-search-condition data, are extracted from the group of pieces of structured-character-position information. Finally, a set of bit positions composed of the extracted group of pieces of structured-character-position information is created.

At Step 2106, processing of Step 4203 is repeated for each of the partial character strings that constitute the list of partial character strings in the already-developed-search-condition data. At Step 4203, the character-string index is searched for a partial string of characters, and a set of pieces of structured-character-position information corresponding to the partial string of characters is found. Then, only a group of pieces of structured-character-position information, each of which has a context identifier included in the set of context identifiers of the already-developed-search-condition data or a reversed-order context identifier included in the set of reversed-order context identifiers of the already-developed-search-condition data, are extracted from the set of pieces of structured-character-position information. Finally, the extracted group of pieces of structured-character-position information are stored by being associated with the partial string of characters.

Figure 22:
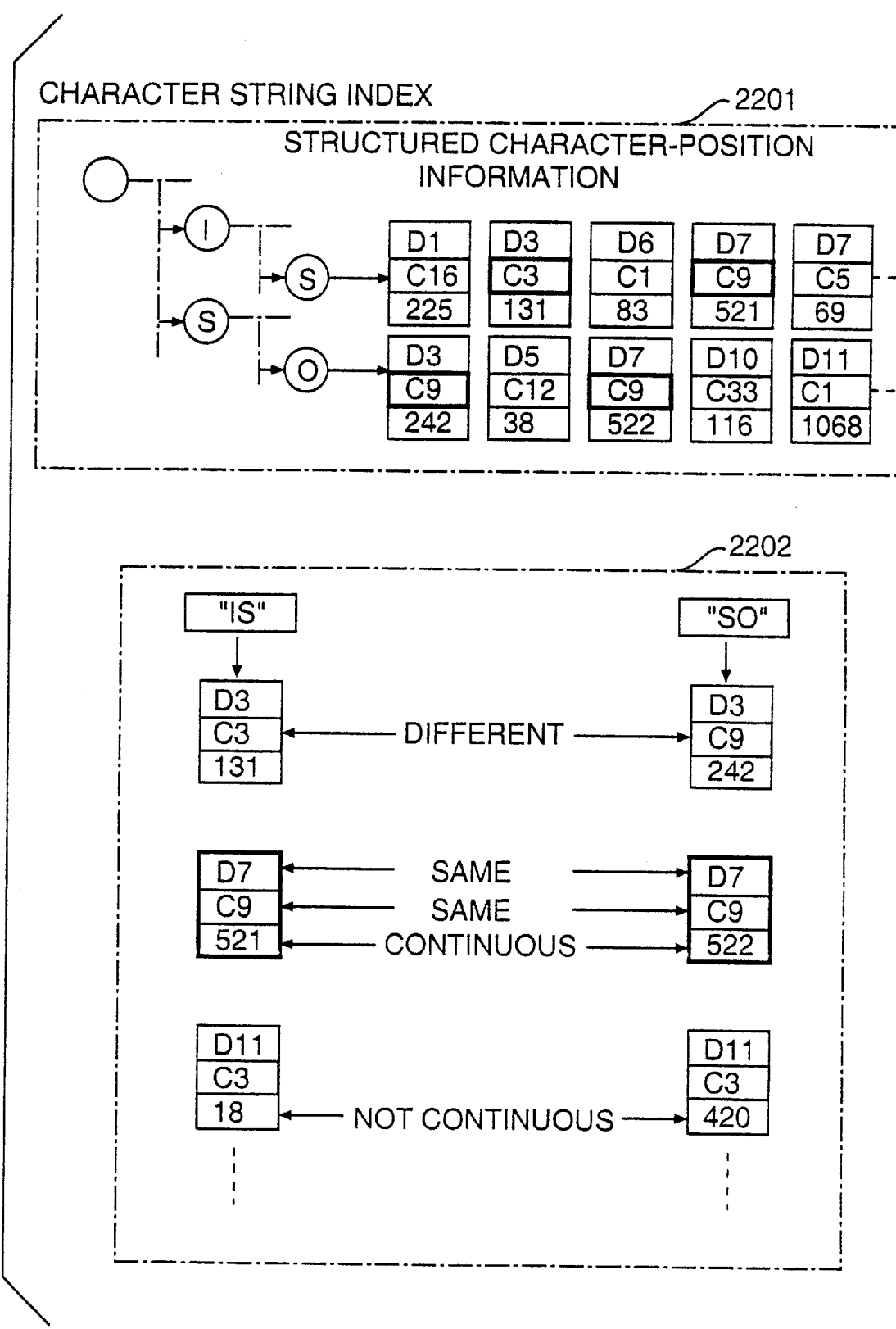
FIG. 22 is a diagram showing a concatenation judging process carried out by the character-string-index searching program in the first embodiment of the present invention.

The processing carried out at Step 2108 of the procedure shown in FIG. 42 (that is, the concatenation judging process carried out by the character-string-index searching program 1702) is the same as that of the first embodiment shown in FIG. 22. In the case of the second embodiment, however, if the search condition specifies a reversed-order structure condition, a concatenation judgment is formed by finding out whether the reversed-order context identifiers of the partial character strings to be concatenated match each other, instead of finding out whether the context identifiers of the partial character strings to be concatenated match each other.

As described above, according to the configuration provided by the present embodiment, it is possible to carry out a search operation specifying a structure condition of tracing the logical structure of a text in the reversed order (that is, tracing the logical structure of a text starting from the end of the text) in addition to a variety of structure conditions that can be used in a search operation in the first embodiment. Examples of a structure condition of tracing the logical structure of a text in the reversed order are "Search the last chapter of a thesis for a specific string of characters" and "Search a second reference from the end of a list of references for a specific string of characters."

At this point, the explanation of the second embodiment of the present invention is completed.

Third Embodiment

Next, a third embodiment provided by the present invention is described.

The configuration of the structured-text cataloging/searching system implemented by the present embodiment and the procedures of the programs thereof are the same as those of the first embodiment, except that the way a node in the tree-like structure of already-analyzed-text data is associated with a metanode in the structure index in the present embodiment is different from that in the first embodiment. As a result, even if the same group of texts are input, the third embodiment will result in a structure index with a data structure and assignment of context identifiers that are different from those of the first embodiment.

Figure 43:
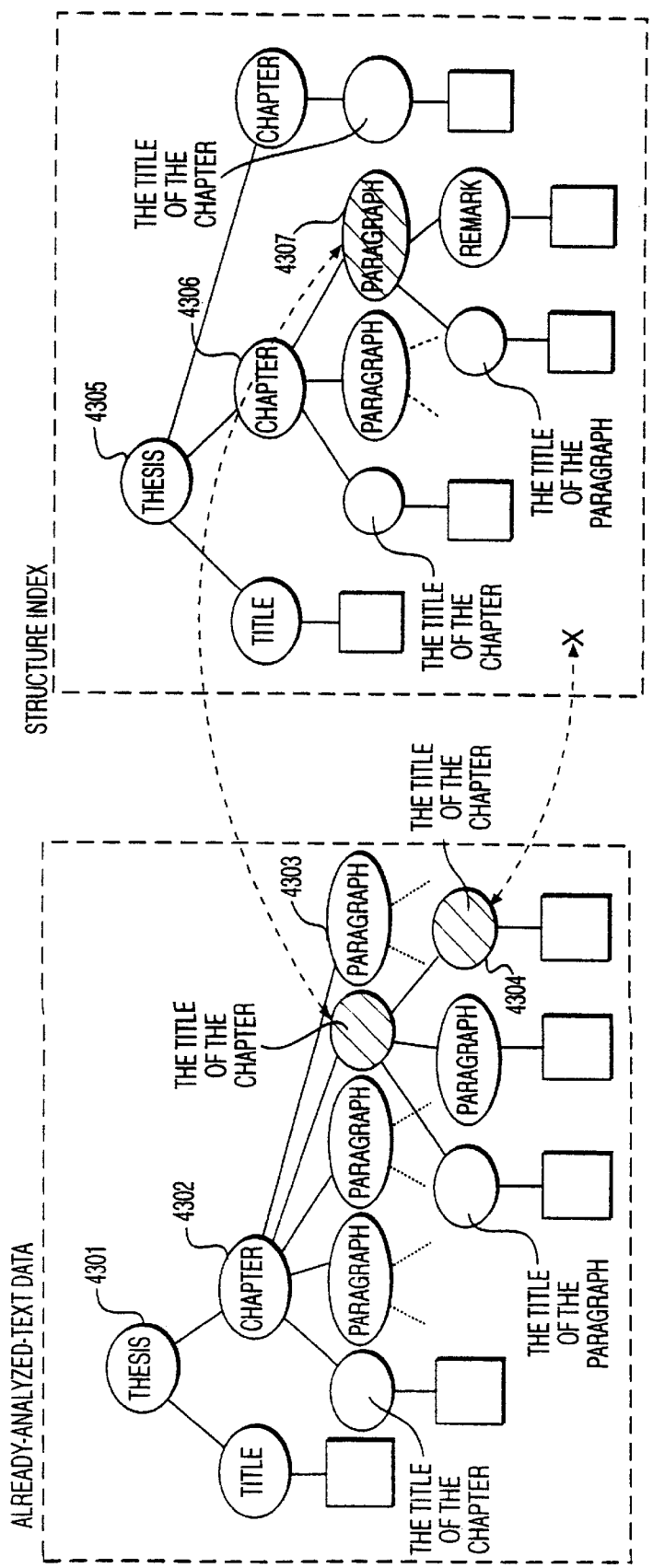
FIG. 43 is a diagram showing an associative relation between a group of nodes composing the tree-like structure of already-analyzed-text data shown on the left-hand side of the figure and a group of nodes (strictly speaking, metanodes) composing the tree-like structure of a structure index for the already-analyzed-text data shown on the right-hand side of the figure in a third embodiment of the present invention.

An associative relation between a group of nodes constituting the tree-like structure of already-analyzed-text data and a group of nodes (strictly speaking, metanodes) constituting the tree-like structure of a structure index created for the already-analyzed-text data in the present embodiment is explained by referring to FIG. 43. FIG. 43 is a diagram showing an associative relation between a group of nodes composing the tree-like structure of already-analyzed-text data shown on the left-hand side of the figure and a group of metanodes composing the tree-like structure of a structure index for the already-analyzed-text data shown on the right-hand side of the figure.

Also in the case of the present embodiment, a node in already-analyzed-text data and a metanode in a structure index created for the already-analyzed-text data are defined to be associated with each other if the tree-like-structure address of the node in the tree-like structure of the already-analyzed-text data is the same as the tree-like-structure address of the metanode in the tree-like structure of the structure index, as is the case with the first and second embodiments. However, the third embodiment is different from the first and second ones in that, in the case of the third embodiment, with respect to the order of appearance among brother nodes of the same type having a common direct superordinate node, the second node is distinguished from the head node but the second and subsequent nodes are not distinguished from each other. The number in a tree-like-structure address representing a position in the order of appearance is either [1] to indicate a head node or [2] to indicate a second or subsequent nodes in the order of appearance among brother nodes. The number in a tree-like-structure address representing a position in the order of appearance never has a value of [3] or greater.

Considering a group of nodes composing the already-analyzed-text data shown on the left-hand side of FIG. 43 as an example, the tree-like-structure address of a node 4304 is found in the group. As shown in this figure, a node 4301 in the group is the root node in the tree-like structure which does not have a node directly superordinate thereto. The tree-like-structure address of a node 4304 is found by tracing the tree-like structure of the already-analyzed-text data shown, starting from the root node 4301.

Since the node 4301 is a first one among brother nodes pertaining to the element node "thesis", the tree-like-structure address of the node 4301 is "/thesis[1]". Tracing further the tree-like structure, a node 4302 is found to be directly subordinate to the node 4301. The node 4302 is a first one among brother nodes pertaining to the element node "chapter". Thus, the tree-like-structure address of the node 4302 is "/thesis[1]/chapter[1]". By the same token, the tree-like-structure address of a node 4303 can be described as "/thesis[1]/chapter[1]/paragraph[2] ", because the node 4303 is directly subordinate to the node 4302 and a fourth one among brother nodes pertaining to the element node "paragraph".

In spite of the fact that the node 4303 is a fourth one among brother nodes pertaining to the an element node "paragraph", it is not distinguished from the second one and, hence, identified by a code "/paragraph[2]" instead of "/paragraph[4]". Likewise, the tree-like-structure address of a node 4304 can be described as "thesis[1]/chapter[1]/paragraph[2]/comment[2]", because the node 4304 is directly subordinate to the node 4303 and a second one among brother nodes pertaining to the element node "comment".

Tree-like-structure addresses of metanodes that constitute the tree-like structure of the structure index shown on the right-hand side of FIG. 43 are found in the same way as the nodes of the already-analyzed-text data on the left-hand side of the figure. The tree-like-structure address of a metanode 4305 is "/thesis[1]", which is the same as that of the node 4301. Similarly, the tree-like-structure address of a metanode 4306 is "/thesis[1]/chapter[1]", which is the same as that of the node 4302, and the tree-like-structure address of a metanode 4307 is "/thesis[1]/chapter[1]/paragraph[2]", which is the same as that of the node 4303. Thus, the metanodes 4305, 4306, and 4307 are judged to be associated with (or mutually correspond to) the nodes 4301, 4302, and 4303, respectively. It should be noted that, since the structure index shown in FIG. 43 does not include a metanode that has the same tree-like-structure address as the node 4304 of the already-analyzed-text data, the node 4304 is judged not to have a metanode associated with it in the structure index.

As a result of the addressing rule described above, there will never be added three or more metanodes of the same type to a structure index created in the third embodiment, or there will be no more than two metanodes of the same type in the three-like structure of a structure index, because the third and subsequent nodes of the same type in the tree-like structure of already-analyzed-text data have the same context identifier as the second one assigned thereto. For this reason, with the text searching method provided by the present embodiment, it is no longer possible to specify any arbitrary appearance order in a structure condition. To be more specific, it is possible to distinguish only a first element from the second or subsequent ones among elements of the same type. When the structure condition is restricted as described above, the data structure of the structure index of the present embodiment becomes simple in comparison with that of the first and second embodiments, allowing the size of the structure-index storing area 218 to be reduced.

In spite of the fact that the associative relation between nodes and metanodes described above is embraced in the present embodiment, a structure condition of tracing an order of appearance starting from the end of the order can be specified if two structure indexes (that is, the normal-order and reversed-order structure indexes) are provided in advance, as is the case with the second embodiment.

At this point, the explanation of the third embodiment is completed.

Fourth Embodiment

A fourth embodiment applying the present invention is described next.

Figure 44:
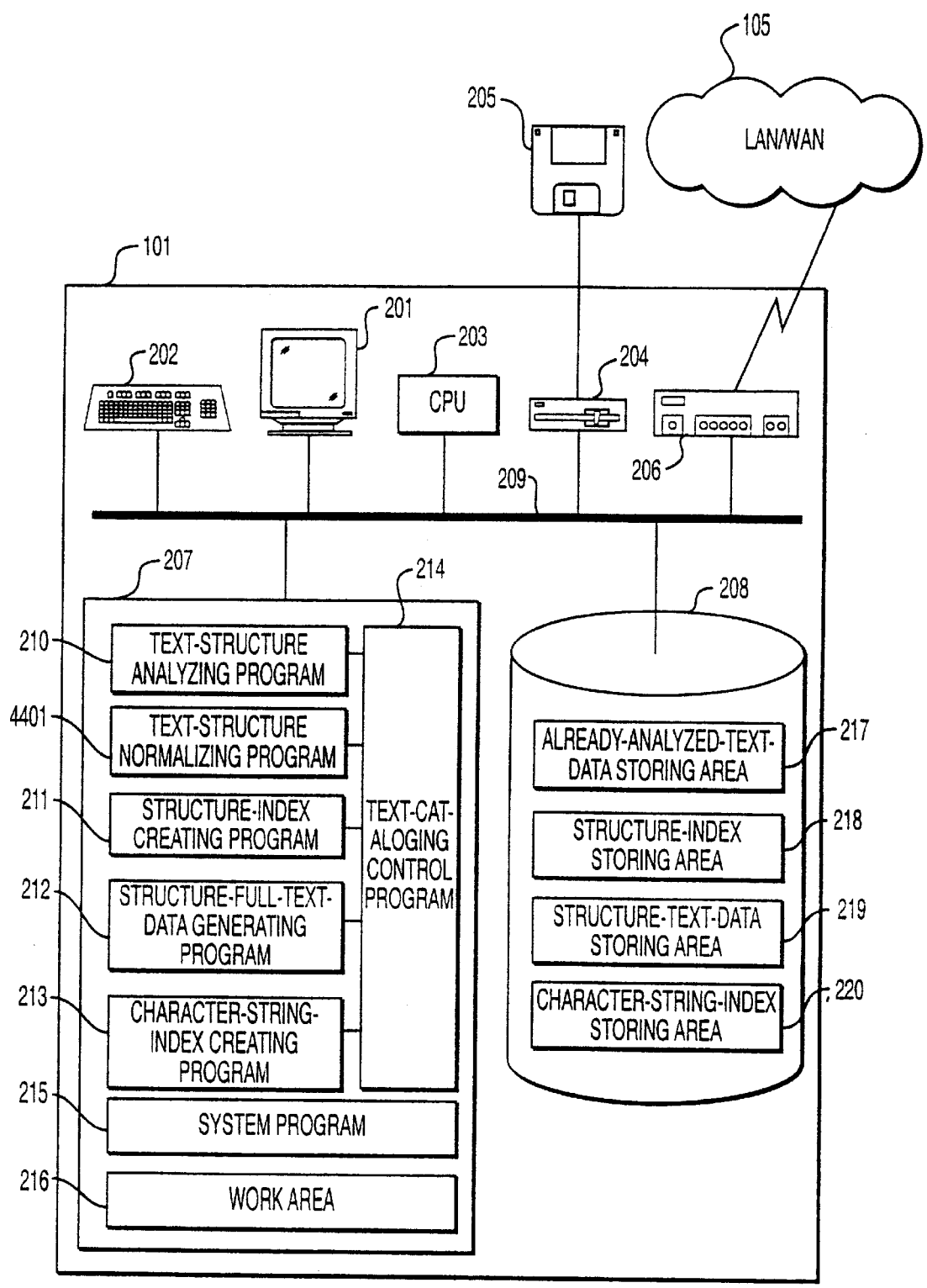
FIG. 44 is a diagram showing the configuration of a text cataloging sub-system as implemented by the third embodiment of the present invention.

FIG. 44 is a diagram showing the configuration of a text cataloging sub-system 101 as implemented by the present embodiment.

The text cataloging sub-system 101 shown in FIG. 44 is similar to that implemented by the first embodiment shown in FIG. 2 as far as the hardware configuration and the configuration of the magnetic disk 208 are concerned. In the case of the text cataloging sub-system 101 provided by the fourth embodiment shown in FIG. 44, however, the main memory unit 207 also stores a text-structure normalizing program 4401, in addition to the programs stored in the main memory unit 207 of the first embodiment.

In the present embodiment, the text-cataloging control program 214 controls the activation and the execution of the text-structure analyzing program 210, the text-structure normalizing program 4401, the structure-index creating program 211, the structured-all-text-data generating program 212, and the character-string-index creating program 213. The text-cataloging control program 214 also transmits the already-analyzed-text data generated by the text-structure analyzing program 210, the structure index generated by the structure-index creating program 211, and the character-string index generated by the character-string-index creating program 213 to the text searching server 102 by way of the network 105.

As described above, the present embodiment has a configuration wherein a text to be cataloged is input from the floppy disk 205. However, it is also possible to use another kind of portable medium, such as an optical magnetic disk or a writable optical disk, in place of the floppy disk 205. As an alternative configuration, a text to be cataloged can also be input through the network 105.

In addition, in the configuration of the present embodiment, the already-analyzed-text data generated by the text-structure analyzing program 210, the structure index generated by the structure-index creating program 211, and the character-string index generated by the character-string-index creating program 213 are transmitted to the text searching server 102 by way of the network 105. Instead of using the network 105, though, the present invention can also use a portable medium such as a floppy disk, an optical magnetic disk, or a writable optical disk for transferring the information. As an alternative, it is also possible to implement the text cataloging sub-system 101 and the text searching server 102 by a single computer so that no data transfers are needed between the text cataloging sub-system 101 and the text searching server 102.

Figure 45:
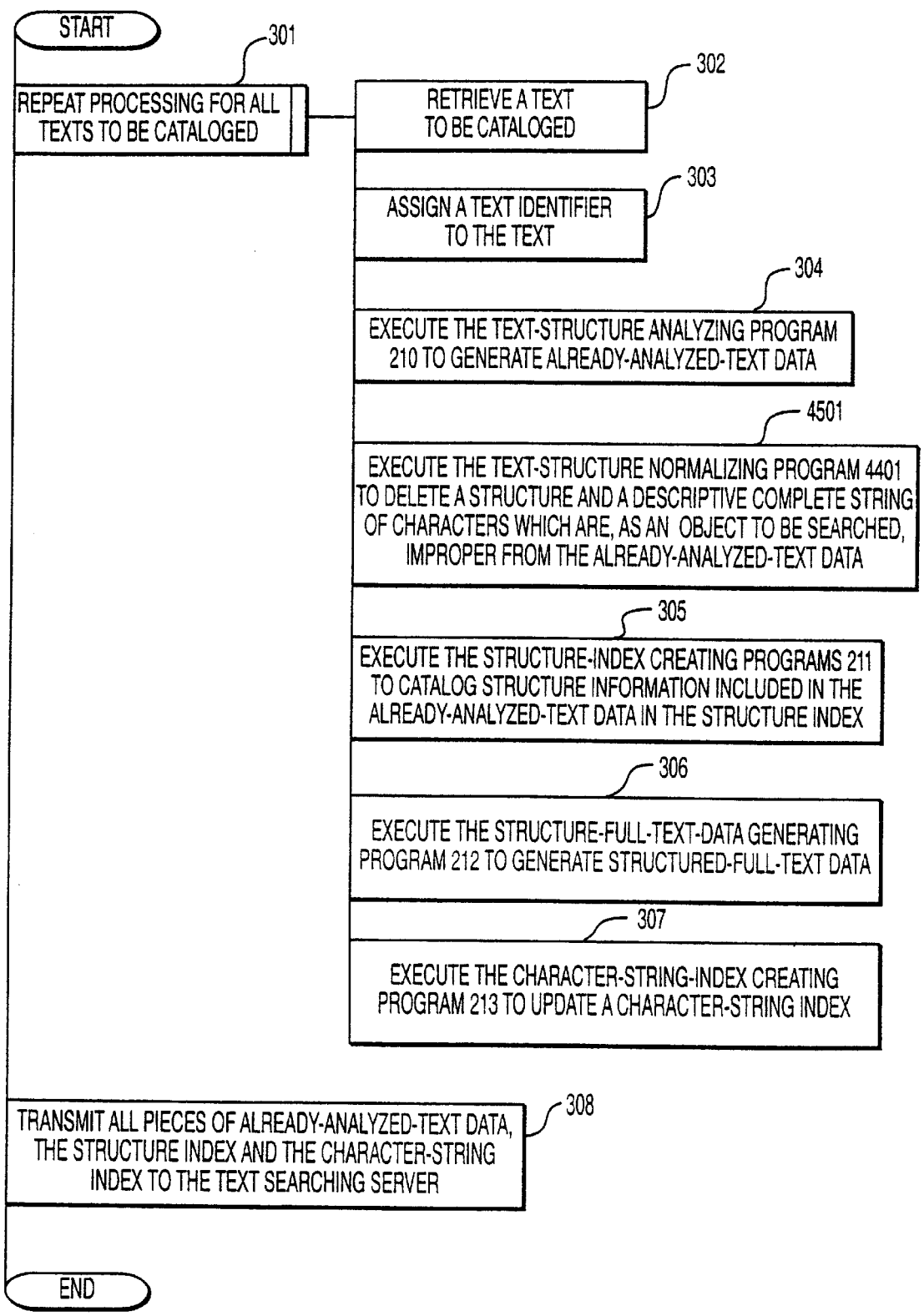
FIG. 45 is a PAD showing a procedure for cataloging a text adopted by a fourth embodiment of the present invention.

FIG. 45 is a PAD showing a procedure for cataloging a text adopted by the fourth embodiment of the present invention. The procedure shown in this figure is similar to that of the first embodiment shown in FIG. 3. However, the present procedure is different from that of FIG. 3 in that Step 4501 is inserted right after Step 304.

At the newly inserted Step 4501, the text-structure normalizing program 4401 is executed to input already-analyzed-text data generated at Step 304. The text-structure normalizing program 4401 extracts a structure and a descriptive complete string of characters which are, as an object to be searched, improper from the already-analyzed-text data and deletes them.

Figure 46:
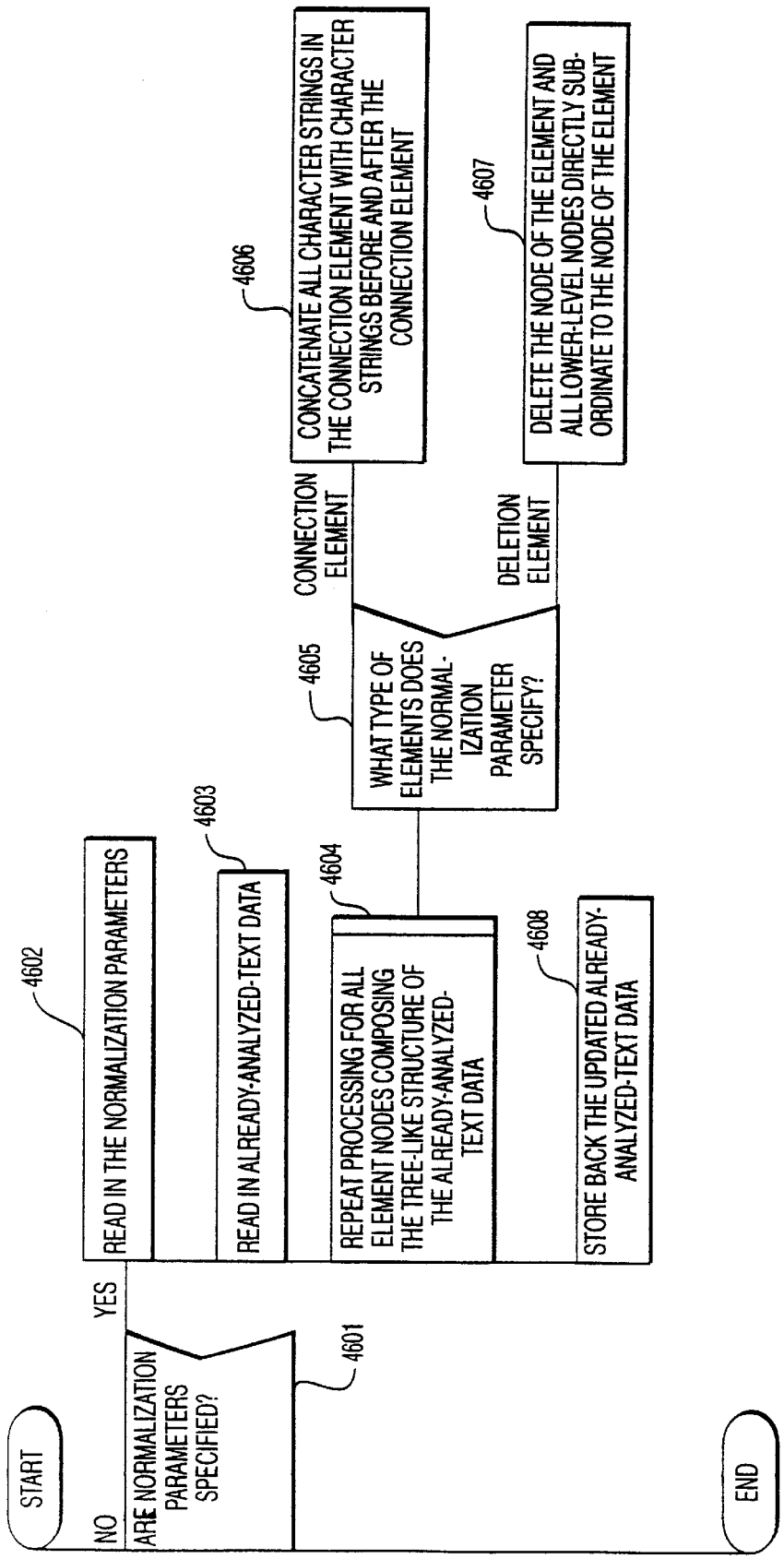
FIG. 46 is a PAD showing the procedure of processing carried out by a text-structure normalizing program in the fourth embodiment of the present invention.

FIG. 46 is a PAD showing the procedure carried out by the text-structure normalizing program 4401. As shown in this figure, the procedure begins with Step 4601, at which the text-structure normalizing program 4401 finds out whether normalization parameters are specified upon the invocation of the text-structure normalizing program 4401. If the normalization parameters are specified, the flow goes on to pieces of processing at Steps 4602 to 4608. If the normalization parameters are not specified, on the other hand, the processing is completed without doing anything.

The normalization parameters are parameters for specifying the types of a connection element and a deletion element. A connection element is a non-structural element used, for example, for putting an emphasis on the display of a portion of a text. During a search operation, it is necessary to search the text for a string of characters by passing over the boundaries of a non-structural element. On the other hand, a deletion element holds data therein with a type different from that of the native contents of the text. so that, in a search operation, the text should be searched for a string of characters by ignoring the contents of the deletion element. An example of a deletion element is an element for embedding a link to a reference to be referred to in a text.

At Step 4602, the specified normalization parameters are read in. Here, the normalization parameters can be specified by inputs entered via the keyboard 202, by storing them in a file in advance, or by using another means. The types of a plurality of connection elements and deletion elements can be specified or omitted. The flow then goes on to Step 4603, at which already-analyzed-text data is retrieved from the already-analyzed-text-data area 217.

Then, the flow proceeds to Step 4604, at which the tree-like structure of the already-analyzed-text data is sequentially traced for element nodes, one node after another, and pieces of processing at Steps 4605 to 4607 are carried out repeatedly for all element nodes. After the pieces of processing have been completed for all the nodes, the flow continues to Step 4608.

At Step 4605, the text-structure normalizing program 4401 determines the type of element that the normalization parameter specifies for an element node currently being processed. If the type of element indicates that the element being processed is specified as a connection element, the flow goes on to Step 4606, at which the node of the element is deleted and all character strings in the connection element are concatenated with character strings before and after the connection element. If the type of element indicates that the element being processed is specified as a deletion element, on the other hand, the flow goes on to Step 4607, at which the node of the element and all lower-level nodes directly subordinate to the node of the element are deleted.

After the processing at Step 4605 and the subsequent Step 4606 or 4607 has been completed, the flow continues to Step 4608, at which a group of elements to be normalized are processed, and the updated already-analyzed-text data is stored back in the already-analyzed-text-data storing area 217.

Figure 47:
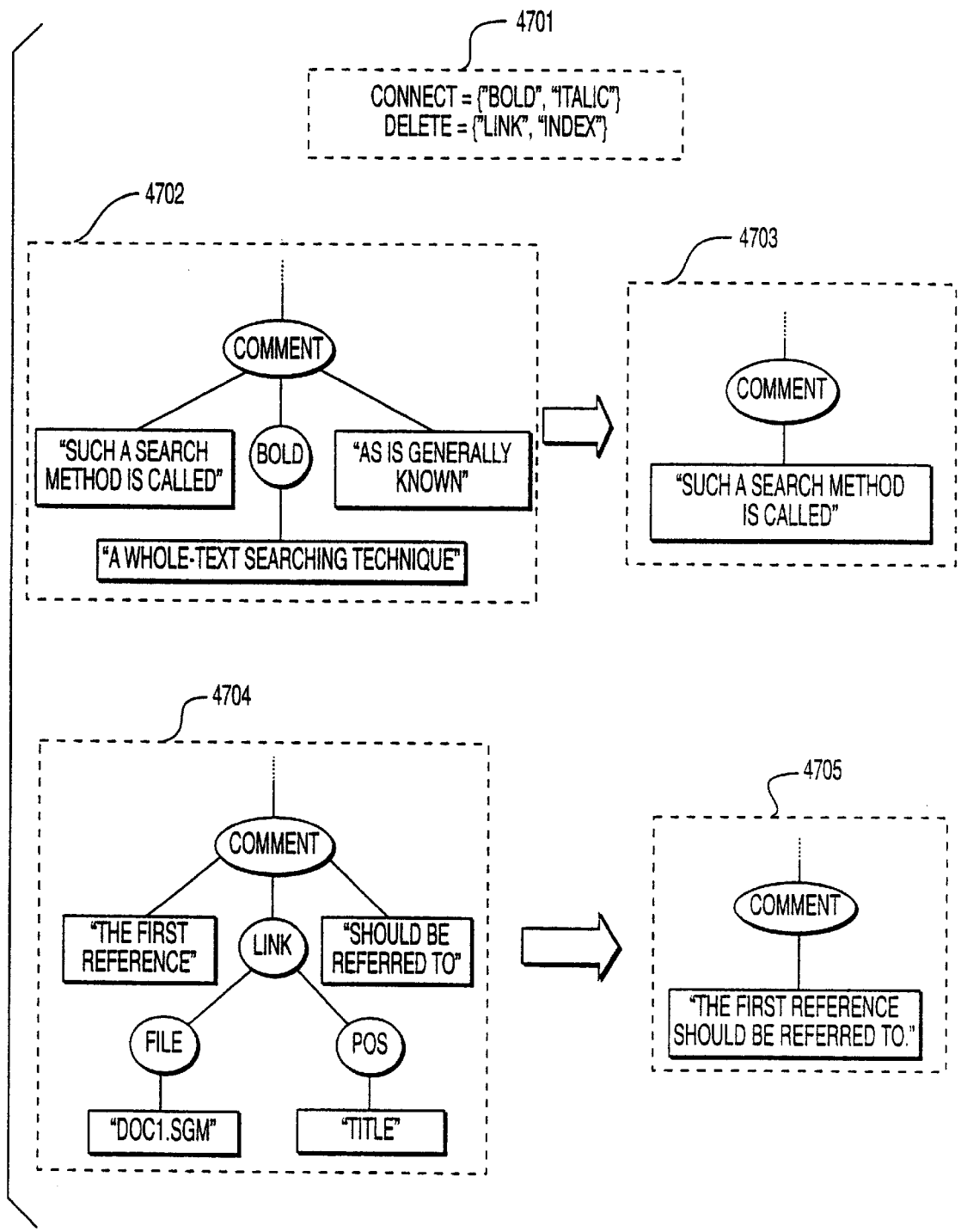
FIG. 47 is a diagram showing an example of the normalization processing in the fourth embodiment of the present invention.

FIG. 47 is a diagram showing an example of the normalization processing.

In this figure, reference numeral 4701 denotes normalization parameters. In this example, the types of two connection elements are specified as "bold" and "italic" whereas the names of two deletion elements are specified as "link" and "index". In this case, if a portion having a structure like that denoted by reference numeral 4702 exists in already-analyzed-text data, connection processing is carried out at Step 4606 for the type "bold". A result of the connection processing is denoted by reference numeral 4703. If a portion having a structure like that denoted by reference numeral 4704 exists in already-analyzed-text data, on the other hand, deletion processing is carried out at Step 4607 for the type "link". A result of the deletion processing is denoted by reference numeral 4705.

As described above, after normalization processing has been carried out for already-analyzed-text data, cataloging the normalized already-analyzed-text data in a structure index, and subsequent pieces of processing are performed in the present embodiment so that the text can be searched without encountering a hindrance by non-structural elements included in the text prior to the cataloging.

In spite of the fact that normalization processing is embraced in the present embodiment, a structure condition of tracing an order of appearance from the end of the order can yet be specified if two structure indexes (that is, a normal-order and reversed-order structure indexes) are prepared in advance, as is the case with the second embodiment.

At this point, the explanation of the fourth embodiment of the present invention is completed.

According to the methods of searching a structured text provided by the present invention as described above, since a condition regarding an appearance position of a logical element in a text can be included in a specification of a structure condition, it is possible to carry out a search operation specifying a structure condition in detail on a text database comprising a large number of texts, each of which has a complicated logical structure.

Various modifications of the embodiments set forth in the foregoing description will become apparent to those of ordinary skill in the art. All such modifications that basically rely on the teachings through which the invention has advanced the state of the art are properly considered within the spirit and scope of the invention.

We claim:

1. A structured-text cataloging/searching method for a text searching system, in which a set of texts is searched for specific text contents, comprising the following steps:
- an already-analyzed-text data generating/cataloging step of cataloging, in a text database, already-analyzed-text data obtained from an analysis of a logical structure of a text to be cataloged, said already-analyzed-text data generating/cataloging step being performed for a plurality of texts to be cataloged; and
- a structure-index creating step of creating a structure index, by sequentially superposing logical structures of said plurality of texts cataloged in said already-analyzed-text data generating/cataloging step;
- wherein said structure index has a tree-like structure composed of a plurality of metanodes;
- wherein a context identifier that uniquely identifies one of said metanodes is assigned to each metanode of said structure index; and
- wherein a group of structure elements having the same position of appearance for a plurality of texts are represented by a single metanode.

2. A structured-text cataloging/searching method according to claim 1, further comprising the steps of:
- a character-string-index updating step comprising the sub-steps of:
  - extracting partial character strings each having a predetermined character count from each of a plurality of texts to be cataloged; and
  - updating a character string index by cataloging an associative relation between each of said partial character strings and structured character position information of that partial character string in said character string index;
- a structure-condition judging step of searching the structure index for a set of context identifiers satisfying a specific structure condition;
- a structured-character-position-information extracting step of extracting partial character strings from a search term, each extracted partial character string having a predetermined character count, and searching the character string index for a set of pieces of structured-character-position information matching said extracted partial character strings; and
- an index searching step of searching said set of pieces of structured-character-position information for specific pieces of structured-character-position information that have context identifiers found at said structure-condition judging step, and that have a positional relation among said specific pieces of structured-character-position information matching an order of arrangements of said partial character strings in said search term.

3. A structured-text cataloging/searching method according to claim 2, in which said character-string-index updating step comprises the sub-steps of:
- extracting character-position information of said partial character strings in a text to be cataloged, a text identifier for uniquely identifying said text in a text database, and a context identifier of a metanode representing character-string data including said partial character strings in a structure index; and
- generating structured-character-position information that includes said character-position information, said text identifier, and said context identifier.

4. A structured-text cataloging/searching method according to claim 2, in which said structure-index creating step creates a structure index by sequentially superposing logical structures of a plurality of texts to be cataloged;
- wherein the tree-like structures of two of said texts to be cataloged are superposed on each other in said structure index by:
  - comparing nodes of one of said tree-like structures of said two texts with nodes of the other of said tree-like structures of said two texts;
  - regarding a root node in said one of said tree-like structures as a counterpart that mutually corresponds to a root node in said other of said tree-like structures;
  - regarding a non-root node in said one of said tree-like structures of said two texts as a counterpart that mutually corresponds to a non-root node in said other of said tree-like structures if the non-root node in said one of said tree-like structures has a directly superordinate node mutually corresponding to a directly superordinate node of the non-root node in said other of said tree-like structures, if the non-root node in said one of said tree-like structures is the same type of node as the non-root node in said other of said tree-like structures, and if the non-root node in said one of said tree-like structures has the same appearance order number as the non-root node in said other of said tree-like structures, wherein the appearance order number indicates a position in a normal order of an array of brother nodes of the same type of node found by counting said brother nodes, starting from the head of said array; and
  - representing two mutually corresponding nodes by a single metanode in said structure index.

5. A structured-text cataloging/searching method according to claim 2, in which said structure-index creating step creates a structure index by sequentially superposing logical structures of a plurality of texts to be cataloged;
- wherein the tree-like structures of two of said texts to be cataloged are superposed on each other in said structure index by:
  - comparing nodes of one of said tree-like structures of said two texts with nodes of the other of said tree-like structures of said two texts;
  - regarding a root node in said one of said tree-like structures as a counterpart that mutually corresponds to a root node in said other of said tree-like structures;
  - regarding a non-root node in said one of said tree-like structures of said two texts as a counterpart that mutually corresponds to a non-root node in said other of said tree-like structures if the non-root node in said one of said tree-like structures has a directly superordinate node mutually corresponding to a directly superordinate node of the non-root node in said other of said tree-like structures, if the non-root node in said one of said tree-like structures is the same type of node as the non-root node in said other of said tree-like structures, and if the non-root node in said one of said tree-like structures has the same appearance order number as the non-root node in said other of said tree-like structures, wherein said appearance order number indicates a position in a reversed order of an array of brother nodes of the same type of node found by counting said brother nodes, starting from the end of said array; and
  - representing two mutually corresponding nodes by a single metanode in said structure index.

6. A structured-text cataloging/searching method according to claim 2, in which said structure-index creating step creates a structure index by sequentially superposing logical structures of a plurality of texts to be cataloged;
   wherein the tree-like structures of two of said texts to be cataloged are superposed on each other in said structure index by:
      comparing nodes of one of said tree-like structures of said two texts with nodes of the other of said tree-like structures of said two texts;
      regarding a root node in said one of said tree-like structures as a counterpart that mutually corresponds to a root node in said other of said tree-like structures;
      regarding a non-root node in said one of said tree-like structures of said two texts as a counterpart that mutually corresponds to a non-root node in said other of said tree-like structures if the non-root node in said one of said tree-like structures has a directly superordinate node mutually corresponding to a directly superordinate node of the non-root node in said other of said tree-like structures, if the non-root node in said one of said tree-like structures is the same type of node as the non-root node in said other of said tree-like structures, and if either both the non-root node of said one of said tree-like structures and the non-root node of said other of said tree-like structures are head nodes of an array of brother nodes of the same type of node, or both the non-root node in said one of said tree-like structures and the non-root node of said other of said tree-like structures are not head nodes of an array of brother nodes of the same type of node; and
      representing two mutually corresponding nodes by a single metanode in said structure index.

7. A structured-text cataloging/searching method according to claim 2, in which said structure-index creating step creates a structure index by sequentially superposing logical structures of a plurality of texts to be cataloged;
   wherein the tree-like structures of two of said texts to be cataloged are superposed on each other in said structure index by:
      comparing nodes of one of said tree-like structures of said two texts with nodes of the other of said tree-like structures of said two texts;
      regarding a non-root node in said one of said tree-like structures of said two texts as a counterpart that mutually corresponds to a non-root node in said other of said tree-like structures if the non-root node in said one of said tree-like structures has a directly superordinate node mutually corresponding to a directly superordinate node of the non-root node in said other of said tree-like structures, if the non-root node in said one of said tree-like structures is the same type of node as the non-root node in said other of said tree-like structures, and if either both the non-root node of said one of said tree-like structures and the non-root node of said other of said tree-like structures are end nodes of an array of brother nodes of the same type of node, or both the non-root node in said one of said tree-like structures and the non-root node of said other of said tree-like structures are not end nodes of an array of brother nodes of the same type of node; and
      representing two mutually corresponding nodes by a single metanode in said structure index.

8. A structured-text cataloging/searching method according to claim 2, further comprising the following steps:
   searching said already-analyzed-text data for a structure and a descriptive complete string of characters which are regarded as improper objects to be searched; and
   deleting the structure and the descriptive complete string of characters from the already-analyzed-text data for an improper object found in said searching step;
   wherein the already-analyzed-text data from which the structures and the descriptive complete string of characters have been deleted in said deleting step, is cataloged in said cataloging step.

9. A computer-readable storage medium encoded with executable instructions constituting a program which, when executed by a computer, causes the computer to implement said already-analyzed-text data generating/cataloging step, said structure-index updating step, said character-string-index updating step, said structure-condition judging step, said structured-character-position-information extracting step, and said index searching step of said structured-text cataloging/searching method according to claim 2.

10. A text searching system, comprising:
   a text cataloging sub-system in which a plurality of texts are cataloged for use as text search objects in a text search operation;
   a text searching server that causes a text database to be searched in response to a text search request;
   a text searching client from which a text search request is issued to the text searching server; and
   a network connecting the text cataloging sub-system, the text searching server, and the text search client;
   wherein the text cataloging sub-system creates a structure index based on the cataloging of the plurality of texts, the structure index containing context identifiers of character-string data derived from the cataloged texts;
   wherein said structure index has a tree-like structure composed of a plurality of metanodes;
   wherein a context identifier that uniquely identifies one of said metanodes is assigned to each metanode of said structure index;
   wherein a group of structure elements having the same position of appearance for a plurality of texts are represented by a single metanode;
   wherein the text search request issued by the text searching client includes a search condition that is translated into a condition specification by the text searching server, from which condition specification the text searching server causes the structure index to be searched for agreement between the context identifiers and the search condition; and
   wherein the text searching server transmits a text search result to the text searching client upon completion of the search of the structure index.

11. A structured-text cataloging/searching method for a text searching system, in which a set of texts is searched for specific text contents, wherein each text has a hierarchical structure of elements, comprising the following steps:
   a text cataloging step, which catalogs the order information of every element within the sequence of elements residing on the same level in said hierarchical structure of elements; and
   a searching step, which finds every text which satisfies a search condition specifying the order of an element within the sequence of elements residing on the same level in said hierarchical structure of elements, by referring to the order information cataloged in said cataloging step, wherein said searching step finds every text that satisfies a search condition specifying a number which represents the occurrence order of an element within the sequence of elements residing on the same level in said hierarchical structure of elements, by referring to the order information cataloged in said cataloging step.

12. A structured-text cataloging/searching method for a text searching system, in which a set of texts is searched for specific text contents, wherein each text has a hierarchical structure of elements, comprising the following steps:

a text cataloging step, which catalogs the order information of every element within the sequence of elements residing on the same level in said hierarchical structure of elements; and a searching step, which finds every text which satisfies a search condition specifying the order of an element within the sequence of elements residing on the same level in said hierarchical structure of elements, by referring to the order information cataloged in said cataloging step, wherein said searching step finds every text that satisfies a search condition specifying a number which represents the reverse occurrence order of an element within the sequence of elements residing on the same level in said hierarchical structure of elements, by referring to the order information cataloged in said cataloging step.

13. A structured-text cataloging/searching method for a text searching system, in which a set of texts is searched for specific text contents, wherein each text has a hierarchical structure of elements, comprising the following steps:

a text cataloging step, which catalogs the order information of every element within the sequence of elements residing on the same level in said hierarchical structure of elements; and a searching step, which finds every text which satisfies a search condition specifying the order of an element within the sequence of elements residing on the same level in said hierarchical structure of elements, by referring to the order information cataloged in said cataloging step, wherein said searching step finds every text that satisfies a search condition specifying whether an element is positioned at the beginning or not within the sequence of elements residing on the same level in said hierarchical structure of elements, by referring to the order information cataloged in said cataloging step.

14. A structured-text cataloging/searching method for a text searching system, in which a set of texts is searched for specific text contents, wherein each text has a hierarchical structure of elements, comprising the following steps:

a text cataloging step, which catalogs the order information of every element within the sequence of elements residing on the same level in said hierarchical structure of elements; and a searching step, which finds every text which satisfies a search condition specifying the order of an element within the sequence of elements residing on the same level in said hierarchical structure of elements, by referring to the order information cataloged in said cataloging step, wherein said searching step finds every text that satisfies a search condition specifying whether an element is positioned at the ending or not within the sequence of elements residing on the same level in said hierarchical structure of elements, by referring to the order information cataloged in said cataloging step.

15. A structured-text cataloging/searching method for a text searching system, in which a set of texts is searched for specific text contents, wherein each text has a hierarchical structure of elements, comprising the following steps:

a text cataloging step, which catalogs the order information of every element residing on the same level in said hierarchical structure of elements; and a searching step, which finds every text which satisfies a search condition specifying the order of an element in said hierarchical structure of elements, by referring to the order information cataloged in said cataloging step.

16. A computer-program which is constructed by executable instructions which, when executed by a computer, causes the computer to implement said cataloging step, and said searching step of said structured-text cataloging/searching method according to claim 15.

17. A structured-text cataloging/searching method according to claim 15, wherein said searching step finds every text that satisfies a search condition specifying a number which represents the occurrence order of an element in said hierarchical structure of elements, by referring to the order information cataloged in said cataloging step.

18. A structured-text cataloging/searching method according to claim 15, wherein said searching step finds every text that satisfies a search condition specifying a number which represents the reverse occurrence order of an element in said hierarchical structure of elements, by referring to the order information cataloged in said cataloging step.

19. A structured-text cataloging/searching method according to claim 15, wherein said searching step finds every text that satisfies a search condition specifying whether an element is positioned at the beginning or not in said hierarchical structure of elements, by referring to the order information cataloged in said cataloging step.

20. A structured-text cataloging/searching method according to claim 15, wherein said searching step finds every text that satisfies a search condition specifying whether an element is positioned at the ending or not in said hierarchical structure of elements, by referring to the order information cataloged in said cataloging step.

\* \* \* \* \*